US012183360B2

(12) United States Patent
Herre et al.

(10) Patent No.: US 12,183,360 B2
(45) Date of Patent: Dec. 31, 2024

(54) DIRECTIONAL LOUDNESS MAP BASED AUDIO PROCESSING

(71) Applicant: Fraunhofer-Gesellschaft zur Förderung der angewandten Forschung e.V., Munich (DE)

(72) Inventors: Jürgen Herre, Erlangen (DE); Pablo Manuel Delgado, Erlangen (DE); Sascha Dick, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/240,751

(22) Filed: Apr. 26, 2021

(65) Prior Publication Data

US 2021/0383820 A1 Dec. 9, 2021

Related U.S. Application Data

(63) Continuation of application No. PCT/EP2019/079440, filed on Oct. 28, 2019.

(30) Foreign Application Priority Data

Oct. 26, 2018 (EP) .................................... 18202945
Apr. 16, 2019 (EP) .................................... 19169684

(51) Int. Cl.
*G10L 25/18* (2013.01)
*G10L 19/02* (2013.01)
(Continued)

(52) U.S. Cl.
CPC .............. *G10L 25/18* (2013.01); *G10L 19/02* (2013.01); *H04R 1/26* (2013.01); *H04R 3/04* (2013.01)

(58) Field of Classification Search
CPC ........... G10L 25/18; G10L 19/02; H04R 1/26; H04R 3/04
See application file for complete search history.

(56) References Cited

U.S. PATENT DOCUMENTS 5,632,005 A 5/1997 Davis et al.
6,341,165 B1 1/2002 Gbur et al.
(Continued)

FOREIGN PATENT DOCUMENTS

CN 1849648 A 10/2006
CN 101408614 A 4/2009
(Continued)

OTHER PUBLICATIONS

E. Zwicker, "Über psychologische und methodische Grundlagen der Lautheit [On the psychological and methodological bases of loudness]," Acustica, vol. 8, pp. 237-258, 1958.—not available.
(Continued)

*Primary Examiner* — Daniel R Sellers
(74) *Attorney, Agent, or Firm* — Perkins Coie LLP; Michael A. Glenn

(57) ABSTRACT

An audio analyzer configured to obtain spectral domain representations of two or more input audio signals. Additionally the audio analyzer is configured to obtain directional information associated with spectral bands of the spectral domain representations and to obtain loudness information associated with different directions as an analysis result. Contributions to the loudness information are determined in dependence on the directional information.

8 Claims, 29 Drawing Sheets

(51) Int. Cl.
*H04R 1/26* (2006.01)
*H04R 3/04* (2006.01)

(56) References Cited

U.S. PATENT DOCUMENTS

| | | | |
|---|---|---|---|
| 6,487,535 | B1 | 11/2002 | Smyth et al. |
| 10,075,802 | B1 | 9/2018 | Kim et al. |
| 2006/0004583 | A1 | 1/2006 | Herre et al. |
| 2006/0262935 | A1 | 11/2006 | Goose et al. |
| 2008/0187144 | A1* | 8/2008 | Seo ........................ H04S 3/008 381/56 |
| 2010/0292994 | A1 | 11/2010 | Lee et al. |
| 2011/0270616 | A1 | 11/2011 | Garudadri et al. |
| 2012/0070207 | A1 | 3/2012 | Cao et al. |
| 2012/0114126 | A1 | 5/2012 | Thiergart et al. |
| 2013/0121411 | A1 | 5/2013 | Robillard et al. |
| 2013/0165336 | A1 | 6/2013 | Liew et al. |
| 2014/0067404 | A1 | 3/2014 | Baumgarte |
| 2014/0355769 | A1 | 12/2014 | Peters et al. |
| 2014/0358565 | A1* | 12/2014 | Peters .................. G10L 19/002 704/500 |
| 2015/0127354 | A1 | 5/2015 | Peters et al. |
| 2016/0219387 | A1 | 7/2016 | Ward et al. |
| 2016/0219390 | A1 | 7/2016 | Ward et al. |
| 2016/0322060 | A1 | 11/2016 | Riedmiller et al. |
| 2017/0206912 | A1 | 7/2017 | Grant et al. |
| 2018/0190303 | A1 | 7/2018 | Ghido et al. |
| 2018/0277140 | A1 | 9/2018 | Masuda et al. |
| 2018/0302738 | A1 | 10/2018 | Di Censo et al. |

FOREIGN PATENT DOCUMENTS

| | | | |
|---|---|---|---|
| CN | 101884065 | A | 11/2010 |
| CN | 103052983 | A | 4/2013 |
| CN | 107925388 | A | 4/2018 |
| EP | 2958343 | A1 | 12/2015 |
| EP | 3174316 | A1 | 5/2017 |
| JP | 2010130411 | A | 6/2010 |
| JP | 2012526296 | A | 10/2012 |
| JP | 2015158543 | A | 9/2015 |
| JP | 2018156052 | A | 10/2018 |
| KR | 20070017441 | A | 2/2007 |
| RU | 2439720 | C1 | 1/2012 |
| RU | 2589362 | C1 | 7/2016 |
| RU | 2589370 | C1 | 7/2016 |
| RU | 2617552 | C2 | 4/2017 |
| RU | 2668059 | C2 | 9/2018 |
| WO | 2005027095 | A1 | 3/2005 |
| WO | 2006004048 | A1 | 1/2006 |
| WO | 2009046223 | A2 | 4/2009 |
| WO | 2014099285 | A1 | 6/2014 |
| WO | 2014113465 | A1 | 7/2014 |
| WO | 2015038522 | A1 | 3/2015 |
| WO | 2018047667 | A1 | 3/2018 |

OTHER PUBLICATIONS

Bradley Efron, "Regression and anova with zero-one data: Measures of residual variation", Journal of the American Statistical Association, vol. 31, No. 2, pp. 644-651, 1983.

E R Hafter and Raymond Dye, "Detection of interaural differences of time in trains of high-frequency clicks as a function of interclick interval and number," The Journal of the Acoustical Society of America, vol. 73, pp. 644-651, Mar. 1983.

B.C.J. Moore and B.R. Glasberg, "A revision of Zwicker's loudness model," Acustica United with Acta Acustica:the Journal of the European Acoustics Association, vol. 82, No. 2, pp. 335-345, 1996.

ITU-R Rec. BS.1387, Method for objective measurements of perceived audio quality, ITU-T Rec. BS.1387, Geneva, Switzerland, 2001.

Ewan A. Macpherson and John C. Middlebrooks, "Listener weighting of cues for lateral angle: The duplex theory of sound localization revisited," The Journal of the Acoustical Society of America, vol. 111, No. 5, pp. 2219-2236, 2002.

Frank Baumgarte and Christof Faller, "Why binaural cue coding is better than intensity stereo coding," in Audio Engineering Society Convention 112, Apr. 2002.

C. Avendano, "Frequency-domain source identification and manipulation in stereo mixes for enhancement, suppression and re-panning applications," in 2003 IEEE Workshop on Applications of Signal Processing to Au-dio and Acoustics, Oct. 2003, pp. 55-58.

C. Faller and F. Baumgarte, "Binaural cue coding—Part II: Schemes and applications," IEEE Transactions on Speech and Audio Processing, vol. 11, No. 6, pp. 520-531, Nov. 2003.

Nicolas Tsingos, Emmanuel Gallo, and George Drettakis, "Perceptual audio rendering of complex virtual environments," in ACM SIGGRAPH 2004 Papers, New York, NY, USA, 2004, SIGGRAPH '04, pp. 249-258, ACM.

Inyong Choi, Barbara G. Shinn-Cunningham, Sang Bae Chon, and Koeng-Mo Sung, "Objective measurement of perceived auditory quality in multichannel audio compression coding systems," J. Audio Eng. Soc, vol. 56, No. 1/2, pp. 3-17, 2008.

Judith Liebetrau, et al.; "Standardization of PEAQ-MC: Extension of ITU-R BS.1387-1 to Multichannel Audio," in Audio Engineering Society Conference: 40th International Conference: Spatial Audio: Sense the Sound of Space, Oct. 2010.

ISO/IEC JTC1/SC29/WG11, "USAC verification test report N12232," Tech. Rep., International Organisation for Standardisation, 2011.

Marko Takanen et al., "A binaural auditory model for the evaluation of reproduced stereo-phonic sound," in Audio Engineering Society Conference: 45th International Conference: Applications of Time-Frequency Processing in Audio, Mar. 2012.

Jeong-Hun Seo, Sang Bae Chon, Keong-Mo Sung, and Inyong Choi, "Perceptual objective quality evaluation method for high quality multichannel audio codecs," J. Audio Eng. Soc, vol. 61, No. 7/8, pp. 535-545, 2013.

M. Schafer, M. Bahram, and P. Vary, "An extension of the PEAQ measure by a binaural hearing model," in 2013 IEEE International Conference on Acoustics, Speech and Signal Processing, May 2013, pp. 8164-8168.

ITU-T Rec. P.863, "Perceptual objective listening quality assessment," Tech. Rep., International Telecommunication Union, Geneva, Switzerland, 2014.

ITU-R Rec. BS. 1534-3, "Method for the subjective assessment of intermediate quality levels of coding systems," Tech. Rep., International Telecommunication Union, Geneva, Switzerland, Oct. 2015.

Robert Conetta, etal, "Spatial audio quality perception (part 2): A linear regression model," J. Audio Eng. Soc, vol. 62, No. 12, pp. 847-860, 2015.

Jan-Hendrik Flessner, Rainer Huber, and Stephan D. Ewert, "Assessment and prediction of binaural aspects of audio quality," J. Audio Eng. Soc, vol. 65, No. 11, pp. 929-942, 2017.

K Ulovec and M Smutny, "Perceived audio quality analysis in digital audio broadcasting plus system based on PEAQ," Radioengineering, vol. 27, pp. 342-352, Apr. 2018.

Pablo Delgado, et al."Energy aware modeling of interchannel level difference distortion impact on spatial audio perception," in Audio Engineering Society Conference: 2018 AES International Conference on Spatial Reproduction—Aesthetics and Science, Jul. 2018.

Delgado, Pablo , et al., "Objective Assessment of Spatial Audio Quality Using Directional Loudness Maps 11", IEEE International Conference on Acoustics, Speech and Signal Processing (ICASSP), IEEE, May 12, 2019, pp. 621-625, XP033566358, DOI: 10.1109/ICASSP.2019.8683810.

* cited by examiner

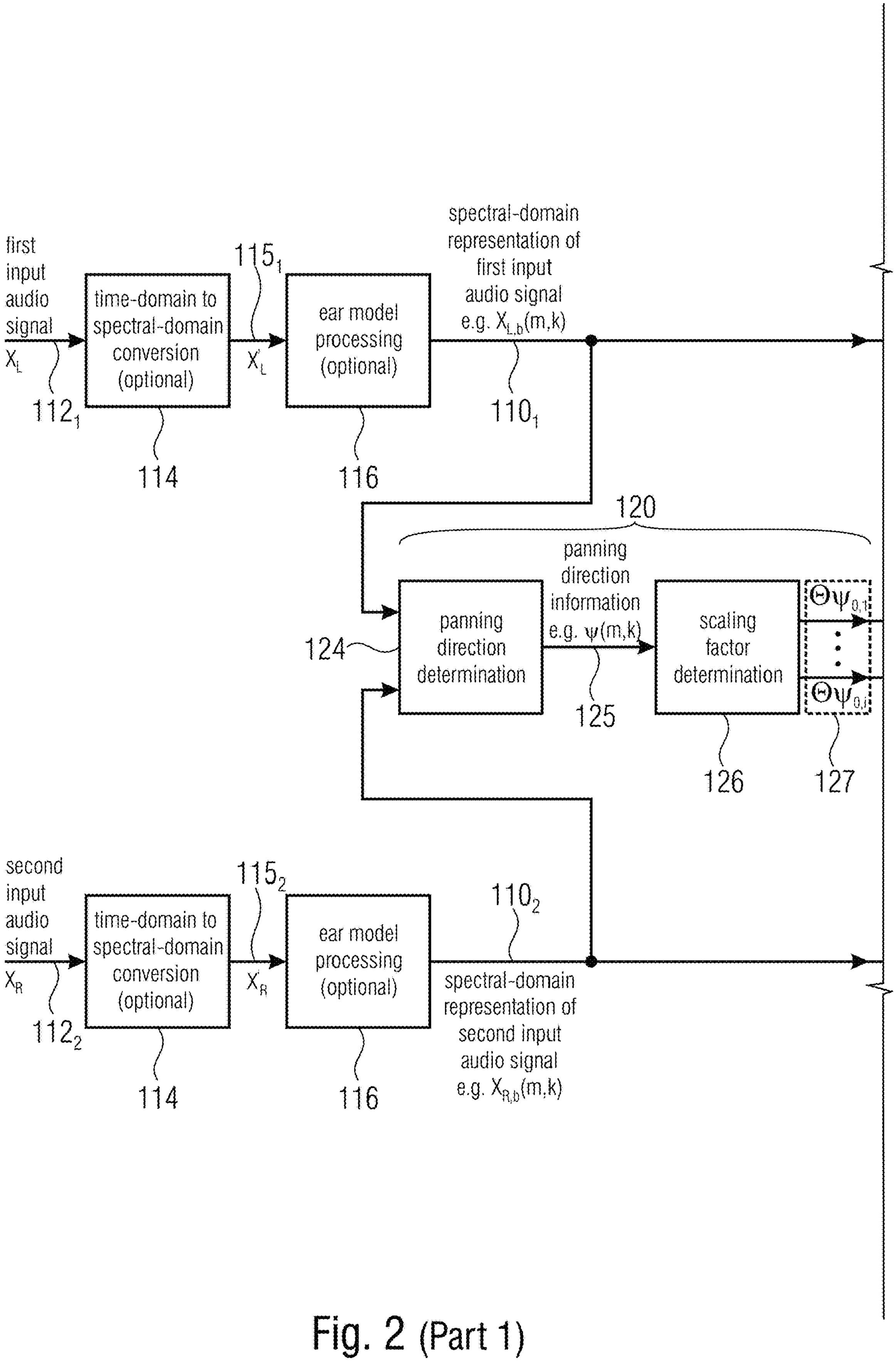
Fig. 2 (Part 1)

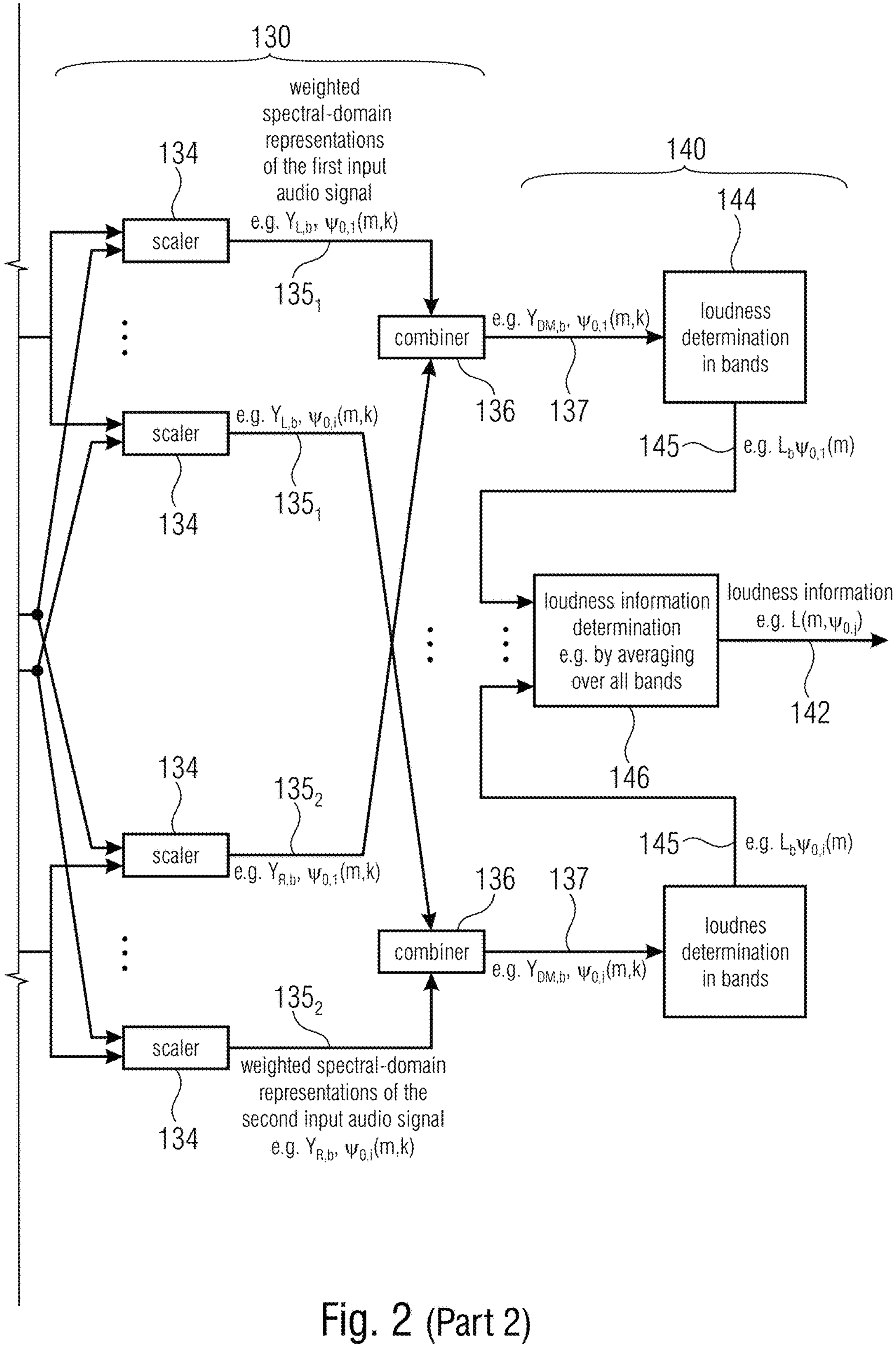
Fig. 2 (Part 2)

| | $f_1$ | $f_2$ | $f_3$ | $f_4$ | $f_5$ | $f_6$ | $f_7$ | $f_8$ |
|---|---|---|---|---|---|---|---|---|
| $\psi_{0,6}$ | 0,5 | 0,5 | 0 | 0 | 0,25 | 0,5 | 0,25 | 0 |
| $\psi_{0,5}$ | 1 | 1 | 0 | 0 | 0,5 | 1 | 0,5 | 0 |
| $\psi_{0,4}$ | 0,5 | 0,5 | 0 | 0,25 | 1 | 0,5 | 1 | 0,25 |
| $\psi_{0,3}$ | 0,25 | 0,25 | 0,25 | 0,5 | 0,5 | 0,25 | 0,5 | 0,5 |
| $\psi_{0,2}$ | 0 | 0 | 0,5 | 1 | 0,25 | 0 | 0,25 | 1 |
| $\psi_{0,1}$ | 0 | 0 | 1 | 0,5 | 0 | 0 | 0 | 0,5 |

| | $f_1$ | $f_2$ | $f_3$ | $f_4$ | $f_5$ | $f_6$ | $f_7$ | $f_8$ |
|---|---|---|---|---|---|---|---|---|
| $\psi_{0,6}$ | 0 | 0 | 0 | 0 | 0 | 0 | 0 | 0 |
| $\psi_{0,5}$ | 1 | 1 | 0 | 0 | 0 | 1 | 0 | 0 |
| $\psi_{0,4}$ | 0 | 0 | 0 | 0 | 1 | 0 | 1 | 0 |
| $\psi_{0,3}$ | 0 | 0 | 0 | 0 | 0 | 0 | 0 | 0 |
| $\psi_{0,2}$ | 0 | 0 | 0 | 1 | 0 | 0 | 0 | 1 |
| $\psi_{0,1}$ | 0 | 0 | 1 | 0 | 0 | 0 | 0 | 0 |

directional loudness map REF directional loudness map SUT directional loudness map DIFF

DIRECTIONAL LOUDNESS MAP BASED AUDIO PROCESSING

CROSS-REFERENCE TO RELATED APPLICATIONS

This application is a continuation of copending International Application No. PCT/EP2019/079440, filed Oct. 28, 2019, which is incorporated herein by reference in its entirety, and additionally claims priority from European Applications Nos. EP 18202945.4, filed Oct. 26, 2018, and EP 19169684.8, filed Apr. 16, 2019, which are all incorporated herein by reference in their entirety.

Embodiments according to the invention related to a directional loudness map based audio processing.

BACKGROUND OF THE INVENTION

Since the advent of perceptual audio coders, a considerable interest arose in developing algorithms that can predict audio quality of the coded signals without relying on extensive subjective listening tests to save time and resources. Algorithms performing a so-called objective assessment of quality on monaurally coded signals such as PEAQ [3] or POLQA [4] are widely spread. However, their performance for signals coded with spatial audio techniques is still considered unsatisfactory [5]. In addition, non-waveform preserving techniques such as bandwidth extension (BWE) are also known for causing these algorithms to overestimate the quality loss [6] since many of the features extracted for analysis assume waveform preserving conditions. Spatial audio and BWE techniques are predominantly used at low-bitrate audio coding (around 32 kbps per channel).

It is assumed that spatial audio content of more than two channels can be rendered to a binaural representation of the signals entering the left and the right ear by using sets of Head Related Transfer Functions (HRTFs) and/or Binaural Room Impulse Responses (BRIR) [5, 7]. Most of the proposed extensions for binaural objective assessment of quality are based on well-known binaural auditory cues related to the human perception of sound localization and perceived auditory source width such as Inter-aural Level Differences (ILD), Inter-aural Time Differences (ITD) and Inter-aural Cross-Correlation (IACC) between signals entering the left and the right ear [1, 5, 8, 9]. In the context of objective quality evaluation, features are extracted based on these spatial cues from reference and test signals and a distance measure between the two is used as a distortion index. The consideration of these spatial cues and their related perceived distortions allowed for considerable progress in the context of spatial audio coding algorithm design [7]. However, in the use case of predicting the overall spatial audio coding quality, the interaction of these cue distortions with each other and with monaural/timbral distortions (especially in non-waveform-preserving cases) renders a complex scenario [10] with varying results when using the features to predict a single quality score given by subjective quality tests such as MUSHRA [11]. Other alternative models have also been proposed [2] in which the output of a binaural model is further processed by a clustering algorithm to identify the number of participating sources in the instantaneous auditory image and therefore is also an abstraction of the classical auditory cue distortion models. Nevertheless, the model in [2] is mostly focused on moving sources in space and its performance is also limited by the accuracy and tracking ability of the associated clustering algorithm. The number of added features to make this model usable is also significant.

Objective audio quality measurement systems should also employ the fewest, mutually independent and most relevant extracted signal features as possible to avoid the risk of over-fitting given the limited amount of ground-truth data for mapping feature distortions to quality scores provided by listening tests [3].

One of the most salient distortion characteristics reported in listening tests for spatially coded audio signals at low bitrates is described as a collapse of the stereo image towards the center position and channel cross-talk [12].

SUMMARY

An embodiment may have an audio analyzer, wherein the audio analyzer is configured to obtain spectral domain representations of two or more input audio signals; wherein the audio analyzer is configured to obtain directional information associated with spectral bands of the spectral domain representations; wherein the audio analyzer is configured to obtain loudness information associated with different directions as an analysis result, wherein contributions to the loudness information are determined in dependence on the directional information.

Another embodiment may have an audio similarity evaluator, wherein the audio similarity evaluator is configured to obtain a first loudness information associated with different directions on the basis of a first set of two or more input audio signals, and wherein the audio similarity evaluator is configured to compare the first loudness information with a second loudness information associated with the different panning directions and with a set of two or more reference audio signals, in order to obtain a similarity information describing a similarity between the first set of two or more input audio signals and the set of two or more reference audio signals.

Another embodiment may have an audio encoder for encoding an input audio content including one or more input audio signals, wherein the audio encoder is configured to provide one or more encoded audio signals on the basis of one or more input audio signals, or one or more signals derived therefrom; wherein the audio encoder is configured to adapt encoding parameters in dependence on one or more directional loudness maps which represent loudness information associated with a plurality of different directions of the one or more signals to be encoded.

Another embodiment may have an audio encoder for encoding an input audio content including one or more input audio signals, wherein the audio encoder is configured to provide one or more encoded audio signals on the basis of two or more input audio signals, or on the basis of two or more signals derived therefrom, using a joint encoding of two or more signals to be encoded jointly; wherein the audio encoder is configured to select signals to be encoded jointly out of a plurality of candidate signals or out of a plurality of pairs of candidate signals in dependence on directional loudness maps which represent loudness information associated with a plurality of different directions of the candidate signals or of the pairs of candidate signals.

Another embodiment may have an audio encoder for encoding an input audio content including one or more input audio signals, wherein the audio encoder is configured to provide one or more encoded audio signals on the basis of two or more input audio signals, or on the basis of two or more signals derived therefrom; wherein the audio encoder is configured to determine an overall directional loudness map on the basis of the input audio signals, and/or to determine one or more individual directional loudness maps associated with individual input audio signals; and wherein the audio encoder is configured to encode the overall directional loudness map and/or one or more individual directional loudness maps as a side information.

Another embodiment may have an audio decoder for decoding an encoded audio content, wherein the audio decoder is configured to receive an encoded representation of one or more audio signals and to provide a decoded representation of the one or more audio signals; wherein the audio decoder is configured to receive an encoded directional loudness map information and to decode the encoded directional loudness map information, to obtain one or more directional loudness maps; and wherein the audio decoder is configured to reconstruct an audio scene using the decoded representation of the one or more audio signals and using the one or more directional loudness maps.

Another embodiment may have a format converter for converting a format of an audio content, which represents an audio scene, from a first format to a second format, wherein the format converter is configured provide a representation of the audio content in the second format on the basis of the representation of the audio content in the first format; wherein the format converter is configured to adjust a complexity of the format conversion in dependence on contributions of input audio signals of the first format to an overall directional loudness map of the audio scene.

Another embodiment may have an audio decoder for decoding an encoded audio content, wherein the audio decoder is configured to receive an encoded representation of one or more audio signals and to provide a decoded representation of the one or more audio signals; wherein the audio decoder is configured to reconstruct an audio scene using the decoded representation of the one or more audio signals; wherein the audio decoder is configured to adjust a decoding complexity in dependence on contributions of encoded signals to an overall directional loudness map of a decoded audio scene.

Another embodiment may have a renderer for rendering an audio content, wherein the renderer is configured to reconstruct an audio scene on the basis of one or more input audio signals; wherein the renderer is configured to adjust a rendering complexity in dependence on contributions of the input audio signals to an overall directional loudness map of a rendered audio scene.

According to another embodiment, a method for analyzing an audio signal may have the steps of: obtaining a plurality of weighted spectral domain representations on the basis of one or more spectral domain representations of two or more input audio signals, wherein values of the one or more spectral domain representations are weighted in dependence on different directions of audio components in two or more input audio signals, to obtain the plurality of weighted spectral domain representations; and obtaining loudness information associated with the different directions on the basis of the plurality of weighted spectral domain representations as an analysis result.

According to another embodiment, a method for evaluating a similarity of audio signals may have the steps of: obtaining a first loudness information associated with different directions on the basis of a first set of two or more input audio signals, and comparing the first loudness information with a second loudness information associated with the different panning directions and with a set of two or more reference audio signals, in order to obtain a similarity information describing a similarity between the first set of two or more input audio signals and the set of two or more reference audio signals.

According to another embodiment, a method for encoding an input audio content including one or more input audio signals may have the steps of: providing one or more encoded audio signals on the basis of one or more input audio signals, or one or more signals derived therefrom; and adapting the provision of the one or more encoded audio signals in dependence on one or more directional loudness maps which represent loudness information associated with a plurality of different directions of the one or more signals to be encoded.

According to another embodiment, a method for encoding an input audio content including one or more input audio signals may have the steps of: providing one or more encoded audio signals on the basis of two or more input audio signals, or on the basis of two or more signals derived therefrom, using a joint encoding of two or more signals to be encoded jointly; and selecting signals to be encoded jointly out of a plurality of candidate signals or out of a plurality of pairs of candidate signals in dependence on directional loudness maps which represent loudness information associated with a plurality of different directions of the candidate signals or of the pairs of candidate signals.

According to another embodiment, a method for encoding an input audio content including one or more input audio signals may have the steps of: providing one or more encoded audio signals on the basis of two or more input audio signals, or on the basis of two or more signals derived therefrom; determining an overall directional loudness map on the basis of the input audio signals, and/or determining one or more individual directional loudness maps associated with individual input audio signals; and encoding the overall directional loudness map and/or one or more individual directional loudness maps as a side information.

According to another embodiment, a method for decoding an encoded audio content may have the steps of: receiving an encoded representation of one or more audio signals and providing a decoded representation of the one or more audio signals; receiving an encoded directional loudness map information and decoding the encoded directional loudness map information, to obtain one or more directional loudness maps; and reconstructing an audio scene using the decoded representation of the one or more audio signals and using the one or more directional loudness maps.

According to another embodiment, a method for converting a format of an audio content, which represents an audio scene, from a first format to a second format, may have the steps of: providing a representation of the audio content in the second format on the basis of the representation of the audio content in the first format; adjusting a complexity of the format conversion in dependence on contributions of input audio signals of the first format to an overall directional loudness map of the audio scene.

According to another embodiment, a method for decoding an encoded audio content may have the steps of: receiving an encoded representation of one or more audio signals and providing a decoded representation of the one or more audio signals; reconstructing an audio scene using the decoded representation of the one or more audio signals; adjusting a decoding complexity in dependence on contributions of encoded signals to an overall directional loudness map of a decoded audio scene.

According to another embodiment, a method for rendering an audio content may have the steps of: reconstructing an audio scene on the basis of one or more input audio signals; adjusting a rendering complexity in dependence on contributions of the input audio signals to an overall directional loudness map of a rendered audio scene.

Another embodiment may have a non-transitory digital storage medium having a computer program stored thereon to perform any of the inventive methods when said computer program is run by a computer.

According to another embodiment, an encoded audio representation may have: an encoded representation of one or more audio signals; and an encoded directional loudness map information.

An embodiment according to this invention is related to an audio analyzer, for example, an audio signal analyzer. The audio analyzer is configured to obtain spectral-domain representations of two or more input audio signals. Thus, the audio analyzer is, for example, configured to determine or receive the spectral-domain representations. According to an embodiment, the audio analyzer is configured to obtain the spectral-domain representations by decomposing the two or more input audio signals into time-frequency tiles. Furthermore, the audio analyzer is configured to obtain directional information associated with spectral bands of the spectral-domain representations. The directional information represents, for example, different directions (or positions) of audio components contained in the two or more input audio signals. According to an embodiment, the directional information can be understood as a panning index, which describes, for example, a source location in a sound field created by the two or more input audio signals in a binaural processing. In addition, the audio analyzer is configured to obtain loudness information associated with different directions as an analysis result, wherein contributions to the loudness information are determined in dependence on the directional information. In other words, the audio analyzer is, for example, configured to obtain the loudness information associated with different panning directions or panning indices or for a plurality of different evaluated direction ranges as an analysis result. According to an embodiment, the different directions, for example, panning directions, panning indices and/or direction ranges, can be obtained from the directional information. The loudness information comprises, for example, a directional loudness map or level information or energy information. The contributions to the loudness information are, for example, contributions of spectral bands of the spectral-domain representations to the loudness information. According to an embodiment, the contributions to the loudness information are contributions to values of the loudness information associated with the different directions.

This embodiment is based on the idea that it is advantageous to determine the loudness information in dependence on the directional information obtained from the two or more input audio signals. This enables to obtain information about loudness of different sources in a stereo audio mix realized by the two or more audio signals. Thus, with the audio analyzer a perception of the two or more audio signals can be analyzed very efficiently by obtaining the loudness information associated with different directions as an analysis result.

According to an embodiment, the loudness information can comprise or represent a directional loudness map, which gives, for example, information about a loudness of a combination of the two or more signals at the different directions or information about a loudness of at least one common time signal of the two or more input audio signals, averaged over all ERB bands (ERB=equivalent rectangular bandwidth).

According to an embodiment, the audio analyzer is configured to obtain a plurality of weighted spectral-domain (e.g., time-frequency-domain) representations (e.g., "directional signals") on the basis of the spectral-domain (e.g., time-frequency-domain) representations of the two or more input audio signals. Values of the one or more spectral-domain representations are weighted in dependence on the different directions (e.g., panning direct)(e.g., represented by weighting factors) of the audio components (for example, of spectral bins or spectral bands)(e.g., tunes from instruments or singer) in the two or more input audio signals to obtain the plurality of weighted spectral-domain representations (e.g., "directional signals"). The audio analyzer is configured to obtain loudness information (e.g., loudness values for a plurality of different directions; e.g., a "directional loudness map") associated with the different directions (e.g., panning directions) on the basis of the weighted spectral-domain representations (e.g., "directional signals") as the analysis result.

This means, for example, that the audio analyzer analyzes in which direction of the different directions of the audio components the values of the one or more spectral-domain representations influence the loudness information. Each Spectral bin is, for example, associated with a certain direction, wherein a loudness information associated with a certain direction can be determined by the audio analyzer based on more than on spectral bin associated with this direction. The weighing can be performed for each bin or each spectral band of the one or more spectral-domain representations. According to an embodiment, the values of a frequency bin or a frequency group are windowed by the weighing to one of the different directions. For example, they are weighted to the direction they are associated with and/or to neighboring directions. The direction is, for example associated with a direction in which the frequency bin or frequency group influences the loudness information. Values deviating from that direction are, for example, weighted less importantly. Thus, the plurality of weighted spectral-domain representations can provide an indication of spectral bins or spectral bands influencing the loudness information in the different directions. According to an embodiment, the plurality of weighted spectral-domain representations can represent at least partially the contributions to the loudness information.

According to an embodiment, the audio analyzer is configured to decompose (e.g. transform) the two or more input audio signals into a short-time Fourier transform (SIFT) domain (e.g., using a Hann window) to obtain two or more transformed audio signals. The two or more transform audio signals can represent the spectral-domain (e.g., the time-frequency-domain) representations of the two or more input audio signals.

According to an embodiment, the audio analyzer is configured to group spectral bins of the two or more transformed audio signals to spectral bands of the two or more transformed audio signals (e.g., such that bandwidths of the groups or spectral bands increase with increasing frequency) (e.g., based on a frequency selectivity of the human cochlea). Furthermore the audio analyzer is configured to weight the spectral bands (for example, spectral bins within the spectral bands) using different weights, based on an outer-ear and middle-ear model, to obtain the one or more spectral-domain representations of the two or more input audio signals. With the special grouping of the spectral bins into spectral bands and with the weighting of the spectral bands the two or more input audio signals are prepared such that a loudness perception of the two or more input audio signals by a user, hearing said signals, can be estimated or determined very precisely and efficiently by the audio analyzer in terms of determining the loudness information. With this feature the transform audio signals respectively the spectral-domain representations of the two or more input audio signals are adapted to the human ear, to improve an information content of the loudness information obtained by the audio analyzer.

According to an embodiment, the two or more input audio signals are associated with different directions or different loudspeaker positions (e.g., L (left), R (right)). The different directions or different loudspeaker positions can represent different channels for a stereo and/or a multichannel audio scene. The two or more input audio signals can be distinguished from each other by indices, which can, for example, be represented by letters of the alphabet (e.g., L (left), R (right), M (middle)) or, for example, by a positive integer indicating the number of the channel of the two or more input audio signals. Thus the indices can indicate the different directions or loudspeaker positions, with which the two or more input audio signal are associated with (e.g., they indicate a position, where the input signals originate in a listening space). According to an embodiment, the different directions (in the following, for example, first different directions) of the two or more input audio signals are not related to the different directions (in the following, for example, second different directions) with which the loudness information, obtained by the audio analyzer, is associated. Thus, a direction of the first different directions can represent a channel of a signal of the two or more input audio signals and a direction of the second different directions can represent a direction of an audio component of a signal of the two or more input audio signals. The second different directions can be positioned between the first directions. Additionally or alternatively the second different directions can be positioned outside of the first directions and/or at the first directions.

According to an embodiment, the audio analyzer is configured to determine a direction-dependent weighting (e.g., based on panning directions) per spectral bin (e.g., and also per time step/frame) and for a plurality of predetermined directions (desired panning directions). The predetermined directions represent, for example, equidistant directions, which can be associated with predetermined panning directions/indices. Alternatively the predetermined directions are, for example, determined using the directional information associated with spectral bands of the spectral-domain representations, obtained by the audio analyzer. According to an embodiment, the directional information can comprise the predetermined directions. The direction-dependent weighting is, for example, applied to the one or more spectral-domain representations of the two or more input audio signals by the audio analyzer. With the direction-dependent weighting a value of a spectral bin is, for example, associated with one or more directions of the plurality of predetermined directions. This direction-dependent weighting is, for example, based on the idea that each spectral bin of the spectral-domain representations of the two or more input audio signals contribute to the loudness information at one or more different directions of the plurality of predetermined directions. Each spectral bin contributes, for example, primarily to one direction and only in a small amount to neighboring directions, whereby it is advantageous to weight a value of a spectral bin differently for different directions.

According to an embodiment, the audio analyzer is configured to determine a direction dependent weighting using a Gaussian function, such that the direction dependent weighting decreases with increasing deviation between respective extracted direction values (e.g., associated with the time-frequency bin under consideration) and respective predetermined direction values. The respective extracted direction values can represent directions of audio components in the two or more input audio signals. An interval for the respective extracted direction values can lie between a direction totally to the left and a direction totally to the right, wherein the directions left and right are with respect to a user perceiving the two or more input audio signals (e.g., facing the loudspeakers). According to an embodiment, the audio analyzer can determine each extracted direction value as a predetermined direction value or equidistant direction values as predetermined direction values. Thus, for example, one or more spectral bins corresponding to an extracted direction are weighted at predetermined directions neighboring this extracted direction according to the Gaussian function less importantly than at the predetermined direction corresponding to the extracted direction value. The greater the distance of a predetermined direction is to an extracted direction, the more the weighting of the spectral bins or of spectral bands decreases, such that, for example, a spectral bin has nearly or no influence on a loudness perception at a location far away from the corresponding extracted direction.

According to an embodiment, the audio analyzer is configured to determine panning index values as the extracted direction values. The panning index values will, for example, uniquely indicate a direction of time-frequency components (i. e. the spectral bins) of sources in a stereo mix created by the two or more input audio signals.

According to an embodiment, the audio analyzer is configured to determine the extracted direction values in dependence on spectral-domain values of the input audio signals (e.g., values of the spectral-domain representations of the input audio signals). The extracted direction values are, for example, determined on the basis of an evaluation of an amplitude panning of signal components (e.g., in time frequency bins) between the input audio signals, or on the basis of a relationship between amplitudes of corresponding spectral-domain values of the input audio signals. According to an embodiment, the extracted direction values define a similarity measure between the spectral-domain values of the input audio signals.

According to an embodiment, the audio analyzer is configured to obtain the direction-dependent weighting $\Theta_{\Psi_{0,j}}(m, k)$ associated with a predetermined direction (e.g., represented by index $\Psi_{0,j}$), a time (or time frame) designated with a time index m, and a spectral bin designated by a spectral bin index k according to $$\theta_{\Psi_{0,j}}(m, k) = e^{-\frac{1}{2\xi}\left(\Psi(m,k)-\Psi_{0,j}\right)^2},$$

wherein $\xi$ is a predetermined value (which controls, for example, a width of a Gaussian window). $\Psi(m, k)$ designates the extracted direction values associated with a time (or time frame) designated with a time index m, and a spectral bin designated by a spectral bin index k and $\Psi_{0,j}$ is a direction value which designates (or is associated with) a predetermined direction (e.g., having direction index j). The direction-dependent weighting is based on the idea that spectral values or spectral bins or spectral bands with an extracted direction value (e.g. a panning index) equaling $\Psi_{0,j}$ (e.g., equaling the predetermined direction) pass the direction-dependent weighting unmodified and spectral values or spectral bins or spectral bands with an extracted direction value (e.g. a panning index) deviating from $\Psi_{0,j}$ are weighted. According to an embodiment, spectral values or spectral bins or spectral bands with an extracted direction value near $\Psi_{0,j}$ are weighted and passed and the rest of the values are rejected (e.g., not processed further).

According to an embodiment, the audio analyzer is configured to apply the direction-dependent weighting to the one or more spectral-domain representations of the two or more input audio signals, in order to obtain the weighted spectral-domain representations (e.g., "directional signals"). Thus, the weighted spectral-domain representations comprise, for example, spectral bins (i.e. time-frequency components) of the one or more spectral-domain representations of the two or more input audio signals that correspond to one or more predetermined directions within, for example, a tolerance value (e.g., also spectral bins associated with different predetermined directions neighboring a selected predetermined direction). According to an embodiment, for each predetermined direction a weighted spectral-domain representation can be realized by the direction-dependent weighting (e.g., the weighted spectral-domain representation can comprise direction-dependent weighted spectral values, spectral bins or spectral bands associated with the predetermined direction and/or associated with a direction in a vicinity of the predetermined direction over time). Alternatively, for each spectral-domain representation (e.g., of the two or more input audio signals) one weighted spectral-domain representation is obtained, which represents, for example, the corresponding spectral-domain representation weighted for all predetermined directions.

According to an embodiment, the audio analyzer is configured to obtain the weighted spectral-domain representations, such that signal components having associated a first predetermined direction (e.g., a first panning direction) are emphasized over signal components having associated other directions (which are different from the first predetermined direction and which are, for example, attenuated according to the Gaussian function) in a first weighted spectral-domain representation and such that signal components having associated a second predetermined direction (which is different from the first predetermined direction)(e.g., a second panning direction) are emphasized over signal components having associated other directions (which are different from the second predetermined direction, and which are, for example, attenuated according to the Gaussian function) in a second weighted spectral-domain representation. Thus, for example, for each predetermined direction, a weighted spectral-domain representation for each signal of the two or more input audio signals can be determined.

According to an embodiment, the audio analyzer is configured to obtain the weighted spectral-domain representations $Y_{i,b,\Psi_{0,j}}(m, k)$ associated with an input audio signal or combination of input audio signals designated by index i, a spectral band designated by index b, a direction designated by index $\Psi_{0,j}$, a time (or time frame) designated with a time index m, and a spectral bin designated by a spectral bin index k according to $Y_{i,b,\Psi_{0,j}}(m, k)=X_{i,b}(m, k)\Theta_{\Psi_{0,j}}(m, k)$. $X_{i,b}(m, k)$ designates a spectral-domain representation associated with an input audio signal or combination of input audio signals designated by index i (e.g., i=L or i=R or i=DM; wherein L=left, R=right and DM=downmix), a spectral band designated by index b, a time (or time frame) designated with a time index m, and a spectral bin designated by a spectral bin index k and $\Theta_{\Psi_{0,j}}(m, k)$ designates the direction-dependent weighting (e.g., a weighting function like a Gaussian function) associated with a direction designated by index $\Psi_{0,j}$, a time (or time frame) designated with a time index m, and a spectral bin designated by a spectral bin index k. Thus, the weighted spectral-domain representations can be determined, for example, by weighting the spectral-domain representation associated with an input audio signal or a combination of input audio signals by the direction-dependent weighting.

According to an embodiment, the audio analyzer is configured to determine an average over a plurality of band loudness values (e.g., associated with different frequency bands but the same direction, e.g. associated with a predetermined direction and/or directions in a vicinity of the predetermined direction), in order to obtain a combined loudness value (e.g., associated with a given direction or panning direction, i.e. the predetermined direction). The combined loudness value can represent the loudness information obtained by the audio analyzer as the analysis result. Alternatively, the loudness information obtained by the audio analyzer as the analysis result can comprise the combined loudness value. Thus, the loudness information can comprise combined loudness values associated with different predetermined directions, out of which a directional loudness map can be obtained.

According to an embodiment, the audio analyzer is configured to obtain band loudness values for a plurality of spectral bands (for example, ERB-bands) on the basis of a weighted combined spectral-domain representation representing a plurality of input audio signals (e.g., a combination of the two or more input audio signals)(e.g., wherein the weighted combined spectral representation may combine the weighted spectral-domain representations associated with the input audio signals). Additionally the audio analyzer is configured to obtain, as the analysis result, a plurality of combined loudness values (covering a plurality of spectral bands; for example, in the form of a single scalar value) on the basis of the obtained band loudness values for a plurality of different directions (or panning directions). Thus, for example, the audio analyzer is configured to average over all band loudness values associated with the same direction to obtain a combined loudness value associated with this direction (e.g., resulting in a plurality of combined loudness values). The audio analyzer is, for example, configured to obtain for each predetermined direction a combined loudness value.

According to an embodiment, the audio analyzer is configured to compute a mean of squared spectral values of the weighted combined spectral-domain representation over spectral values of a frequency band (or over spectral bins of a frequency band), and to apply an exponentiation having an exponent between 0 and ½ (and smaller than or equal to ⅓ or ¼) to the mean of squared spectral values, in order to determine the band loudness values (associated with a respective frequency band).

According to an embodiment, the audio analyzer is configured to obtain the band loudness values $L_{b,\Psi_{0,j}}(m)$ associated with a spectral band designated with index b, a direction designated with index $\Psi_{0,j}$, a time (or time frame) designated with a time index m according to $$L_{b,\Psi_{0,j}}(m) = \left(\frac{1}{K_b}\sum_{k\in b} Y_{DM,b,\Psi_{0,j}}(m, k)^2\right)^{0.25}.$$

The Factor $K_b$ designates a number of spectral bins in a frequency band having frequency band index b. The variable k is a running variable and designates spectral bins in the frequency band having frequency band index b, wherein b designates a spectral band. $Y_{DM,b,\Psi_{0,j}}(m, k)$ designates a weighted combined spectral-domain representation associated with a spectral band designated with index b, a direction designated by index $\Psi_{0,j}$, a time (or time frame) designated with a time index m and a spectral bin designated by a spectral bin index k.

According to an embodiment, the audio analyzer is configured to obtain a plurality of combined loudness values $L(m, \Psi_{0,j})$ associated with a direction designated with index $\Psi_{0,j}$ and a time (or time frame) designated with a time index m according to $$L(m, \Psi_{0,j}) = \frac{1}{B}\sum_{\forall b} L_{b,\Psi_{0,j}}(m).$$

The Factor B designates a total number of spectral bands b and $L_{b,\Psi_{0,j}}(m)$ designates band loudness values associated with a spectral band designated with index b, a direction designated with index $\Psi_{0,j}$ and a time (or time frame) designated with a time index m.

According to an embodiment, the audio analyzer is configured to allocate loudness contributions to histogram bins associated with different directions (e.g., second different directions, as described above; e.g. predetermined directions) in dependence on the directional information, in order to obtain the analysis result. The loudness contributions are, for example, represented by the plurality of combined loudness values or by the plurality of band loudness values. Thus, for example, the analysis result comprises a directional loudness map, defined by the histogram bins. Each histogram bin is, for example, associated with one of the predetermined directions.

According to an embodiment, the audio analyzer is configured to obtain loudness information associated with spectral bins on the basis of the spectral-domain representations (e.g., to obtain a combined loudness per T/F tile). The audio analyzer is configured to add a loudness contribution to one or more histogram bins on the basis of a loudness information associated with a given spectral bin. A loudness contribution associated with a given spectral bin is, for example, added to different histogram bins with a different weighting (e.g., depending on the direction corresponding to the histogram bin). A selection, to which one or more histogram bins the loudness contribution is made (i.e. is added), is based on a determination of the directional information (i.e. of the extracted direction value) for a given spectral bin. According to an embodiment, each histogram bin can represent a time-direction tile. Thus, a histogram bin is, for example, associated with a loudness of the combined two or more input audio signals at a certain time frame and direction. For the determination of the directional information for a given spectral bin, for example, level information for corresponding spectral bins of the spectral-domain representations of the two or more input audio signals are analyzed.

According to an embodiment, the audio analyzer is configured to add loudness contributions to a plurality of histogram bins on the basis of a loudness information associated with a given spectral bin, such that a largest contribution (e.g., main contribution) is added to a histogram bin associated with a direction that corresponds to the directional information associated with the given spectral bin (i.e. of the extracted direction value), and such that reduced contributions (e.g., comparatively smaller than the largest contribution or main contribution) are added to one or more histogram bins associated with further directions (e.g., in a neighborhood of the direction that corresponds to the directional information associated with the given spectral bin). As described above, each histogram bin can represent a time-direction tile. According to an embodiment, a plurality of histogram bins can define a directional loudness map, wherein the directional loudness map defines, for example, loudness for different directions over time for a combination of the two or more input audio signals.

According to an embodiment, the audio analyzer is configured to obtain directional information on the basis of an audio content of the two or more input audio signals. The directional information comprises, for example, directions of components or sources in the audio content of the two or more input audio signals. In other words, the directional information can comprise panning directions or panning indices of sources in the stereo mix of the two or more input audio signals.

According to an embodiment, the audio analyzer is configured to obtain directional information on the basis of an analysis of an amplitude panning of audio content. Additionally or alternatively the audio analyzer is configured to obtain directional information on the basis of an analysis of a phase relationship and/or a time delay and/or correlation between audio contents of two or more input audio signals. Additionally or alternatively the audio analyzer is configured to obtain directional information on the basis of an identification of widened (e.g., decorrelated and/or panned) sources. The analysis of the amplitude panning of the audio content can comprise an analysis of a level correlation between corresponding spectral bins of the spectral-domain representations of the two or more input audio signals (e.g., corresponding spectral bins with the same level can be associated with a direction in a middle of two loudspeaker transmitting one of two input audio signals each). Similarly, the analysis of the phase relationship and/or the time delay and/or the correlation between audio contents can be performed. Thus, for example, the phase relationship and/or the time delay and/or the correlation between audio contents is analyzed for corresponding spectral bins of the spectral-domain representations of the two or more input audio signals. Additionally or alternatively, aside from inter-channel level/time difference comparisons, there is a further (e.g. third) method for directional information estimation. This method consists in matching the spectral information of an incoming sound to pre-measured "template spectral responses/filters" of Head Related Transfer Functions (HRF) in different directions.

For example: at a certain time/frequency tile, the spectral envelope of the incoming signal at 35 degree from left and right channels might closely match the shape of the linear filters for the left and right ears measured at an angle of 35 degrees. Then, an optimization algorithm or pattern matching procedure will assign the direction of arrival of the sound to be 35°. More information can be found here: https://iem.kug.ac.at/fileadmin/media/iem/projects/2011/baumgartner_robert.pdf (see, for example, Chapter 2). This method has the advantage of allowing to estimate the incoming direction of elevated sound sources (sagittal plane) in addition to horizontal sources. This method is based, for example, on spectral level comparisons.

According to an embodiment, the audio analyzer is configured to spread loudness information to a plurality of directions (e.g., beyond a direction indicated by the directional information) according to a spreading rule (for example, a Gaussian spreading rule, or a limited, discrete spreading rule). This means, for example, that a loudness information corresponding to a certain spectral bin, associated with a certain directional information, can also contribute to neighboring directions (of the certain direction of the spectral bin) according to the spreading rule. According to an embodiment, the spreading rule can comprise or correspond to a direction-dependent weighting, wherein the direction-dependent weighting in this case, for example, defines differently weighted contributions of the loudness information of a certain spectral bin to the plurality of directions.

An embodiment according to this invention is related to an audio similarity evaluator, which is configured to obtain a first loudness information (e.g., a directional loudness map; e.g., one or more combined loudness values) associated with different (e.g., panning) directions on the basis of a first set of two or more input audio signals. The audio similarity evaluator is configured to compare the first loudness information with a second (e.g. corresponding) loudness information (e.g., reference loudness information, reference directional loudness map and/or reference combined loudness value) associated with the different (e.g., panning) directions and with a set of two or more reference audio signals, in order to obtain a similarity information (e.g., a "Model Output Variable" (MOV); for example, a single scalar value) describing a similarity between the first set of two or more input audio signals and the set of two or more reference audio signals (or representing, for example, a quality of the first set of two or more input audio signals when compared to the set of two or more reference audios signals).

This embodiment is based on the idea that it is efficient and improves the accuracy of an audio quality indication (e.g., the similarity information), to compare directional loudness information (e.g., the first loudness information) of two or more input audio signals with a directional loudness information (e.g., the second loudness information) of two or more reference audio signals. The usage of loudness information associated with different directions is especially advantageous with regard to stereo mixes or multichannel mixes, because the different directions can be associated, for example, with directions (i. e. panning directions, panning indices) of sources (i. e. audio components) in the mixes. Thus effectively the quality degradation of a processed combination of the two or more input audio signals can be measured. Another advantage is, that non-waveform preserving audio processing such as bandwidth extension (BWE) does only minimally or not influence the similarity information, since the loudness information for the stereo image or multichannel image is, for example, determined in a Short-Time Fourier Transform (STFT) domain. Moreover the similarity information based on loudness information can easily be complemented with monaural/timbral similarity information to improve a perceptual prediction for the two or more input audio signals. Thus only one similarity information additional to monaural quality descriptors is, for example, used, which can reduce a number of independent and relevant signal features used by an objective audio quality measurement system with regard to known systems only using monaural quality descriptors. Using fewer features for the same performance will reduce the risk of over-fitting and indicates their higher perceptual relevance.

According to an embodiment, the audio similarity evaluator is configured to obtain the first loudness information (e.g., a directional loudness map) such that the first loudness information (for example, a vector comprising combined loudness values for a plurality of predetermined directions) comprises a plurality of combined loudness values associated with the first set of two or more input audio signals and associated with respective predetermined directions, wherein the combined loudness values of the first loudness information describe loudness of signal components of the first set of two or more input audio signals associated with the respective predetermined directions (wherein, for example, each combined loudness value is associated with a different direction). Thus, for example, each combined loudness value can be represented by a vector defining, for example, a change of loudness over time for a certain direction. This means, for example, that one combined loudness value can comprise one or more loudness values associated with consecutive time frames. The predetermined directions can be represented by panning directions/panning indices of the signal components of the first set of two or more input audio signals. Thus, for example, the predetermined directions can be predefined by amplitude leather panning techniques used for a positioning of directional signals in a stereo or multichannel mix represented by the first set of two or more input audio signals.

According to an embodiment, the audio similarity evaluator is configured to obtain the first loudness information (e.g., directional loudness map) such that the first loudness information is associated with combinations of a plurality of weighted spectral-domain representations (e.g., of each audio signal) of the first set of two or more input audio signals associated with respective predetermined directions (e.g., each combined loudness value and/or weighted spectral-domain representation is associated with a different predetermined direction). This means, for example, that for each input audio signal at least one weighted spectral-domain representation is calculated and that then all the weighted spectral-domain representations associated with the same predetermined direction are combined. Thus, the first loudness information represents, for example, loudness values associated with multiple spectral bins associated with the same predetermined direction. At least some of the multiple spectral bins are, for example, weighted differently than other bins of the multiple spectral bins.

According to an embodiment, the audio similarity evaluator is configured to determine a difference between the second loudness information and the first loudness information to obtain a residual loudness information. According to an embodiment, the residual loudness information can represent the similarity information, or the similarity information can be determined based on the residual loudness information. The residual loudness information is, for example, understood as a distance measure between the second loudness information and the first loudness information. Thus, the residual loudness information can be understood as a directional loudness distance (e.g., DirLoudDist). With this feature very efficiently a quality of the two or more input audio signals associated with the first loudness information can be determined.

According to an embodiment, the audio similarity evaluator is configured to determine a value (e.g., a single scalar value) that quantifies the difference over a plurality of directions (and optionally also over time, for example, over a plurality of frames). The audio similarity evaluator is, for example, configured to determine an average of a magnitude of the residual loudness information over all directions (e.g. panning directions) and over time as the value that quantifies the difference. Thereby a single number termed Model Output Variable (MOV) is, for example, determined, wherein the MOV defines a similarity of the first set of two or more input audio signals with respect to the set of two or more reference audio signals.

According to an embodiment, the audio similarity evaluator is configured to obtain the first loudness information and/or the second loudness information (e.g. as directional loudness maps) using an audio analyzer according to one of the embodiments described herein.

According to an embodiment, the audio similarity evaluator is configured to obtain a direction component (e.g., direction information) used for obtaining the loudness information associated with different directions (e.g., one or more directional loudness maps) using metadata representing position information of loudspeakers associated with the input audio signals. The different directions are not necessarily associated with the direction component. According to an embodiment, the direction component is associated with the two or more input audio signals. Thus, the direction component can represent a loudspeaker identifier or a channel identifier dedicated, for example, to different directions or positions of a loudspeaker. On the contrary, the different directions, with which the loudness information is associated, can represent directions or positions of audio components in an audio scene realized by the two or more input audio signals. Alternatively, the different directions can represent equally spaced directions or positions in a position interval (e.g., [−1; 1], wherein −1 represents signals panned fully to the left and +1 represents signals panned fully to the right) in which the audio scene realized by the two or more input audio signals can unfold. According to an embodiment, the different directions can be associated with the herein described predetermined directions. The direction component is, for example, associated with boundary points of the position interval.

An embodiment according to this invention is related to an audio encoder for encoding an input audio content comprising one or more input audio signals (a plurality of input audio signals). The audio encoder is configured to provide one or more encoded (e.g., quantized and then losslessly encoded) audio signals (e.g., encoded spectral-domain representations) on the basis of one or more input audio signals (e.g., left signal and right signal), or one or more signals derived therefrom (e.g., mid signal or downmix signal and side-signal or difference signal). Additionally the audio encoder is configured to adapt encoding parameters (e.g., for the provision of the one or more encoded audio signals; e.g., quantization parameters) in dependence on one or more directional loudness maps which represent loudness information associated with a plurality of different directions (e.g., panning directions) of the one or more signals to be encoded (e.g., in dependence on contributions of individual directional loudness maps of the one or more signals to be quantized to an overall directional loudness map, e.g., associated with multiple input audio signals (e.g., with each signal of the one or more input audio signals))

Audio content comprising one input audio signal can be associated with a monaural audio scene, an audio content comprising two input audio signals can be associated with a stereo audio scene and an audio content comprising three or more input audio signals can be associated with a multi-channel audio scene. According to an embodiment, the audio encoder provides for each input audio signal a separate encoded audio signal as output signal or provides one combined output signal comprising two or more encoded audio signals of two or more input audio signals.

The directional loudness maps (i.e. DirLoudMap), on which the adaptation of the encoding parameters depends on, can vary for different audio content. Thus for a monaural audio scene the directional loudness map, for example, comprises only for one direction loudness values (based on the only input audio signal) deviating from zero and comprises, for example, for all other directions loudness values, which equal zero. For a stereo audio scene the directional loudness map represents, for example, loudness information associated with both input audio signals, wherein the different directions are, for example, associated with positions or directions of audio components of the two input audio signals. In the case of three or more input audio signals the adaptation of the encoding parameters depends, for example, on three or more directional loudness maps, wherein each directional loudness map corresponds to a loudness information associated with two of the three input audio signals (e.g., a first DirLoudMap can correspond to a first and a second input audio signal; a second DirLoudMap can correspond to the first and a third input audio signal; and a third DirLoudMap can correspond to the second and the third input audio signal). As described with regard to the stereo audio scene the different directions for the directional loudness maps are in case of multichannel audio scene, for example, associated with positions or directions of audio components of the multiple input audio signals.

The embodiments of this audio encoder are based on the idea that it is efficient and improves the accuracy of the encoding, to depend an adaptation of encoding parameters on one or more directional loudness maps. The encoding parameters are, for example, adapted in dependence on a difference of the directional loudness map associated to the one or more input audio signals and a directional loudness map associated to one or more reference audio signals. According to an embodiment, overall directional loudness maps, of a combination of all input audio signals and of a combination of all reference audio signals, are compared or alternatively directional loudness maps of individual or paired signals are compared to an overall directional loudness map of all input audio signals (e.g., more than one difference can be determined). The difference between the DirLoudMaps can represent a quality measure for the encoding. Thus the encoding parameters are, for example, adapted such that the difference is minimized, to ensure a high quality encoding of the audio content or the encoding parameters are adapted such that only signals of the audio content, corresponding to a difference under a certain threshold, are encoded, to reduce a complexity of the encoding. Alternatively the encoding parameters are, for example, adapted in dependence on a ratio (e.g., contributions) of individual signals DirLoudMaps or of signal pairs DirLoudMaps to an overall DirLoudMap (e.g., a DirLoudMap associated to a combination of all input audio signals). This ratio can similarly to the difference indicate a similarity between individual signals or signal pairs of the audio content or between individual signals and a combination of all signals of the audio content or signal pairs and a combination of all signals of the audio content, resulting in a high quality encoding and/or a reduction of a complexity of the encoding.

According to an embodiment, the audio encoder is configured to adapt a bit distribution between the one or more signals and/or parameters to be encoded (or, for example, between two or more signals and/or parameters to be encoded)(e.g., between a residual signal and a downmix signal, or between a left channel signal and a right channel signal, or between two or more signals provided by a joint encoding of multiple signals, or between a signal and parameters provided by a joint encoding of multiple signals) in dependence on contributions of individual directional loudness maps of the one or more signals and/or parameters to be encoded to an overall directional loudness map. The adaptation of the bit distribution is, for example, understood as an adaptation of the encoding parameters by the audio encoder. The bit distribution can also be understood as a bitrate distribution. The bit distribution is, for example, adapted by controlling a quantization precision of the one or more input audio signals of the audio encoder. According to an embodiment, a high contribution can indicate a high relevance of the corresponding input audio signal or pair of input audio signals for a high quality perception of an audio scene created by the audio content. Thus, for example, the audio encoder can be configured to provide many bits for the signals with a high contribution and just few or no bits for signals with a low contribution. Thus, an efficient and high-quality encoding can be achieved.

According to an embodiment, the audio encoder is configured to disable encoding of a given one of the signals to be encoded (e.g., of a residual signal), when contributions of an individual directional loudness map of the given one of the signals to be encoded (e.g., of the residual signal) to an overall directional loudness map is below a (e.g., predetermined) threshold. The encoding is, e.g., disabled if an average ratio or a ratio in a direction of maximum relative contribution is below the threshold. Alternatively or additionally contributions of directional loudness maps of signal pairs (e.g., individual directional loudness maps of signal pairs (e.g., as signal pairs a combination of two signals can be understood; e.g., As signal pairs a combination of signals associated with different channels and/or residual signals and/or downmix signals can be understood)) to the overall directional loudness map can be used by the encoder to disable the encoding of the given one of the signals (e.g., for three signals to be encoded: As described above three directional loudness maps of signal pairs can be analyzed with respect to the overall directional loudness map; Thus the encoder can be configured to determine the signal pair with the highest contribution to the overall directional loudness map and encode only this two signals and to disable the encoding for the remaining signal). The disabling of an encoding of a signal is, for example, understood as an adaptation of encoding parameters. Thus, signals not highly relevant for a perception of the audio content by a listener don't need to be encoded, which results in a very efficient encoding. According to an embodiment, the threshold can be set to smaller than or equal to 5%, 10%, 15%, 20% or 50% of the loudness information of the overall directional loudness map.

According to an embodiment, the audio encoder is configured to adapt a quantization precision of the one or more signals to be encoded (e.g., between a residual signal and a downmix signal) in dependence on contributions of individual directional loudness maps of the (respective) one or more signals to be encoded to an overall directional loudness map. Alternatively or additionally, similarly to the above described disabling, contributions of directional loudness maps of signal pairs to the overall directional loudness map can be used by the encoder to adapt a quantization precision of the one or more signals to be encoded. The adaptation of the quantization precision can be understood as an example for adapting the encoding parameters by the audio encoder.

According to an embodiment, the audio encoder is configured to quantize spectral-domain representations of the one or more input audio signals (e.g., left signal and right signal; e.g. The one or more input audio signals are, for example, corresponding to a plurality of different channels. Thus, the audio encoder receives, for example, a multichannel input), or of the one or more signals derived therefrom (e.g., mid signal or downmix signal and side-signal or difference signal) using one or more quantization parameters (e.g., scale factors or parameters describing which quantization accuracies or quantization step should be applied to which spectral bins or frequency bands of the one or more signals to be quantized)(wherein the quantization parameters describe, for example, an allocation of bits to different signals to be quantized and/or to different frequency bands), to obtain one or more quantized spectral-domain representations. The audio encoder is configured to adjust the one or more quantization parameters (e.g., in order to adapt a bit distribution between the one or more signals to be encoded) in dependence on one or more directional loudness maps which represent loudness information associated with a plurality of different directions (e.g., panning directions) of the one or more signals to be quantized, to adapt the provision of the one or more encoded audio signals (e.g., in dependence on contributions of individual directional loudness maps of the one or more signals to be quantized to an overall directional loudness map, e.g., associated with multiple input audio signals (e.g., with each signal of the one or more input audio signals)). Additionally the audio encoder is configured to encode the one or more quantized spectral-domain representations, in order to obtain the one or more encoded audio signals.

According to an embodiment, the audio encoder is configured to adjust the one or more quantization parameters in dependence on contributions of individual directional loudness maps of the one or more signals to be quantized to an overall directional loudness map.

According to an embodiment, the audio encoder is configured to determine an overall directional loudness map on the basis of the input audio signals, such that the overall directional loudness map represents loudness information associated with the different directions (e.g., of audio components; e.g., panning directions) of an audio scene represented (or to be represented, e.g., after a decoder-sided rendering) by the input audio signals (possibly in combination with knowledge or side information regarding positions of loudspeakers and/or knowledge or side information describing positions of audio objects). The overall directional loudness map represents, e.g., loudness information associated with (e.g. a combination of) all input audio signals.

According to an embodiment, the one or more signals to be quantized are associated (e.g., in a fixed, non-signal-dependent manner) with different directions (e.g., first different directions) or are associated with different loudspeakers (e.g., at different predefined loudspeaker positions) or are associated with different audio objects (e.g., with audio objects to be rendered at different positions, for example, in accordance with an object rendering information; e.g. a panning index).

According to an embodiment, the signals to be quantized comprise components (for example, a mid-signal and a side-signal of a mid-side stereo coding) of a joint multi-signal coding of two or more input audio signals.

According to an embodiment, the audio encoder is configured to estimate a contribution of a residual signal of the joint multi-signal coding to the overall directional loudness map, and to adjust the one or more quantization parameters on dependence thereon. The estimated contribution is, for example, represented by a contribution of a directional loudness map of the residual signal to the overall directional loudness map.

According to an embodiment, the audio encoder is configured to adapt a bit distribution between the one or more signals and/or parameters to be encoded individually for different spectral bins or individually for different frequency bands. Additionally or alternatively the audio encoder is configured to adapt a quantization precision of the one or more signals to be encoded individually for different spectral bins or individually for different frequency bands. With the adaptation of the quantization precision, the audio encoder is, for example configured to also adapt the bit distribution. Thus, the audio encoder is, for example, configured to adapt the bit distribution between the one or more input audio signals of the audio content to be encoded by the audio encoder. Additionally or alternatively, the bit distribution between parameters to be encoded is adapted. The adaptation of the bit distribution can be performed by the audio encoder individually for different spectral bins or individually for different frequency bands. According to an embodiment, it is also possible that the bit distribution between signals and parameters is adapted. In other words, each signal of the one or more signals to be encoded by the audio encoder can comprise an individual bit distribution for different spectral bins and/or different frequency bands (e.g., of the corresponding signal) and this individual bit distribution for each of the one or more signals to be encoded can be adapted by the audio encoder.

According to an embodiment, the audio encoder is configured to adapt a bit distribution between the one or more signals and/or parameters to be encoded (for example, individually per spectral bin or per frequency band) in dependence on an evaluation of a spatial masking between two or more signals to be encoded. Furthermore the audio encoder is configured to evaluate the spatial masking on the basis of the directional loudness maps associated with the two or more signals to be encoded. This is, for example, based on the idea, that the directional loudness maps are spatially and/or temporally resolved. Thus, for example, only few or no bits are spent for masked signals and more bits (e.g., more than for the masked signals) are spent for the encoding of relevant signals or signal components (e.g., signals or signal components not masked by other signals or signal components). According to an embodiment, the spatial masking depends, for example, on a level associated with spectral bins and/or frequency bands of the two or more signals to be encoded, on a spatial distance between the spectral bins and/or frequency bands and/or on a temporal distance between the spectral bins and/or frequency bands). The directional loudness maps can directly provide loudness information for individual spectral bins and/or frequency bands for individual signals or a combination of signals (e.g., signal pairs), resulting in an efficient analysis of spatial masking by the encoder.

According to an embodiment, the audio encoder is configured to evaluate a masking effect of a loudness contribution associated with a first direction of a first signal to be encoded onto a loudness contribution associated with a second direction (which is different from the first direction) of a second signal to be encoded (wherein, for example, a masking effect reduces with increasing difference of the angles). The masking effect defines, for example, a relevance of the spatial masking. This means, for example, that for loudness contributions, associated with a masking effect lower than a threshold, more bits are spent than for signals (e.g., spatially masked signals) associated with a masking effect higher than the threshold. According to an embodiment, the threshold can be defined as 20%, 50%, 60%, 70% or 75% masking of a total masking. This means, for example, that a masking effect of neighboring spectral bins or frequency bands are evaluated depending on the loudness information of directional loudness maps.

According to an embodiment, the audio encoder comprises an audio analyzer according to one of the herein described embodiments, wherein the loudness information (e.g., "directional loudness map") associated with different directions forms the directional loudness map.

According to an embodiment the audio encoder is configured to adapt a noise introduced by the encoder (e.g., a quantization noise) in dependence on the one or more directional loudness maps. Thus, for example, the one or more directional loudness maps of the one or more signals to be encoded can be compared by the encoder with one or more directional loudness maps of one or more reference signals. Based on this comparison the audio encoder is, for example, configured to evaluate differences indicating an introduced noise. The noise can be adapted by an adaptation of a quantization performed by the audio encoder.

According to an embodiment, the audio encoder is configured to use a deviation between a directional loudness map, which is associated with a given un-encoded input audio signal (or with a given un-encoded input audio signal pair), and a directional loudness map achievable by an encoded version of the given input audio signal (or of the given input audio signal pair), as a criterion (e.g., target criterion) for the adaptation of the provision of the given encoded audio signal (or of the given encoded audio signal pair). The following examples are only described for one given non-encoded input audio signal but it is clear, that they are also applicable for a given un-encoded input audio signal pair. The directional loudness map associated with the given non-encoded input audio signal can be associated or can represent a reference directional loudness map. Thus, a deviation between the reference directional loudness map and the directional loudness map of the encoded version of the given input audio signal can indicate noise introduced by the encoder. To reduce the noise the audio encoder can be configured to adapt encoding parameters to reduce the deviation in order to provide a high quality encoded audio signal. This is, for example, realized by a feedback loop controlling each time the deviation. Thus the encoding parameters are adapted until the deviation is below a predefined threshold. According to an embodiment, the threshold can be defined as 5%, 10%, 15%, 20% or 25% deviation. Alternatively, the adaptation by the encoder is performed using a neural network (e.g., achieving a feed forward loop). With the neural network the directional loudness map for the encoded version of the given input audio signal can be estimated without directly determining it by the audio encoder or the audio analyzer. Thus, a very fast and high precision audio coding can be realized.

According to an embodiment, the audio encoder is configured to activate and deactivate a joint coding tool (which, for example, jointly encodes two or more of the input audio signals, or signals derived therefrom)(for example, to make a M/S (mid/side-signal) on/off decision) in dependence on one or more directional loudness maps which represent loudness information associated with a plurality of different directions of the one or more signals to be encoded. To activate or deactivate the joint coding tool, the audio encoder can be configured to determine a contribution of a directional loudness map of each signal or each candidate signal pair to an overall directional loudness map of an overall scene. According to an embodiment, a contribution higher than a threshold (e.g., a contribution of at least 10% or at least 20% or at least 30% or at least 50% indicates if a joint coding of input audio signals is reasonable. For example, the threshold may be comparatively low for this use case (e.g. lower than in other use cases), to primarily filter out irrelevant pairs. Based on the directional loudness maps the audio encoder can check if a joint coding of signals results in a more efficient and/or view bit high resolution encoding.

According to an embodiment, the audio encoder is configured to determine one or more parameters of a joint coding tool (which, e.g., jointly encode two or more of the input audio signals, or signals derived therefrom) in dependence on one or more directional loudness maps, which represent loudness information associated with a plurality of different directions of the one or more signals to be encoded (for example, to control a smoothing of frequency dependent prediction factors; for example, to set parameters of an "intensity stereo" joint coding tool). The one or more directional loudness information maps comprise, for example, information about loudness at predetermined directions and time frames. Thus, for example, the audio encoder is configured, to determine the one or more parameters for a current time frame based on loudness information of previous time frames. Based on the directional loudness maps, masking effects can be analyzed very efficiently and can be indicated by the one or more parameters, whereby frequency dependent prediction factors can be determined based on the one or more parameters, such that predicted sample values are close to original sample values (associated with the signal to be encoded). Thus it is possible for the encoder to determine frequency dependent prediction factors representing an approximation of a masking threshold rather than the signal to be encoded. Furthermore the directional loudness maps are, for example, based on a psychoacoustic model, whereby a determination of the frequency dependent prediction factors based on the one or more parameters is improved further and can result in a highly accurate prediction. Alternatively the parameters of the joint coding tool define, for example, which signals or signal pairs should be coded jointly by the audio encoder. The audio encoder is, for example, configured to base the determination of the one or more parameters on contributions of each directional loudness map associated with a signal to be encoded or a signal pair, of signals to be encoded, to an overall directional loudness map. Thus, for example, the one or more parameters indicate individual signals and/or signal pairs with the highest contribution or a contribution equal to or higher than a threshold (see, for example, the threshold definition above). Based on the one or more parameters the audio encoder is, for example, configured to encode jointly the signals indicated by the one or more parameters. Alternatively, for example, signal pairs having a high proximity/similarity in the respective directional loudness map can be indicated by the one or more parameters of the joint coding tool. The chosen signal pairs are, for example, jointly represented by a downmix. Thus bits needed for the encoding are minimized or reduced, since the downmix signal or a residual signal of the signals to be encoded jointly is very small.

According to an embodiment, the audio encoder is configured to determine or estimate an influence of a variation of one or more control parameters controlling the provision of the one or more encoded audio signals onto a directional loudness map of one or more encoded signals, and to adjust the one or more control parameters in dependence on the determination or estimation of the influence. The influence of the control parameters onto the directional loudness map of one or more encoded signals can comprise a measure for induced noise (e.g., the control parameters regarding a quantization position can be adjusted) by the encoding of the audio encoder, a measure for audio distortions and/or a measure for a falloff in quality of a perception of a listener. According to an embodiment, the control parameters can be represented by the encoding parameters or the encoding parameters can comprise the control parameters.

According to an embodiment, the audio encoder is configured to obtain a direction component (e.g., direction information) used for obtaining the one or more directional loudness maps using metadata representing position information of loudspeakers associated with the input audio signals (this concept can also be used in the other audio encoders). The direction component is, for example, represented by the herein described first different directions which are, for example, associated with different channels or loudspeakers associated with the input audio signals. According to an embodiment, based on the direction component, the obtained one or more directional loudness maps can be associated to an input audio signal and/or a signal pair of the input audio signals with the same direction component. Thus, for example, a directional loudness map can have the index L and an input audio signal can have the index L, wherein the L indicates a left channel or a signal for a left loudspeaker. Alternatively, the direction component can be represented by a vector, like (1, 3), which indicates a combination of input audio signals of a first channel and a third channel. Thus, the directional loudness map with the index (1, 3) can be associated with this signal pair. According to an embodiment, each channel can be associated with a different loudspeaker.

An embodiment according to this invention is related to an audio encoder for encoding an input audio content comprising one or more input audio signals (a plurality of input audio signals). The audio encoder is configured to provide one or more encoded (e.g., quantized and then losslessly encoded) audio signals (e.g., encoded spectral-domain representations) on the basis of two or more input audio signals (e.g., left signal and right signal), or on the basis of two or more signals derived therefrom, using a joint encoding of two or more signals to be encoded jointly (e.g., using a mid signal or downmix signal and a side-signal or difference signal). Additionally the audio encoder is configured to select signals to be encoded jointly out of a plurality of candidate signals or out of a plurality of pairs of candidate signals (e.g., out of the two or more input audio signals or out of the two or more signals derived therefrom) in dependence on directional loudness maps which represent loudness information associated with a plurality of different directions (e.g., panning directions) of the candidate signals or of the pairs of candidate signals (e.g., in dependence on contributions of individual directional loudness maps of the candidate signals to an overall directional loudness map, e.g., associated with multiple input audio signals (e.g., with each signal of the one or more input audio signals), or in dependence on contributions of directional loudness maps of pairs of candidate signals to an overall directional loudness map (e.g., associated with all input audio signals)).

According to an embodiment, the audio encoder can be configured to activate and deactivate the joint encoding. Thus, for example, if the audio content comprises only one input audio signal, then the joint encoding is deactivated and it is only activated, if the audio content comprises two or more input audio signals. Thus it is possible to encode with the audio encoder a monaural audio content, a stereo audio content and/or an audio content comprising three or more input audio signals (i.e. a multichannel audio content). According to an embodiment, the audio encoder provides for each input audio signal a separate encoded audio signal as output signal (e.g., suitable for audio content comprising only one single input audio signal) or provides one combined output signal (e.g., signals encoded jointly) comprising two or more encoded audio signals of two or more input audio signals.

The embodiments of this audio encoder are based on the idea that it is efficient and improves the accuracy of the encoding, to base the joint encoding on directional loudness maps. The usage of directional loudness maps is advantageous, because they can indicate a perception of the audio content by a listener and thus improve the audio quality of the encoded audio content, especially in context with a joint encoding. It is, for example, possible to optimize the choice of signal pairs to be encoded jointly by analyzing directional loudness maps. The analysis of directional loudness maps gives, for example, information about signals or signal pairs, which can be neglected (e.g., signals, which have only little influence on a perception of a listener), resulting in a small amount of bits needed for the encoded audio content (e.g., comprising two or more encoded signals) by the audio encoder. This means, for example, that signals with a low contribution of their respective directional loudness map to the overall directional loudness map can be neglected. Alternatively, the analysis can indicate signals which have a high similarity (e.g., signals with similar directional loudness maps), whereby, for example, optimizes residual signals can be obtained by the joint encoding.

According to an embodiment, the audio encoder is configured to select signals to be encoded jointly out of a plurality of candidate signals or out of a plurality of pairs of candidate signals in dependence on contributions of individual directional loudness maps of the candidate signals to an overall directional loudness map or in dependence on contributions of directional loudness maps of the pairs of candidate signals to an overall directional loudness map (e.g., associated with multiple input audio signals (e.g., with each signal of the one or more input audio signals))(or associated with an overall (audio) scene, e.g., represented by the input audio signals). The overall directional loudness map represents, for example, loudness information associated with the different directions (e.g., of audio components) of an audio scene represented (or to be represented, for example, after a decoder-sided rendering) by the input audio signals (possibly in combination with knowledge or side information regarding positions of loudspeakers and/or knowledge or side information describing positions of audio objects).

According to an embodiment, the audio encoder is configured to determine a contribution of pairs of candidate signals to the overall directional loudness map. Additionally the audio encoder is configured to choose one or more pairs of candidate signals having a highest contribution to the overall directional loudness map for a joint encoding or the audio encoder is configured to choose one or more pairs of candidate signals having a contribution to the overall directional loudness map which is larger than a predetermined threshold (e.g., a contribution of at least 60%, 70%, 80% or 90%) for a joint encoding. Regarding the highest contribution it is possible that only one pair of candidate signals has the highest contribution but it is also possible that more than one pair of candidate signals have the same contribution, which represents the highest contribution, or more than one pair of candidate signals have similar contributions within small variances of the highest contribution. Thus the audio encoder is, for example, configured to select more than one signal or signal pair for the joint encoding. With the features described in this embodiment it is possible to find relevant signal pairs for an improved joint encoding and to discard signals or signal pairs, which don't influence a perception of the encoded audio content by a listener in a high amount.

According to an embodiment, the audio encoder is configured to determine individual directional loudness maps of two or more candidate signals (e.g., directional loudness maps associated with signal pairs). Additionally the audio encoder is configured to compare the individual directional loudness maps of the two or more candidate signals and to select two or more of the candidate signals for a joint encoding in dependence on a result of the comparison (for example, such that candidate signals (e.g., signal pairs, signal triplets, signal quadruplets, etc.), individual loudness maps of which comprise a maximum similarity or a similarity which is higher than a similarity threshold, are selected for a joint encoding). Thus, for example, only few or no bits are spent for a residual signal (e.g., a side channel with respect to a mid-channel) maintaining a high quality of the encoded audio content.

According to an embodiment, the audio encoder is configured to determine an overall directional loudness map using a downmixing of the input audio signals and/or using a binauralization of the input audio signals. The downmixing or the binauralization contemplate, for example, the directions (e.g., associations with channels or loudspeaker for the respective input audio signals). The overall directional loudness map can be associated with loudness information corresponding to an audio scene created by all input audio signals.

An embodiment according to this invention is related to an audio encoder for encoding an input audio content comprising one or more input audio signals (a plurality of input audio signals). The audio encoder is configured to provide one or more encoded (e.g., quantized and then losslessly encoded) audio signals (e.g., encoded spectral-domain representations) on the basis of two or more input audio signals (e.g., left signal and right signal), or on the basis of two or more signals derived therefrom. Additionally the audio encoder is configured to determine an overall directional loudness map (for example, a target directional loudness map of a scene) on the basis of the input audio signals, and/or to determine one or more individual directional loudness maps associated with individual input audio signals (or associated with two or more input audio signals, like signal pairs). Furthermore the audio encoder is configured to encode the overall directional loudness map and/or one or more individual directional loudness maps as a side information.

Thus, for example, if the audio content comprises only one input audio signal, the audio encoder is configured to encode only this signal together with the corresponding individual directional loudness map. If the audio content comprises two or more input audio signals, the audio encoder is, for example, configured to encode all or at least some (e.g., one individual signal and one signal pair of three input audio signals) signals individually together with the respective directional loudness map (e.g., with individual directional loudness maps of individual encoded signals and/or with directional loudness maps corresponding to signal pairs or other combinations of more than two signals and/or with overall directional loudness maps associated with all input audio signals). According to an embodiment, the audio encoder is configured to encode all or at least some signals resulting in one encoded audio signal, for example, together with the overall directional loudness map as output (e.g., one combined output signal (e.g., signals encoded jointly) comprising, for example, two or more encoded audio signals of two or more input audio signals). Thus it is possible to encode with the audio encoder a monaural audio content, a stereo audio content and/or an audio content comprising three or more input audio signals (i.e. a multi-channel audio content).

The embodiments of this audio encoder are based on the idea that it is advantageous to determine and encode one or more directional loudness maps, because they can indicate a perception of the audio content by a listener and thus improve the audio quality of the encoded audio content. According to an embodiment, the one or more directional loudness maps can be used by the encoder to improve the encoding, for example, by adapting encoding parameters based on the one or more directional loudness maps. Thus, the encoding of the one or more directional loudness maps is especially advantageous, since they can represent information concerning an influence of the encoding. With the one or more directional loudness maps as side information in the encoded audio content, provided by the audio encoder, a very accurate decoding can be achieved, since information regarding the encoding is provided (e.g., in a data stream) by the audio encoder.

According to an embodiment, the audio encoder is configured to determine the overall directional loudness map on the basis of the input audio signals such that the overall directional loudness map represents loudness information associated with the different directions (e.g., of audio components) of an audio scene, represented (or to be represented, for example, after a decoder-sided rendering) by the input audio signals (possibly in combination with knowledge or side information regarding positions of loudspeakers and/or knowledge or side information describing positions of audio objects). The different directions of the audio scene represent, for example, the herein described second different directions.

According to an embodiment, the audio encoder is configured to encode the overall directional loudness map in the form of a set of (e.g., scalar) values associated with different directions (and with a plurality of frequency bins or frequency bands). If the overall directional loudness map is encoded in the form of a set of values, a value associated with a certain direction can comprise loudness information of a plurality of frequency bins or frequency bands. Alternatively the audio encoder is configured to encode the overall directional loudness map using a center position value (for example, describing an angle or a panning index at which a maximum of the overall directional loudness map occurs for a given frequency bin or frequency band) and a slope information (for example, one or more scalar values describing slopes of the values of the overall directional loudness map in angle direction or panning index direction). The encoding of the overall directional loudness map using the center position value and the slope information can be performed for different given frequency bins or frequency bands. Thus, for example, the overall directional loudness map can comprise information of the center position value and the slope information for more than one frequency bin or frequency band. Alternatively the audio encoder is configured to encode the overall directional loudness map in the form of a polynomial representation or the audio encoder is configured to encode the overall directional loudness map in the form of a spline representation. The encoding of the overall directional loudness map in the form of a polynomial representation or a spline representation is a cost-efficient encoding. Although, these features are described with respect to the overall directional loudness map, this encoding can also be performed for individual directional loudness maps (e.g., of individual signals, of signal pairs and/or of groups of three or more signals). Thus, with these features the directional loudness maps are encoded very efficiently and information, on which the encoding is based on, is provided.

According to an embodiment, the audio encoder is configured to encode (e.g., and transmit or include into an encoded audio representation) one (e.g., only one) downmix signal obtained on the basis of a plurality of input audio signals and an overall directional loudness map. Alternatively the audio encoder is configured to encode (e.g., and transmit or include into an encoded audio representation) a plurality of signals (e.g., the input audio signals or signals derived therefrom), and to encode (e.g., and transmit or include into the encoded audio representation) individual directional loudness maps of a plurality of signals which are encoded (e.g., directional loudness maps of individual signals and/or of signal pairs and/or of groups of three or more signals). Alternatively the audio encoder is configured to encode (e.g., and transmit or include into an encoded audio representation) an overall directional loudness map, a plurality of signals (e.g., the input audio signals or signals derived therefrom) and parameters describing (e.g., relative) contributions of the signals which are encoded to the overall directional loudness map. According to an embodiment, the parameters describing contributions can be represented by scalar values. Thus, it is possible by an audio decoder receiving the encoded audio representation (e.g., an audio content or a data stream comprising the encoded signals, the overall directional loudness map and the parameters) to reconstruct individual directional loudness maps of the signals based on the overall directional loudness map and the parameters describing contributions of the signals.

An embodiment according to this invention is related to an audio decoder for decoding an encoded audio content. The audio decoder is configured to receive an encoded representation of one or more audio signals and to provide a decoded representation of the one or more audio signals (for example, using an AAC-like decoding or using a decoding of entropy-encoded spectral values). Furthermore the audio decoder is configured to receive an encoded directional loudness map information and to decode the encoded directional loudness map information, to obtain one or more (e.g., decoded) directional loudness maps. Additionally the audio decoder is configured to reconstruct an audio scene using the decoded representation of the one or more audio signals and using the one or more directional loudness maps. The audio content can comprise the encoded representation of the one or more audio signals and the encoded directional loudness map information. The encoded directional loudness map information can comprise directional loudness maps of individual signals, of signal pairs and/or of groups of three or more signals.

The embodiment of this audio decoder is based on the idea that it is advantageous to determine and decode one or more directional loudness maps because they can indicate a perception of the audio content by a listener and thus improve the audio quality of the decoded audio content. The audio decoder is, for example, configured to determine a high quality prediction signal based on the one or more directional loudness maps, whereby a residual decoding (or a joint decoding) can be improved. According to an embodiment, the directional loudness maps define loudness information for different directions in the audio scene over time. A loudness information for a certain direction at a certain point of time or in a certain time frame can comprise loudness information of different audio signals or one audio signal at, for example, different frequency bins or frequency bands. Thus, for example, the provision of the decoded representation of the one or more audio signals by the audio decoder can be improved, for example, by adapting the decoding of the encoded representation of the one or more audio signals based on the decoded directional loudness maps. Thus, the reconstructed audio scene is optimized, since the decoded representation of the one or more audio signals can achieve a minimal deviation to original audio signals based on an analysis of the one or more directional loudness maps, resulting in a high quality audio scene. According to an embodiment, the audio decoder can be configured to use the one or more directional loudness maps for an adaptation of decoding parameters to provide efficiently and with high accuracy the decoded representation of the one or more audio signals.

According to an embodiment, the audio decoder is configured to obtain output signals such that one or more directional loudness maps associated with the output signals approximate or equal one or more target directional loudness maps. The one or more target directional loudness maps are based on the one or more decoded directional loudness maps or are equal to the one or more decoded directional loudness maps. The audio decoder is, for example, configured to use an appropriate scaling or combination of the one or more decoded audio signals to obtain the output signals. The target directional loudness maps are, for example, understood as reference directional loudness maps. According to an embodiment, the target directional loudness maps can represent loudness information of one or more audio signals before an encoding and decoding of the audio signals. Alternatively, the target directional loudness maps can represent loudness information associated with the encoded representation of the one or more audio signals (e.g., one or more decoded directional loudness maps). The audio decoder receives, for example, encoding parameters used for the encoding to provide the encoded audio content. The audio decoder is, for example, configured to determine decoding parameters based on the encoding parameters to scale the one or more decoded directional loudness maps to determine the one or more target directional loudness maps. It is also possible that the audio decoder comprises an audio analyzer, which is configured to determine the target directional loudness maps based on the decoded directional loudness maps and the one or more decoded audio signals, wherein, for example, the decoded directional loudness maps are scaled based on the one or more decoded audio signals. Since the one or more target directional loudness maps can be associated with an optimal or optimized audio scene realized by the audio signals, it is advantageous to minimize a deviation between the one or more directional loudness maps associated with output signals and the one or more target directional loudness maps. According to an embodiment, this deviation can be minimized by the audio decoder by adapting decoding parameters or adapting parameters regarding the reconstruction of the audio scene. Thus, with this feature a quality of the output signals is controlled, for example, by a feedback loop, analyzing the one or more directional loudness maps associated with the output signals. The audio decoder is, for example, configured to determine the one or more directional loudness maps of the output signals (e.g. the audio decoder comprises an herein described audio analyzer to determine the directional loudness maps). Thus the audio decoder provides output signals, which are associated with directional loudness maps, which approximate or equal the target directional loudness maps.

According to an embodiment, the audio decoder is configured to receive one (e.g., only one) encoded downmix signal (e.g., obtained on the basis of a plurality of input audio signals) and an overall directional loudness map; or a plurality of encoded audio signals (e.g., the input audio signals of an encoder or signals derived therefrom), and individual directional loudness maps of the plurality of encoded signals; or an overall directional loudness map, a plurality of encoded audio signals (e.g., the input audio signals received by an audio encoder, or signals derived therefrom) and parameters describing (e.g., relative) contributions of the encoded audio signals to the overall directional loudness map. The audio decoder is configured to provide the output signals on the basis thereof.

An embodiment according to this invention is related to a format converter for converting a format of an audio content, which represents an audio scene (e.g., a spatial audio scene), from a first format to a second format. The first format may, for example, comprise a first number of channels or input audio signals and a side information or a spatial side information adapted to the first number of channels or input audio signals, and wherein the second format may, for example, comprise a second number of channels or output audio signals, which may be different from the first number of channels or input audio signals, and a side information or a spatial side information adapted to the second number of channels or output audio signals. Furthermore the format converter is configured to provide a representation of the audio content in the second format on the basis of the representation of the audio content in the first format. Additionally the format converter is configured to adjust a complexity of the format conversion (for example, by skipping one or more of the input audio signals of the first format, which contribute to the directional loudness map below a threshold, in the format conversion process) in dependence on contributions of input audio signals of the first format (e.g., one or more audio signals, one or more downmix signals, one or more residual signals, etc.) to an overall directional loudness map of the audio scene (wherein the overall directional loudness map may, for example, be described by a side information of the first format received by the format converter). Thus, for example, contributions of individual directional loudness maps, associated with individual input audio signals, to the overall directional loudness map of the audio scene are analyzed for the complexity adjustment of the format conversion. Alternatively, this adjustment can be performed by the format converter in dependence on contributions of directional loudness maps corresponding to combinations of input audio signals (e.g., signal pairs, a mid-signal, a side-signal, downmix signal, a residual signal, a difference signal and/or groups of three or more signals) to the overall directional loudness map of the audio scene.

The embodiments of the format converter are based on the idea that it is advantageous to convert a format of the audio content on the basis of one or more directional loudness maps because they can indicate a perception of the audio content by a listener and thus a high quality of the audio content in a second format is realized and the complexity of the format conversion is reduced in dependence on the directional loudness maps. With the contributions it is possible to get information of signals relevant for a high quality audio perception of the format converted audio content.

Thus audio content in the second format, for example, comprises less signals (e.g., only the relevant signals according to the directional loudness maps) than the audio content in the first format, with nearly the same audio quality.

According to an embodiment, the format converter is configured to receive a directional loudness map information, and to obtain the overall directional loudness map (e.g., of the decoded audio scene; e.g., of the audio content in the first format) and/or one or more directional loudness maps on the basis thereof. The directional loudness map information (i.e. one or more directional loudness maps associated with individual signals of the audio content or associated with signal pairs or a combination of three or more signals of the audio content) can represent the audio content in the first format, can be part of the audio content in the first format or can be determined by the format converter based on the audio content in the first format (e.g., by a herein described audio analyzer; e.g., the format converter comprises the audio analyzer). According to an embodiment, the format converter is configured to also determine directional loudness map information of the audio content in the second format. Thus, for example, directional loudness maps before and after the format conversion can be compared, to reduce a perceived quality degradation due to the format conversion. This is, for example, realized by minimizing a deviation between the directional loudness map before and after the format conversion.

According to an embodiment, the format converter is configured to derive the overall directional loudness map (e.g., of the decoded audio scene) from the one or more (e.g., decoded) directional loudness maps (e.g., associated with signals in the first format).

According to an embodiment, the format converter is configured to compute or estimate a contribution of a given input audio signal (e.g., of a signal in the first format) to the overall directional loudness map of the audio scene. The format converter is configured to decide whether to consider the given input audio signal in the format conversion in dependence on a computation or estimation of the contribution (for example, by comparing the computed or estimated contribution with a predetermined absolute or relative threshold value). If the contribution is, for example, at or above the absolute or relative threshold value the corresponding signal can be seen as relevant and thus the format converter can be configured to decide to consider this signal. This can be understood as a complexity adjustment by the format converter, since not all signals in the first format are necessarily converted into the second format. The predetermined threshold value can represent a contribution of at least 2% or of at least 5% or of at least 10% or of at least 20% or of at least 30%. This is, for example, meant to exclude inaudible and/or irrelevant channels (or nearly inaudible and/or irrelevant channels), i.e. the threshold should be lower (e.g. when compare to other use cases), e.g. 5%, 10%,20%,30%.

An embodiment according to this invention is related to an audio decoder for decoding an encoded audio content. The audio decoder is configured to receive an encoded representation of one or more audio signals and to provide a decoded representation of the one or more audio signals (for example, using an AAC-like decoding or using a decoding of entropy-encoded spectral values). Furthermore the audio decoder is configured to reconstruct an audio scene using the decoded representation of the one or more audio signals and to adjust a decoding complexity in dependence on contributions of encoded signals (e.g., one or more audio signals, one or more downmix signals, one or more residual signals, etc.) to an overall directional loudness map of a decoded audio scene.

The embodiments of this audio decoder are based on the idea that it is advantageous to adjust the decoding complexity based on one or more directional loudness maps, because they can indicate a perception of the audio content by a listener and thus realize at the same time a reduction of the decoding complexity and an improvement of the decoder audio quality of the audio content. Thus, for example, the audio decoder is configured to decide, based on the contributions, which encoded signals of the audio content should be decoded and used for the reconstruction of the audio scene by the audio decoder. This means, for example, that encoded representation of one or more audio signals comprises less audio signals (e.g., only the relevant audio signals according to the directional loudness maps) than the decoded representation of the one or more audio signals, with nearly the same audio quality.

According to an embodiment, the audio decoder is configured to receive an encoded directional loudness map information and to decode the encoded directional loudness map information, to obtain the overall directional loudness map (e.g., of the decoded audio scene or, e.g., as target directional loudness map of the decoded audio scene) and/or one or more (decoded) directional loudness maps. According to an embodiment, the format converter is configured to determine or receive directional loudness map information of the encoded audio content (e.g., received) and of the decoded audio content (e.g., determined). Thus, for example, directional loudness maps before and after the decoding can be compared, to reduce a perceived quality degradation due to the decoding and/or a previous encoding (e.g., performed by a herein described audio encoder). This is, for example, realized by minimizing a deviation between the directional loudness map before and after the format conversion.

According to an embodiment, the audio decoder is configured to derive the overall directional loudness map (e.g., of the decoded audio scene or, e.g., as target directional loudness map of the decoded audio scene) from the one or more (e.g., decoded) directional loudness maps.

According to an embodiment, the audio decoder is configured to compute or estimate a contribution of a given encoded signal to the overall directional loudness map of the decoded audio scene. Alternatively the audio decoder is configured to compute a contribution of a given encoded signal to the overall directional loudness map of an encoded audio scene. The audio decoder is configured to decide whether to decode the given encoded signal in dependence on a computation or estimation of the contribution (for example, by comparing the computed or estimated contribution with a predetermined absolute or relative threshold value). The predetermined threshold value can represent a contribution of at least 60%, 70%, 80% or 90%. To retain good quality, the thresholds should be lower, still for cases when computational power is very limited (e.g. mobile device) it can go up to this range, e.g. 10%, 20%, 40%, 60%. In other words, in some embodiments, the predetermined threshold value should represent a contribution of at least 5%, or of at least 10%, or of at least 20%, or of at least 40% or of at least 60%.

An embodiment according to this invention is related to a renderer (e.g., a binaural renderer or a soundbar renderer or a loudspeaker renderer) for rendering an audio content. According to an embodiment, a renderer for distributing an audio content represented using a first number of input audio channels and a side information describing desired spatial characteristics, like an arrangement of audio objects or a relationship between audio channels, into a representation comprising a given number of channels which is independent from the first number of input audio channels (e.g., larger than the first number of input audio channels or smaller than the first number of input audio channels). The renderer is configured to reconstruct an audio scene on the basis of one or more input audio signals (or, e.g., on the basis of two or more input audio signals). Furthermore the renderer is configured to adjust a rendering complexity (for example, by skipping one or more of the input audio signals, which contribute to the directional loudness map below a threshold, in the rendering process) in dependence on contributions of the input audio signals (e.g., of one or more audio signals, of one or more downmix signals, of one or more residual signals, etc.) to an overall directional loudness map of a rendered audio scene. The overall directional loudness map may, for example, be described by a side information received by the renderer.

According to an embodiment, the renderer is configured to obtain (e.g., receive or determine by itself) a directional loudness map information, and to obtain the overall directional loudness map (e.g., of the decoded audio scene) and/or one or more directional loudness maps on the basis thereof.

According to an embodiment, the renderer is configured to derive the overall directional loudness map (e.g., of the decoded audio scene) from the one or more (or two or more) (e.g., decoded or self-derived) directional loudness maps.

According to an embodiment, the renderer is configured to compute or estimate a contribution of a given input audio signal to the overall directional loudness map of the audio scene. Furthermore the renderer is configured to decide whether to consider the given input audio signal in the rendering in dependence on a computation or estimation of the contribution (for example, by comparing the computed or estimated contribution with a predetermined absolute or relative threshold value)

An embodiment according to this invention is related to a method for analyzing an audio signal. The method comprises obtaining a plurality of weighted spectral-domain (e.g., time-frequency-domain) representations (e.g., "directional signals") on the basis of one or more spectral-domain (e.g., time-frequency-domain) representations of two or more input audio signals. Values of the one or more spectral-domain representations are weighted in dependence on different directions (e.g., panning directions)(e.g., represented by weighting factors) of audio components (for example, of spectral bins or spectral bands)(e.g., tunes from instruments or singer) in two or more input audio signals, to obtain the plurality of weighted spectral-domain representations (e.g., "directional signals"). Additionally the method comprises obtaining loudness information (e.g., one or more "directional loudness maps") associated with the different directions (e.g., panning directions) on the basis of the plurality of weighted spectral-domain representations (e.g., "directional signals") as an analysis result.

An embodiment according to this invention is related to a method for evaluating a similarity of audio signals. The method comprises obtaining a first loudness information (e.g. a directional loudness map; e.g., combined loudness values) associated with different (e.g., panning) directions on the basis of a first set of two or more input audio signals. Additionally the method comprises comparing the first loudness information with a second (e.g., corresponding) loudness information (e.g., a reference loudness information; e.g., a reference directional loudness map; e.g., reference combined loudness values) associated with the different panning directions and with a set of two or more reference audio signals, in order to obtain a similarity information (e.g., a "Model Output Variable" (MOV)) describing a similarity between the first set of two or more input audio signals and the set of two or more reference audio signals (or representing, e.g., a quality of the first set of two or more input audio signals when compared to the set of two or more reference audios signals).

An embodiment according to this invention is related to a method for encoding an input audio content comprising one or more input audio signals (a plurality of input audio signals). The method comprises providing one or more encoded (e.g., quantized and then losslessly encoded) audio signals (e.g., encoded spectral-domain representations) on the basis of one or more input audio signals (e.g., left signal and right signal), or one or more signals derived therefrom (e.g., mid signal or downmix signal and side-signal or difference signal). Furthermore the method comprises adapting the provision of the one or more encoded audio signals in dependence on one or more directional loudness maps which represent loudness information associated with a plurality of different directions (e.g., panning directions) of the one or more signals to be encoded. The adaptation of the provision of the one or more encoded audio signals is, e.g., performed in dependence on contributions of individual directional loudness maps (e.g., associated with an individual signal, a signal pair or a group of three or more signals) of the one or more signals to be quantized to an overall directional loudness map, e.g., associated with multiple input audio signals (e.g., with each signal of the one or more input audio signals)).

An embodiment according to this invention is related to a method for encoding an input audio content comprising one or more input audio signals (a plurality of input audio signals). The method comprises providing one or more encoded (e.g., quantized and then losslessly encoded) audio signals (e.g., encoded spectral-domain representations) on the basis of two or more input audio signals (e.g., left signal and right signal), or on the basis of two or more signals derived therefrom, using a joint encoding of two or more signals to be encoded jointly (e.g., using a mid signal or downmix signal and a side-signal or difference signal). Furthermore the method comprises selecting signals to be encoded jointly out of a plurality of candidate signals or out of a plurality of pairs of candidate signals (e.g., out of the two or more input audio signals or out of the two or more signals derived therefrom) in dependence on directional loudness maps which represent loudness information associated with a plurality of different directions (e.g., panning directions) of the candidate signals or of the pairs of candidate signals. According to an embodiment, the signals to be encoded jointly are selected in dependence on contributions of individual directional loudness maps of the candidate signals to an overall directional loudness map, e.g., associated with multiple input audio signals (e.g., with each signal of the one or more input audio signals), or in dependence on contributions of directional loudness maps of pairs of candidate signals to an overall directional loudness map.

An embodiment according to this invention is related to a method for encoding an input audio content comprising one or more input audio signals (a plurality of input audio signals). The method comprises providing one or more encoded (e.g., quantized and then losslessly encoded) audio signals (e.g., encoded spectral-domain representations) on the basis of two or more input audio signals (e.g., left signal and right signal), or on the basis of two or more signals derived therefrom. Furthermore the method comprises determining an overall directional loudness map (for example, a target directional loudness map of a scene) on the basis of the input audio signals, and/or determining one or more individual directional loudness maps associated with individual input audio signals (and/or determining one or more directional loudness maps associated with input audio signal pairs). Additionally the method comprises encoding the overall directional loudness map and/or one or more individual directional loudness maps as a side information.

An embodiment according to this invention is related to a method for decoding an encoded audio content. The method comprises receiving an encoded representation of one or more audio signals and providing a decoded representation of the one or more audio signals (for example, using an AAC-like decoding or using a decoding of entropy-encoded spectral values). Furthermore the method comprises receiving an encoded directional loudness map information and decoding the encoded directional loudness map information, to obtain one or more (e.g., decoded) directional loudness maps. Additionally the method comprises reconstructing an audio scene using the decoded representation of the one or more audio signals and using the one or more directional loudness maps.

An embodiment according to this invention is related to a method for converting a format of an audio content, which represents an audio scene (e.g., a spatial audio scene), from a first format to a second format. The first format may, for example, comprise a first number of channels or input audio signals and a side information or a spatial side information adapted to the first number of channels or input audio signals, and wherein the second format may, for example, comprise a second number of channels or output audio signals, which may be different from the first number of channels or input audio signals, and a side information or a spatial side information adapted to the second number of channels or output audio signals. The method comprises providing a representation of the audio content in the second format on the basis of the representation of the audio content in the first format and adjusting a complexity of the format conversion (for example, by skipping one or more of the input audio signals of the first format, which contribute to the directional loudness map below a threshold, in the format conversion process) in dependence on contributions of input audio signals of the first format (e.g., one or more audio signals, one or more downmix signals, one or more residual signals, etc.) to an overall directional loudness map of the audio scene. The overall directional loudness map may, for example, be described by a side information of the audio content in the first format received by the format converter.

An embodiment according to this invention is related to a the method comprises receiving an encoded representation of one or more audio signals and providing a decoded representation of the one or more audio signals (for example, using an AAC-like decoding or using a decoding of entropy-encoded spectral values). The method comprises reconstructing an audio scene using the decoded representation of the one or more audio signals. Furthermore the method comprises adjusting a decoding complexity in dependence on contributions of encoded signals (e.g., one or more audio signals, one or more downmix signals, one or more residual signals, etc.) to an overall directional loudness map of a decoded audio scene.

An embodiment according to this invention is related to a method for rendering an audio content. According to an embodiment this invention is related to a method for up-mixing an audio content represented using a first number of input audio channels and a side information describing desired spatial characteristics, like an arrangement of audio objects or a relationship between audio channels, into a representation comprising a number of channels which is larger than the first number of input audio channels. The method comprises reconstructing an audio scene on the basis of one or more input audio signals (or on the basis of two or more input audio signals). Furthermore the method comprises adjusting a rendering complexity (for example, by skipping one or more of the input audio signals, which contribute to the directional loudness map below a threshold, in the rendering process) in dependence on contributions of the input audio signals (e.g., one or more audio signals, one or more downmix signals, one or more residual signals, etc.) to an overall directional loudness map of a rendered audio scene. The overall directional loudness map may, for example, be described by a side information received by the renderer.

An embodiment according to this invention is related to a computer program having a program code for performing, when running on a computer, a herein described method.

An embodiment according to this invention is related to an encoded audio representation (e.g., an audio stream or a data stream), comprising an encoded representation of one or more audio signals and an encoded directional loudness map information.

The methods as described above are based on the same considerations as the above-described audio analyzer, audio similarity evaluator, audio encoder, audio decoder, the format converter and/or the renderer. The methods can, by the way, be completed with all features and functionalities, which are also described with regard to the audio analyzer, audio similarity evaluator, audio encoder, audio decoder, the format converter and/or the renderer.

BRIEF DESCRIPTION OF THE DRAWINGS

Embodiments of the present invention will be detailed subsequently referring to the appended drawings, in which:

FIG. 2 shows a detailed block diagram of an audio analyzer according to an embodiment of the present invention;

DETAILED DESCRIPTION OF THE INVENTION

Figure 1:
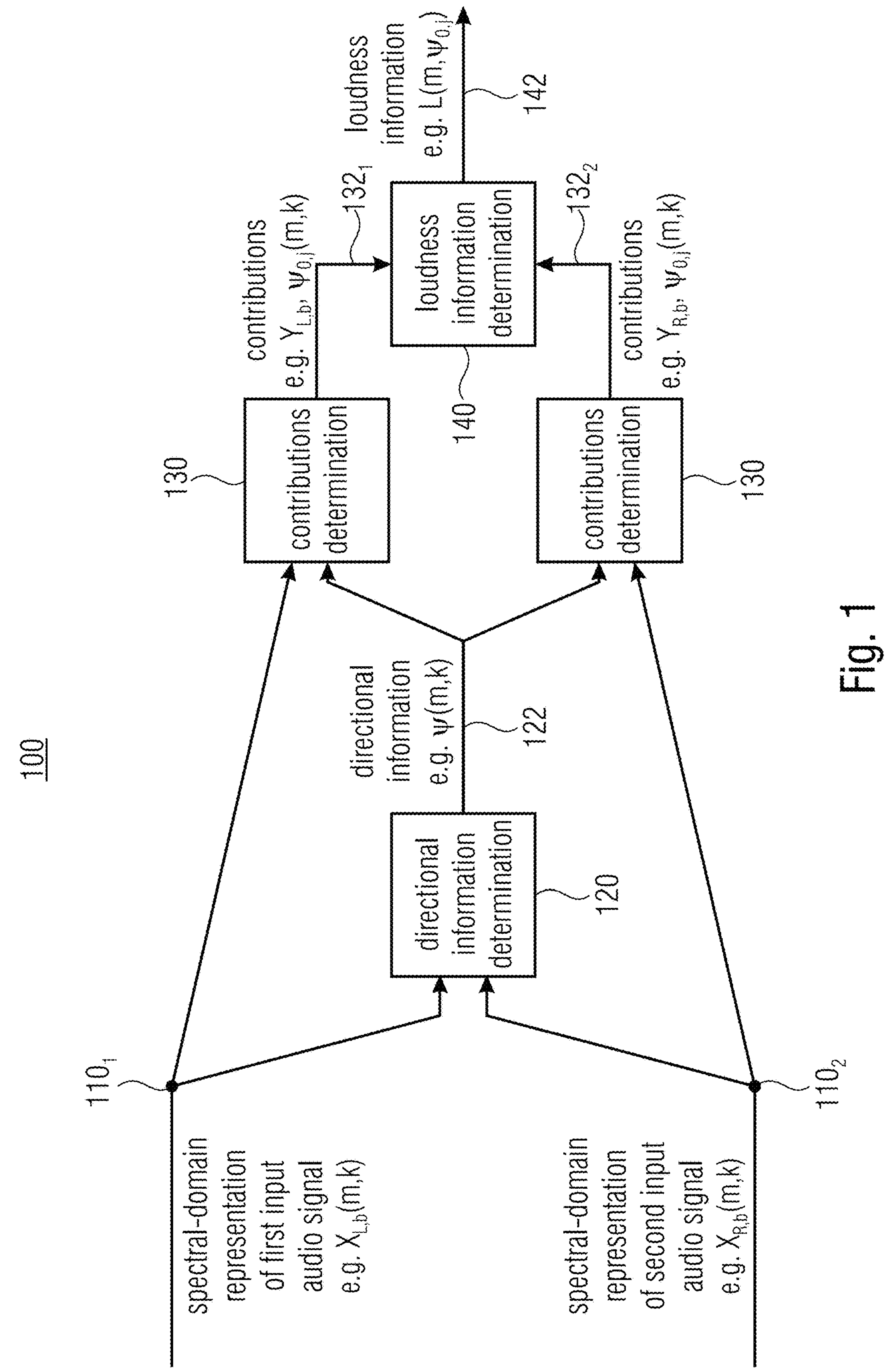
FIG. 1 shows a block diagram of an audio analyzer according to an embodiment of the present invention.

Equal or equivalent elements are elements with equal or equivalent functionality. They are denoted in the following description by equal or equivalent reference numerals even if occurring in different figures.

In the following description, a plurality of details is set forth to provide a more throughout the explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

FIG. 1 shows a block diagram of an audio analyzer 100, which is configured to obtain a spectral-domain representation $\mathbf{110}_1$ of a first input audio signal, e.g., $X_{L,b}(m, k)$, and a spectral-domain representation $\mathbf{110}_2$ of a second input audio signal, e.g., $X_{R,b}(m, k)$. Thus, for example, the audio analyzer 100 receives the spectral-domain representations $\mathbf{110}_1$, $\mathbf{110}_2$ as input 110 to be analyzed. This means, for example, that the first input audio signal and the second input audio signal are converted into the spectral-domain representations $\mathbf{110}_1$, $\mathbf{110}_2$ by an external device or apparatus and then provided to the audio analyzer 100. Alternatively, the spectral-domain representations $\mathbf{110}_1$, $\mathbf{110}_2$ can be determined by the audio analyzer 100 as will be described with regard to FIG. 2. According to an embodiment, the spectral domain representations 110 can be represented by $X_{i,b}(m, k)$, e. g. for $i=\{L;R;DM\}$ or for $i\in[1;I]$.

According to an embodiment, the spectral-domain representations $\mathbf{110}_1$, $\mathbf{110}_2$ are fed into a directional information determination 120 to obtain directional information 122, e.g., $\Psi(m, k)$, associated with spectral bands (e.g., spectral bins k in a time frame m) of the spectral-domain representations $\mathbf{110}_1$, $\mathbf{110}_2$. The direction information 122 represents, for example, different directions of audio components contained in the two or more input audio signals. Thus, the directional information 122 can be associated with a direction from which a listener will hear a component contained in the two input audio signals. According to an embodiment the direction information can represent panning indices.

Thus, for example, the directional information 122 comprises a first direction indicating a singer in a listening room and further directions corresponding to different music instruments of a band in an audio scene. The directional information 122 is, for example, determined by the audio analyzer 100 by analyzing level ratios between the spectral-domain representations $\mathbf{110}_1$, $\mathbf{110}_2$ for all frequency bins or frequency groups (e.g., for all spectral bins k or spectral bands b). Examples for the directional information determination 120 are described with respect to FIG. 5 to FIG. 7*b*.

According to an embodiment the audio analyzer 100 is configured to obtain the directional information 122 on the basis of an analysis of an amplitude panning of audio content; and/or on the basis of an analysis of a phase relationship and/or a time delay and/or correlation between audio contents of two or more input audio signals; and/or on the basis of an identification of widened (e.g. decorrelated and/or panned) sources. The audio content can comprise the input audio signals and/or the spectral-domain representations 110 of the input audio signals.

Based on the directional information 122 and the spectral-domain representations $\mathbf{110}_1$, $\mathbf{110}_2$ the audio analyzer 100 is configured to determine contributions 132 (e.g., $Y_{L,b,\Psi_{0,j}}(m, k)$ and $Y_{R,b,\Psi_{0,j}}(m, k)$) to a loudness information 142. According to an embodiment, first contributions $\mathbf{132}_1$ associated with a spectral-domain representation $\mathbf{110}_1$ of the first input audio signal are determined by a contributions determination 130 in dependence on the directional information 122 and the second contributions $\mathbf{132}_2$ associated with the spectral-domain representation $\mathbf{110}_2$ of the second input audio signal are determined by the contributions determination 130 in dependence on the directional information 122. According to an embodiment, the directional information 122 comprises different directions (e.g., extracted direction values $\Psi(m, k)$). The contributions 132 comprise, for example, loudness information for predetermined directions $\Psi_{0,j}$ depending on the directional information 122. According to an embodiment, the contributions 132 define level information of spectral bands, whose direction $\Psi(m, k)$ (corresponding to the directional information 122) equals predetermined directions $\Psi_{0,j}$ and/or scaled level information of spectral bands, whose direction $\Psi(m, k)$ is neighboring a predetermined direction $\Psi_{0,j}$.

According to an embodiment, the extracted direction values $\Psi(m, k)$ are determined in dependence on spectral domain values (e.g., $X_{L,b}(m_0, k_0)$ as $X_1(m, k)$ and $X_{R,b}(m_0, k_0)$ as $X_2$ (m, k) in the notation of [13]] of the input audio signals.

To obtain the loudness information 142 (e.g. $L(m, \Psi_{0,j})$ for a plurality of different evaluated direction ranges $\Psi_{0,j}$ ($j \in [1;J]$ for J predetermined directions)) associated with the different directions $\Psi_{0,j}$ (e.g., predetermined directions) as an analysis result by the audio analyzer 100, the audio analyzer 100 is configured to combine the contributions $\mathbf{132}_1$ (e.g., $Y_{L,b,\Psi_{0,j}}(m, k)$) corresponding to the spectral-domain representation $\mathbf{110}_1$ of the first input audio signal and the contributions $\mathbf{132}_2$ (e.g., $Y_{R,b,\Psi_{0,j}}(m, k)$) corresponding to the spectral-domain representation $\mathbf{110}_2$ of the second input audio signal to receive a combined signal as loudness information 142 of, for example, two or more channels (e.g., a first channel is associated to the first input audio signal and represented by the index L and a second channel is associated with the second input audio signal and represented by the index R). Thus, a loudness information 142 is obtained, which defines a loudness over time and for each of the different directions $\Psi_{0,j}$. This is, for example, performed by the loudness information determination unit 140.

FIG. 2 shows an audio analyzer 100, which can comprise features and/or functionalities as described with regard to the audio analyzer 100 in FIG. 1. According to an embodiment, the audio analyzer 100 receives a first input audio signal $x_L$ $\mathbf{112}_1$ and a second input audio signal $x_R$ $\mathbf{112}_2$. The index L is associated with left and the index R is associated with right. The indices can be associated with a loudspeaker (e.g., with a loudspeaker positioning). According to an embodiment, the indices can be represented by numbers indicating a channel associated with the input audio signal.

According to an embodiment, the first input audio signal $\mathbf{112}_1$ and/or the second input audio signal 1122 can represent a time-domain signal which can be converted by a time-domain to spectral-domain conversion 114 to receive a spectral-domain representation 110 of the respective input audio signal. In other words, the time-domain to spectral-domain conversion 114 can decompose the two or more input audio signals $\mathbf{112}_1$, $\mathbf{112}_2$ (e.g., $x_L$, $x_R$, $x_i$) into a short-time Fourier transform (SIFT) domain to obtain two or more transformed audio signals $\mathbf{115}_1$, $\mathbf{115}_2$ (e.g., $X'_L$, $X'_L$, $X'_i$). If the first input audio signal $\mathbf{112}_1$ and/or the second input audio signal $\mathbf{112}_2$ represent a spectral-domain representation 110, the time-domain to spectral-domain conversion 114 can be skipped.

Optionally the input audio signals 112 or the transformed audio signals 115 are processed by an ear model processing 116 to obtain the spectral-domain representations 110 of the respective input audio signal $\mathbf{112}_1$ and $\mathbf{112}_2$. Spectral bins of the signal to be processed, e.g., 112 or 115, are grouped to spectral bands, e.g., based on a model for a perception of spectral bands by a human ear and then the spectral bands can be weighted, based on an outer-ear and/or middle-ear model. Thus, with the ear model processing 116 an optimized spectral-domain representation 110 of the input audio signals 112 can be determined.

According to an embodiment, the spectral-domain representation $\mathbf{110}_1$ of the first input audio signal $\mathbf{112}_1$, e.g., $X_{L,b}(m, k)$, is associated with level information of the first input audio signal $\mathbf{112}_1$ (e.g., indicated by the index L) and different spectral bands (e.g., indicated by the index b). Per spectral band b the spectral-domain representation $\mathbf{110}_1$ represents, for example, a level information for time frames m and for all spectral bins k of the respective spectral band b.

According to an embodiment, the spectral-domain representation $\mathbf{110}_2$ of the second input audio signal $\mathbf{112}_2$, e.g., $X_{R,b}(m, k)$, is associated with level information of the second input audio signal $\mathbf{112}_2$ (e.g., indicated by the index R) and different spectral bands (e.g., indicated by the index b). Per spectral band b the spectral-domain representation $\mathbf{110}_2$ represents, for example, a level information for time frames m and for all spectral bins k of the respective spectral band b.

Based on the spectral-domain representation $\mathbf{110}_1$ of the first input audio signal 112 and the spectral-domain representation $\mathbf{110}_2$ of the second input audio signal a direction information determination 120 can be performed by the audio analyzer 100. With a direction analysis 124 a panning direction information 125, e.g., $\Psi(m, k)$, can be determined. The panning direction information 125 represents, for example, panning indices corresponding to signal components (e.g., signal components of the first input audio signal $\mathbf{112}_1$ and the second input audio signal $\mathbf{112}_2$ panned to a certain direction). According to an embodiment, the input audio signals 112 are associated with different directions indicated, for example, by the index L for left and by the index R for right. A panning index defines, for example, a direction between two or more input audio signals 112 or a direction at the direction of an input audio signal 112. Thus, for example, in a case of two-channel signal as shown in FIG. 2, the panning direction information 125 can comprise panning indices corresponding to signal components panned completely to the left or to the right or to a direction somewhere between.

According to an embodiment, based on the panning direction information 125 the audio analyzer 100 is configured to perform a scaling factor determination 126 to determine a direction-dependent weighting 127, e.g., $\Theta_{\Psi_{0,j}}$(m, k) for j∈[1;i]. The direction-dependent weighting 127 defines, for example, a scaling factor depending on directions Ψ(m, k) extracted from the panning direction information 125. The direction-dependent weighting 127 is determined for a plurality of predetermined directions $\Psi_{0,j}$. According to an embodiment, the direction-dependent weighting 127 defines functions for each predetermined direction. The functions depend, for example, on directions Ψ(m, k) extracted from the panning direction information 125. The scaling factor depends, for example on a distance between the directions Ψ(m, k) extracted from the panning direction information 125 and a predetermined direction $\Psi_{0,j}$. The scaling factors, i.e. the direction-dependent weighting 127 can be determined per spectral bin and/or per time step/time frame.

According to an embodiment, the direction-dependent weighting 127 uses a Gaussian function, such that the direction-dependent weighting decreases with an increasing deviation between respective extracted direction values Ψ(m, k) and the respective predetermined direction values $\Psi_{0,j}$.

According to an embodiment, the audio analyzer 100 is configured to obtain the direction-dependent weighting 127 $\Theta_{\Psi_{0,j}}$(m, k) associated with a predetermined direction (e.g. represented by index $\Psi_{0,j}$), a time (or time frame) designated with a time index m, and a spectral bin designated by a spectral bin index k according to $$\theta_{\Psi_{0,j}}(m,k) = e^{-\frac{1}{2\xi}(\Psi(m,k)-\Psi_{0,j})^2},$$

wherein ξ is a predetermined value (which controls, for example, a width of a Gaussian window); wherein Ψ(m, k) designates the extracted direction values associated with a time (or time frame) designated with a time index m, and a spectral bin designated by a spectral bin index k; and wherein $\Psi_{0,j}$ is a (e.g., predetermined) direction value which designates (or is associated with) a predetermined direction (e.g. having direction index j).

According to an embodiment, the audio analyzer 100 is configured to determine by using the directional information determination 120 a directional information comprising the panning direction information 125 and/or the direction-dependent weighting 127. This direction information is, for example, obtained on the basis of an audio content of the two or more input audio signals 112.

According to an embodiment, the audio analyzer 100 comprises a scaler 134 and/or a combiner 136 for a contributions determination 130. With the scaler 134 the direction-dependent weighting 127 is applied to the one or more spectral-domain representations 110 of the two or more input audio signals 112, in order to obtain weighted spectral-domain representations 135 (e.g., $Y_{i,b,\Psi_{0,j}}$(m, k), $Y_{DM,b,\Psi_{0,j}}$(m, k), for different $\Psi_0$ (j∈[1;J] or j={L;R;DM})). In other words the spectral-domain representation $\mathbf{110}_1$ of the first input audio signal and the spectral-domain representation $\mathbf{110}_2$ of the second input audio signal are weighted for each predetermined direction $\Psi_{0,j}$ individually. Thus, for example, the weighted spectral-domain representation $\mathbf{135}_1$, e.g., $Y_{L,b,\Psi_{0,1}}$(m, k), of the first input audio signal can comprise only signal components of the first input audio signal 112 corresponding to the predetermined direction $\Psi_{0,1}$ or additionally weighted (e.g., reduced) signal components of the first input audio signal $\mathbf{112}_1$ associated with neighboring predetermined directions. Thus values of the one or more spectral domain representations 110 (e.g., $X_{i,b}$(m, k)) are weighted in dependence on the different directions (e.g. panning directions $\Psi_{0,j}$)(e.g. represented by weighting factors Ψ(m, k)) of the audio components According to an embodiment, the scaling factor determination 126 is configured to determine the direction-dependent weighting 127 such that per predetermined direction signal components, whose extracted direction values Ψ(m, k) deviate from the predetermined direction $\Psi_{0,j}$, are weighted such that they have less influence than signal components, whose extracted direction values Ψ(m, k) equals the predetermined direction $\Psi_{0,j}$. In other words, at the direction-dependent weighting 127 for a first predetermined direction $\Psi_{0,1}$, signal components associated with the first predetermined direction $\Psi_{0,1}$ are emphasized over signal components associated with other directions in a first weighted spectral-domain representation $Y_{L,b,\Psi_{0,1}}$(m, k) corresponding to the first predetermined direction $\Psi_{0,1}$.

According to an embodiment, the audio analyzer 100 is configured to obtain the weighted spectral-domain representations 135 $Y_{i,b,\Psi_{0,j}}$(m, k) associated with an input audio signal (e.g., with $\mathbf{110}_1$ for i=1 or $\mathbf{110}_2$ for i=2) or a combination of input audio signals (e.g., with a combination of the two input audio signals $\mathbf{110}_1$ and $\mathbf{110}_2$ for i=1, 2) designated by index i, a spectral band designated by index b, a (e.g., predetermined) direction designated by index a time (or time frame) designated with a time index m, and a spectral bin designated by a spectral bin index k according to $Y_{i,b,\Psi_{0,j}}$(m, k)=$X_{i,b}$(m, k)$\Theta_{\Psi_{0,j}}$(m, k), wherein $X_{i,b}$(m, k) designates a spectral-domain representation 110 associated with an input audio signal 112 or combination of input audio signals 112 designated by index i (e.g., i=L or i=R or i=DM or I is represented by a number, indicating a channel), a spectral band designated by index b, a time (or time frame) designated with a time index m, and a spectral bin designated by a spectral bin index k; and wherein $\Theta_{\Psi_{0,j}}$(m, k) designates the direction-dependent weighting 127 associated with a (e.g., a predetermined) direction designated by index $\Psi_{0,j}$, a time (or time frame) designated with a time index m, and a spectral bin designated by a spectral bin index k.

Figure 6:
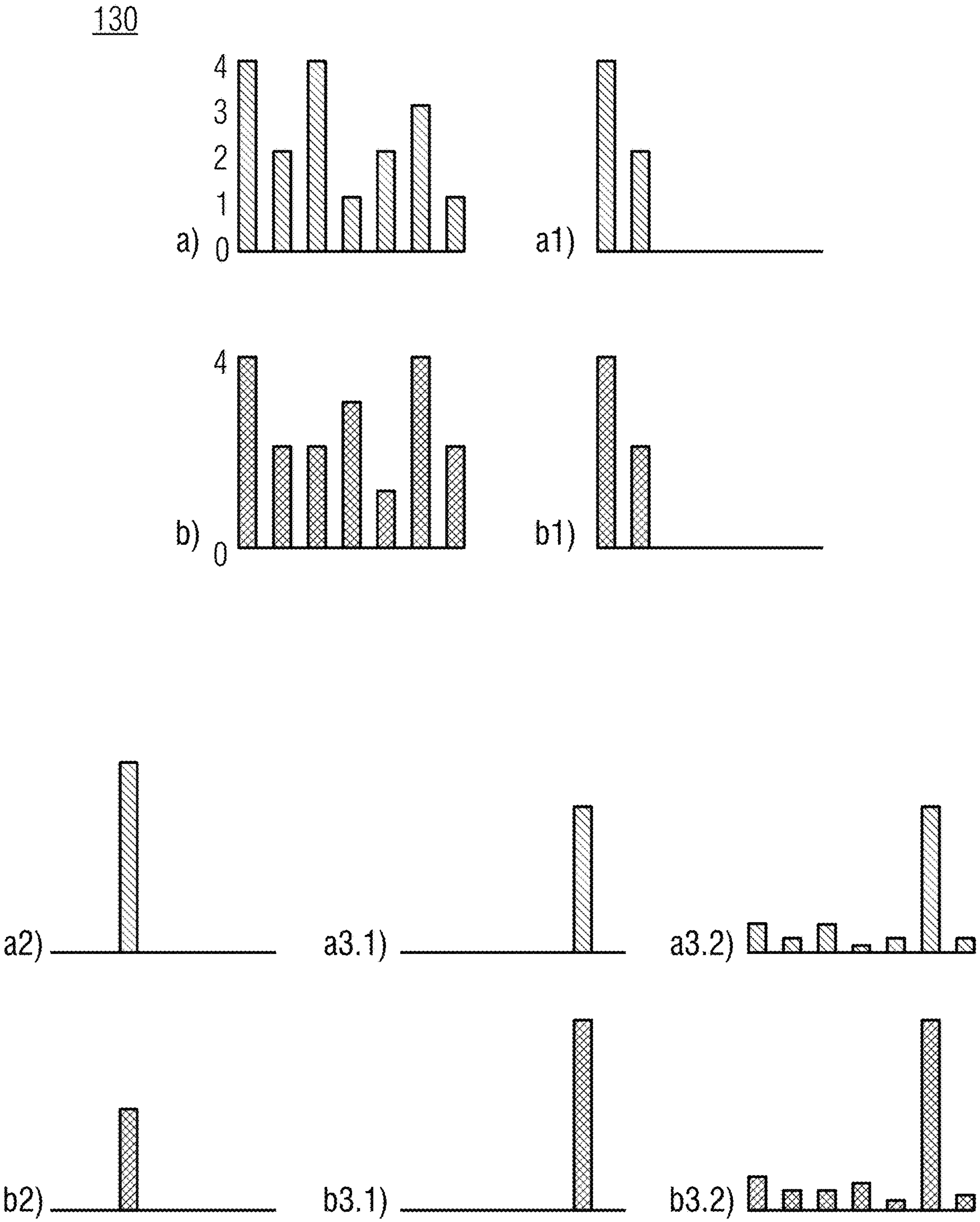
FIG. 6 shows schematic histograms of two signals, for a directional analysis by an audio analyzer according to an embodiment of the present invention.
Figure 7B:
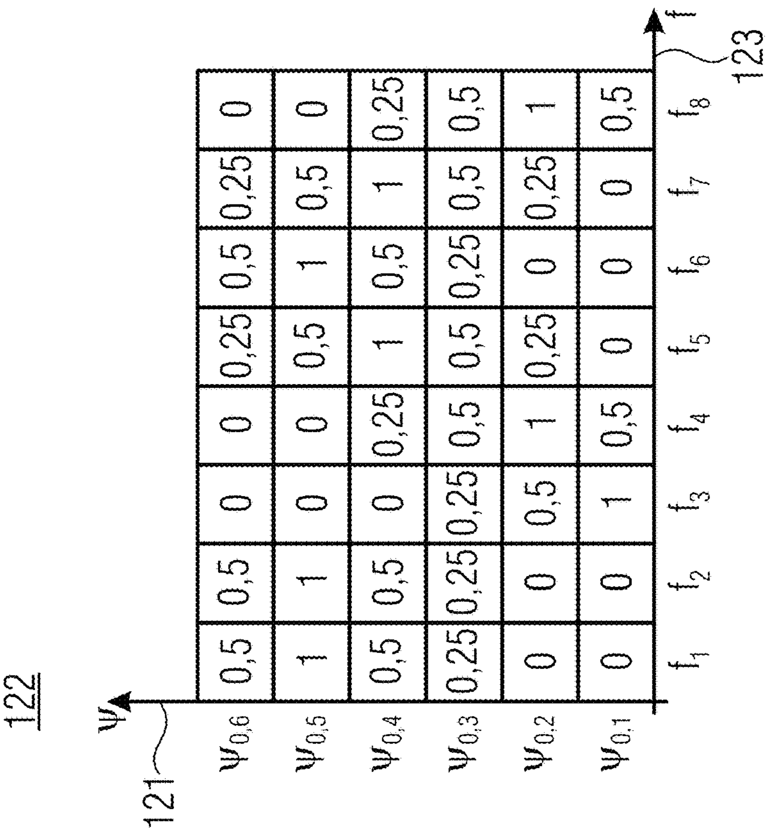
FIG. 7*b* shows matrices with multiple scaling factors, differing from zero, per time/frequency tile associated with a direction, for a scaling performed by an audio analyzer according to an embodiment of the present invention.

Additional or alternative functionalities of the scaler 134 are described with regard to FIG. 6 to FIG. 7*b*.

According to an embodiment, the weighted spectral-domain representations $\mathbf{135}_1$ of the first input audio signal and the weighted spectral-domain representations $\mathbf{135}_2$ of the second input audio signal are combined by the combiner 136 to obtain a weighted combined spectral-domain representation 137 $Y_{DM,b,\Psi_{0,j}}$(m, k). Thus, with the combiner 136 weighted spectral-domain representations 135 of all channels (in case of FIG. 2 of the first input audio signal $\mathbf{112}_1$ and the second input audio signal $\mathbf{112}_2$) corresponding to a predetermined direction $\Psi_{0,j}$ are combined to one signal. This is, for example, performed for all predetermined directions $\Psi_{0,j}$ (for j∈[1;i]). According to an embodiment, the weighted combined spectral-domain representation 137 is associated with different frequency bands b.

Based on the weighted combined spectral-domain representation 137 a loudness information determination 140 is performed to obtain as analysis result a loudness information 142. According to an embodiment, the loudness information determination 140 comprises a loudness determination in bands 144 and a loudness determination over all bands 146. According to an embodiment, the loudness determination in bands 144 is configured to determine for each spectral band b on the basis of the weighted combined spectral-domain representations 137 band loudness values 145. In other words, the loudness determination in bands 144 determines a loudness at each spectral band in dependence on the predetermined directions $\Psi_{0,j}$. Thus, the obtained band loudness values 145 do no longer depend on single spectral bins k.

According to an embodiment, the audio analyzer is configured to compute a mean of squared spectral values of the weighted combined spectral-domain representations 137 (e.g., $Y_{DM,b,\Psi_{0,j}}(m, k)$) over spectral values of a frequency band (or over spectral bins (k) of a frequency band (b)), and to apply an exponentiation having an exponent between 0 and ½ (and smaller than ⅓ or ¼) to the mean of squared spectral values, in order to determine the band loudness values 145 (e.g., $L_{b,\Psi_{0,j}}(m)$) (e.g., associated with a respective frequency band (b)).

According to an embodiment, the audio analyzer is configured to obtain the band loudness values 145 $L_{b,\Psi_{0,j}}(m)$ associated with a spectral band designated with index b, a direction designated with index $\Psi_{0,j}$, a time (or time frame) designated with a time index m according to $$L_{b,\Psi_{0,j}}(m) = \left(\frac{1}{K_b}\sum_{k\in b} Y_{DM,b,\Psi_{0,j}}(m, k)^2\right)^{0.25},$$

wherein $K_b$ designates a number of spectral bins in a frequency band having frequency band index b; wherein k is a running variable and designates spectral bins in the frequency band having frequency band index b; wherein b designates a spectral band; and wherein $Y_{DM,b,\Psi_{0,j}}(m, k)$ designates a weighted combined spectral-domain representation 137 associated with a spectral band designated with index b, a direction designated by index $\Psi_{0,j}$, a time (or time frame) designated with a time index m and a spectral bin designated by a spectral bin index k.

At the loudness information determination over all bands 146 the band loudness values 145 are, for example, averaged over all spectral bands to provide the loudness information 142 dependent on the predetermined direction and at least one time frame m. According to an embodiment, the loudness information 142 can represent a general loudness caused by the input audio signals 112 in different directions in a listening room. According to an embodiment, the loudness information 142 can be associated with combined loudness values associated with different given or predetermined directions $\Psi_{0,j}$.

The audio analyzer is configured to obtain a plurality of combined loudness values $L(m, \Psi_{0,j})$ associated with a direction designated with index $\Psi_{0,j}$ and a time (or time frame) designated with a time index m according to $$L(m, \Psi_{0,j}) = \frac{1}{B}\sum_{\forall b} L_{b,\Psi_{0,j}}(m),$$

wherein B designates a total number of spectral bands b and wherein $L_{b,\Psi_{0,j}}(m)$ designates band loudness values 145 associated with a spectral band designated with index b, a direction designated with index $\Psi_{0,j}$ and a time [or time frame] designated with a time index m.

In FIG. 1 and FIG. 2 the audio analyzer 100 is configured to analyze spectral-domain representations 110 of two input audio signals, but the audio analyzer 100 is also configured to analyze more than two spectral-domain representations 110.

FIG. 3*a* to FIG. 4*b* show different implementations of an audio analyzer 100. The audio analyzer shown in FIGS. 1 to 4*b* are not restricted to the features and functionalities shown for one implementation but can also comprise features and functionalities of other implementations of the audio analyzer shown in different FIGS. 1 to 4*b*.

Figure 3A:
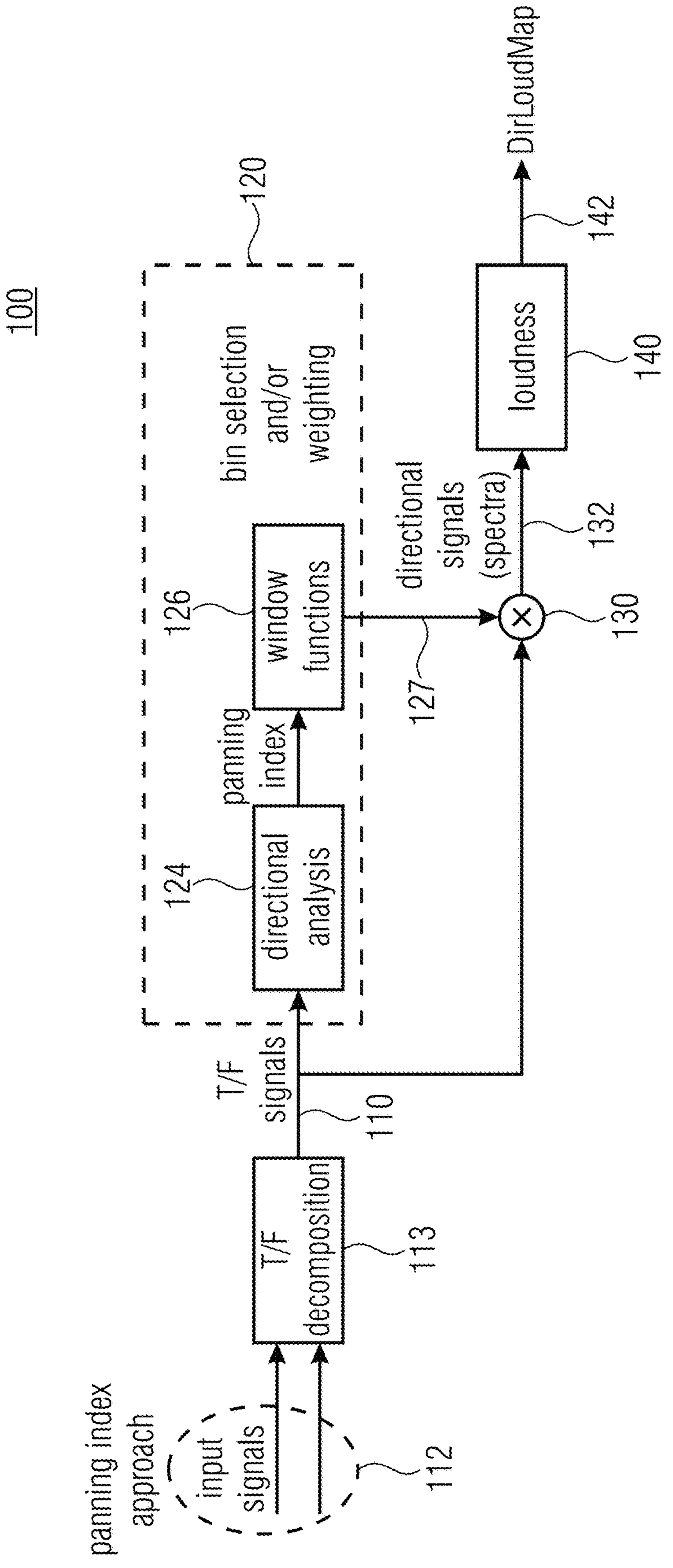
FIG. 3*a* shows a block diagram of an audio analyzer using a first panning index approach according to an embodiment of the present invention.
Figure 3B:
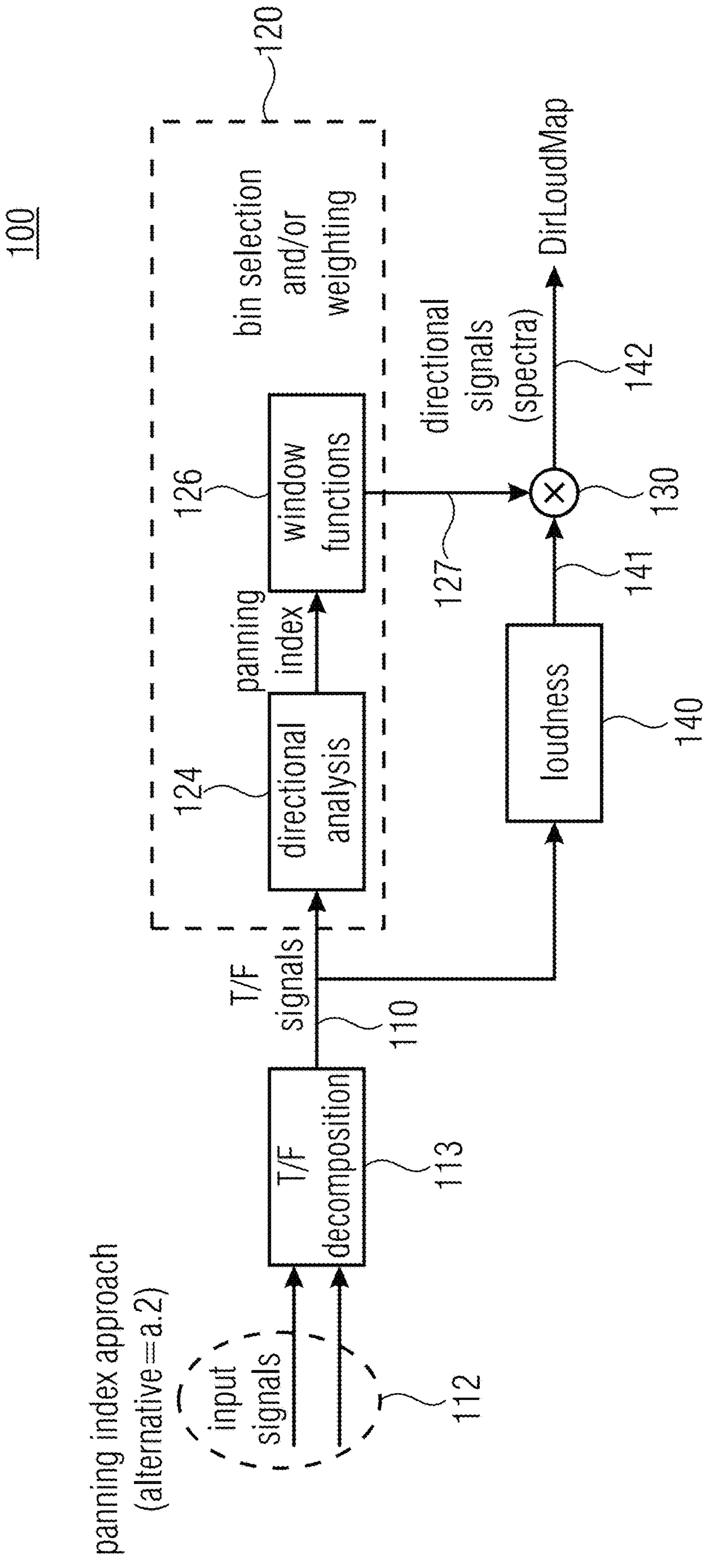
FIG. 3*b* shows a block diagram of an audio analyzer using a second panning index approach according to an embodiment of the present invention.

FIG. 3*a* and FIG. 3*b* show two different approaches by the audio analyzer 100 to determine a loudness information 142 based on a determination of a panning index.

The audio analyzer 100 shown in FIG. 3*a* is similar or equal to the audio analyzer 100 shown in FIG. 2. Two or more input signals 112 are transformed to time/frequency signals 110 by a time/frequency decomposition 113. According to an embodiment, the time/frequency decomposition 113 can comprise a time-domain to spectral-domain conversion and/or an ear model processing.

Based on the time/frequency signals a directional information determination 120 is performed. The directional information determination 120 comprises, for example, a directional analysis 124 and a determination of window functions 126. At a contributions determination unit 130 directional signals 132 are obtained by, for example, dividing the time/frequency signals 110 into directional signals by applying directional-dependent window functions 127 to the time/frequency signals 110. Based on the directional signals 132 a loudness calculation 140 is performed to obtain the loudness information 142 as an analysis result. The loudness information 142 can comprise a directional loudness map.

The audio analyzer 100 in FIG. 3*b* differs from the audio analyzer 100 in FIG. 3*a* in the loudness calculation 140. According to FIG. 3*b* the loudness calculation 140 is performed before directional signals of the time/frequency signals 110 are calculated. Thus, for example, according to FIG. 3*b* band loudness values 141 are directly calculated based on the time/frequency signals 110. By applying the direction-dependent window function 127 to the band loudness values 141, directional loudness information 142 can be obtained as the analysis result.

Figure 4A:
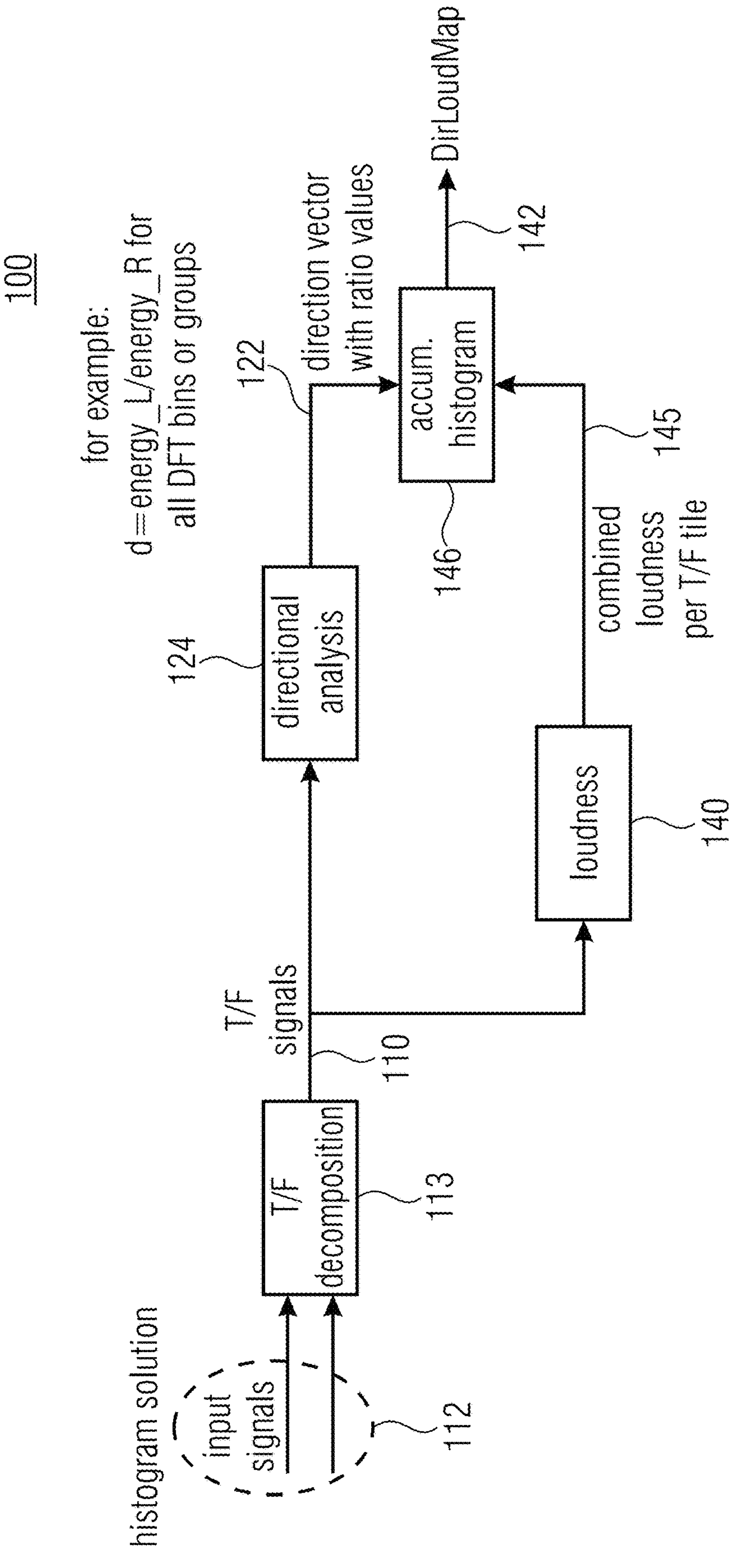
FIG. 4*a* shows a block diagram of an audio analyzer using a first histogram approach according to an embodiment of the present invention.
Figure 4B:
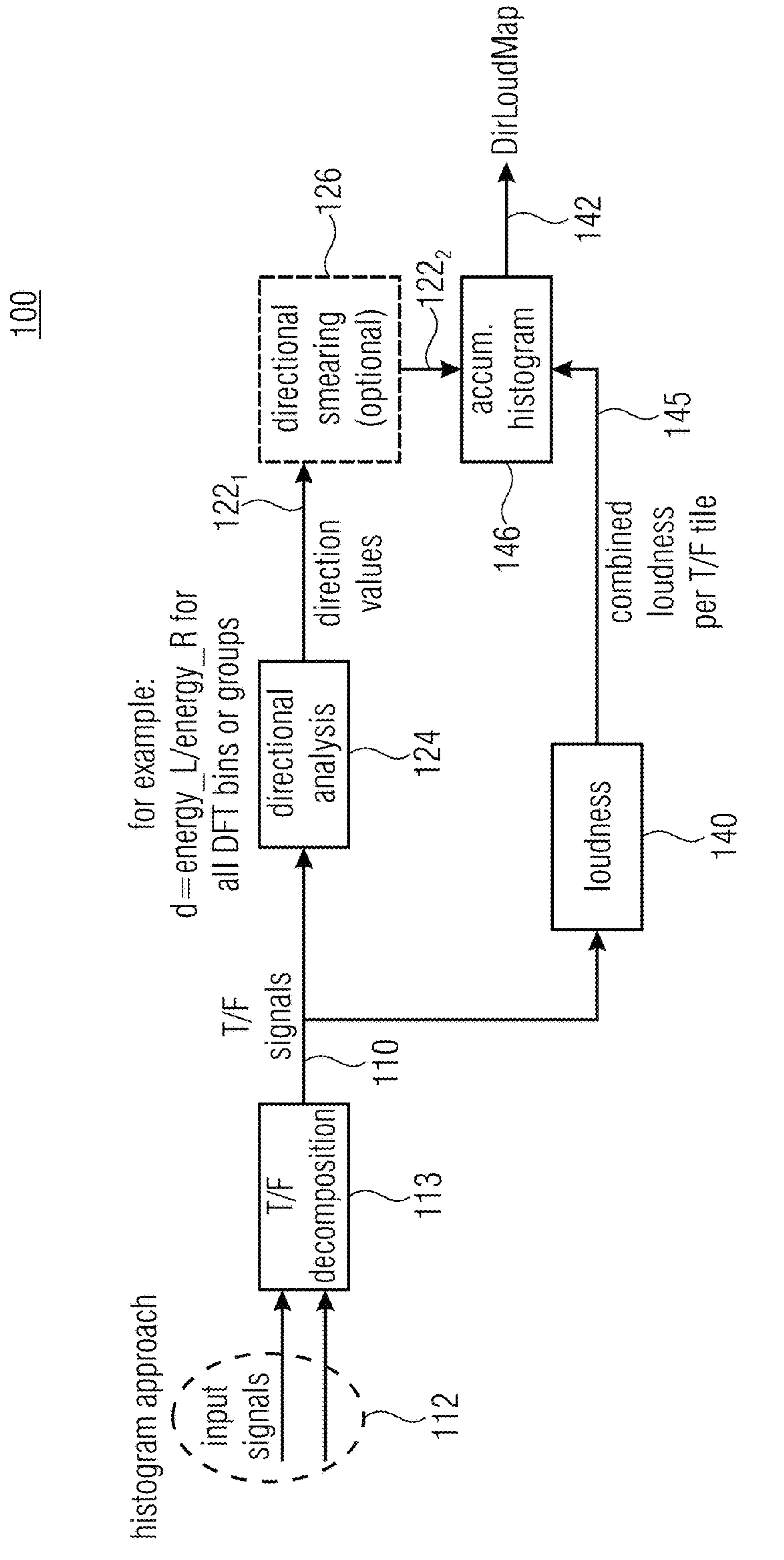
FIG. 4*b* shows a block diagram of an audio analyzer using a second histogram approach according to an embodiment of the present invention.

FIG. 4*a* and FIG. 4*b* show an audio analyzer 100 which is, According to an embodiment, configured to determine a loudness information 142 using a histogram approach. According to an embodiment, the audio analyzer 100 is configured to use a time/frequency decomposition 113 to determine time/frequency signals 110 based on two or more input signals 112.

According to an embodiment, based on the time/frequency signals 110 a loudness calculation 140 is performed to obtain a combined loudness value 145 per time/frequency tile. The combined loudness value 145 is not associated with any directional information. The combined loudness value is, for example, associated with a loudness resulting from a superposition of the input signals 112 to a time/frequency tile.

Furthermore, the audio analyzer 100 is configured to perform a directional analysis 124 of the time/frequency signals 110 to obtain a directional information 122. According to FIG. 4*a*, the directional information 122 comprises one or more direction vectors with ratio values indicating time/frequency tiles with the same level ratio between the two or more input signals 112. This directional analysis 124 is, for example, performed as described with regard to FIG. 5 or FIG. 6.

The audio analyzer 100 in FIG. 4*b* differs from the audio analyzer 100 shown in FIG. 4*a* such that after the directional analysis 124 optionally a directional smearing 126 of the direction values $\mathbf{122}_1$ is performed. With the directional smearing 126 also time/frequency tiles associated with directions neighboring a predetermined direction can be associated with the predetermined direction, wherein an obtained direction information $\mathbf{122}_2$ can comprise additionally for these time/frequency tiles a scaling factor to minimize the influence in the predetermined direction.

In FIG. 4*a* and in FIG. 4*b* the audio analyzer 100 is configured to accumulate 146 the combined loudness values 145 in directional histogram bins based on the directional information 122 associated with time/frequency tiles.

More details regarding the audio analyzer 100 in FIG. 3*a* and FIG. 3*b* are described later in the chapter "Generic steps for computing a directional loudness map" and in the chapter "Embodiments of different forms of calculating the loudness maps using generalized criterion functions".

Figure 5:
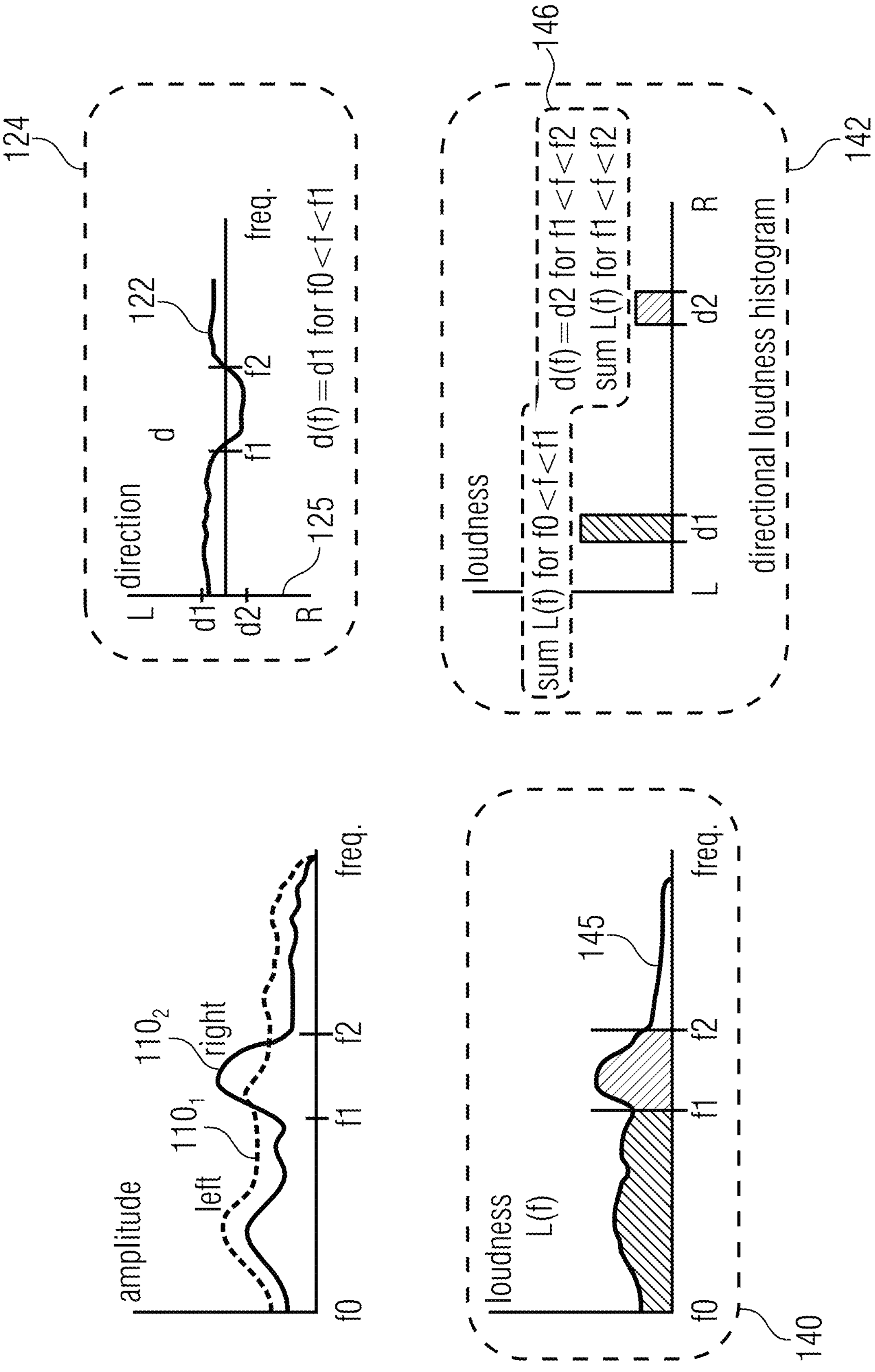
FIG. 5 shows schematic diagrams of spectral-domain representations to be analyzed by an audio analyzer and results of a directional analysis, a loudness calculation per frequency bin and a loudness calculation per direction by an audio analyzer according to an embodiment of the present invention.

FIG. 5 shows a spectral-domain representation $\mathbf{110}_1$ of a first input audio signal and a spectral-domain representation $\mathbf{110}_2$ of a second input audio signal to be analyzed by a herein described audio analyzer. A directional analysis 124 of the spectral-domain representations 110 results in a directional information 122. According to an embodiment, the directional information 122 represents a direction vector with ratio values between the spectral-domain representation $\mathbf{110}_1$ of the first input audio signal and the spectral-domain representation $\mathbf{110}_2$ of the second input audio signal. Thus, for example, frequency tiles, e.g., time/frequency tiles, of the spectral-domain representations 110 with the same level ratio are associated with the same direction 125.

According to an embodiment, the loudness calculation 140 results in combined loudness values 145, e.g., per time/frequency tile. The combined loudness values 145 are, for example, associated with a combination of the first input audio signal and the second input audio signal (e.g., a combination of the two or more input audio signals).

Based on the directional information 122 and the combined loudness values 145 the combined loudness values 145 can be accumulated 146 into direction and time-dependent histogram bins. Thus, for example, all combined loudness values 145 associated with a certain direction are summed. According to the directional information 122 the directions are associated with time/frequency tiles. With the accumulation 146 a directional loudness histogram results, which can represent a loudness information 142 as an analysis result of a herein described audio analyzer.

It is also possible that time/frequency tiles corresponding to the same direction and/or neighboring directions in a different or neighboring time frame (e.g., in a previous or subsequent time frame) can be associated with the direction in the current time step or time frame. This means, for example, that the directional information 122 comprises direction information per frequency tile (or frequency bin) dependent on time. Thus, for example, the directional information 122 is obtained for multiple timeframes or for all time frames.

More details regarding the histogram approach shown in FIG. 5 will be described in the chapter "Embodiments of different forms of calculating the loudness maps using generalized criterion functions option 2.

FIG. 6 shows a contributions determination 130 based on panning direction information performed by a herein described audio analyzer. FIG. 6*a* shows a spectral-domain representation of a first input audio signal and FIG. 6*b* shows a spectral-domain representation of a second input audio signal. According to FIG. 6*a*1 to FIG. 6*a*3.1 and FIG. 6*b*1 to FIG. 6*b*3.1 spectral bins or spectral bands corresponding to the same panning direction are selected to calculate a loudness information in this panning direction. FIG. 6*a*3.2 and FIG. 6*b*3.2 show an alternative process, where not only frequency bins or frequency bands corresponding to the panning direction are considered, but also other frequency bins or frequency groups, which are weighted or scaled to have less influence. More details regarding FIG. 6 are described in a chapter "recovering directional signals with windowing/selection function derived from a panning index".

Figure 7A:
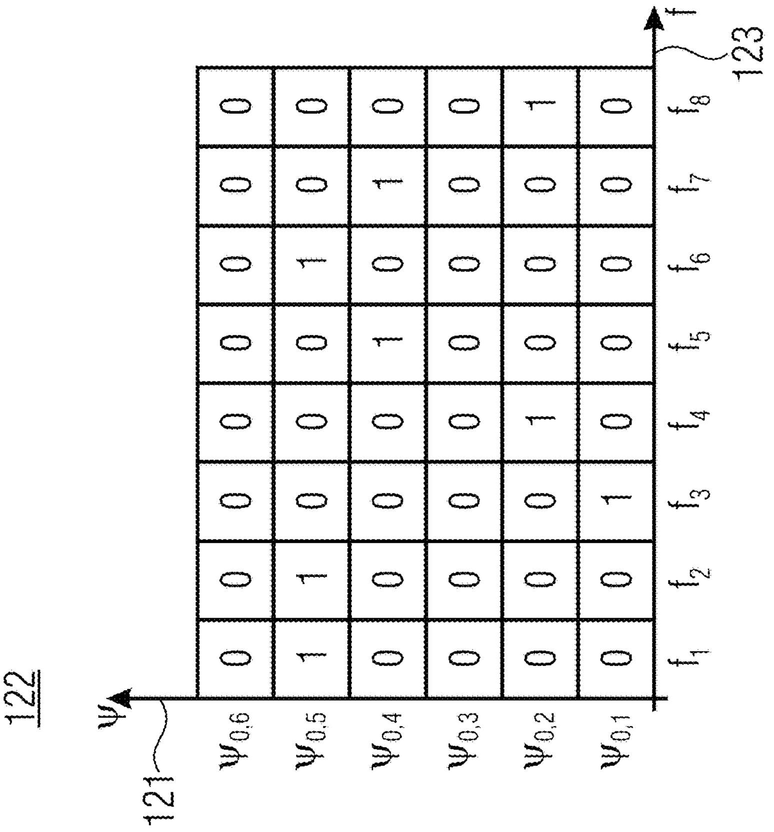
FIG. 7*a* shows matrices with one scaling factor, differing from zero, per time/frequency tile associated with a direction, for a scaling performed by an audio analyzer according to an embodiment of the present invention.

According to an embodiment, a directional information 122 can comprise scaling factors associated with a direction 121 and time/frequency tiles 123 as shown in FIG. 7*a* and/or FIG. 7*b*. According to an embodiment, in FIG. 7*a* and FIG. 7*b* the time/frequency tiles 123 are only shown for one time step or time frame. FIG. 7*a* shows scaling factors, where only time/frequency tiles 123 are considered, which contribute to a certain (e.g., predetermined) direction 121, as, for example, described with regard to FIG. 6*a*1 to FIG. 6*a*3.1 and FIG. 6*b*1 to FIG. 6*b*3.1. Alternatively in FIG. 7*b* also neighboring directions are considered but scaled to reduce an influence of the respective time/frequency tile 123 on the neighboring directions. According to FIG. 7*b* a time/frequency tile 123 is scaled such that its influence will be reduced with increasing deviation from the associated direction. Instead, in FIG. 6*a*3.2 and FIG. 6*b*3.2 all time/frequency tiles corresponding to a different panning direction are scaled equally. Different scalings or weightings are possible. Dependent on the scaling an accuracy of the analysis result of the audio analyzer can be improved.

Figure 8:
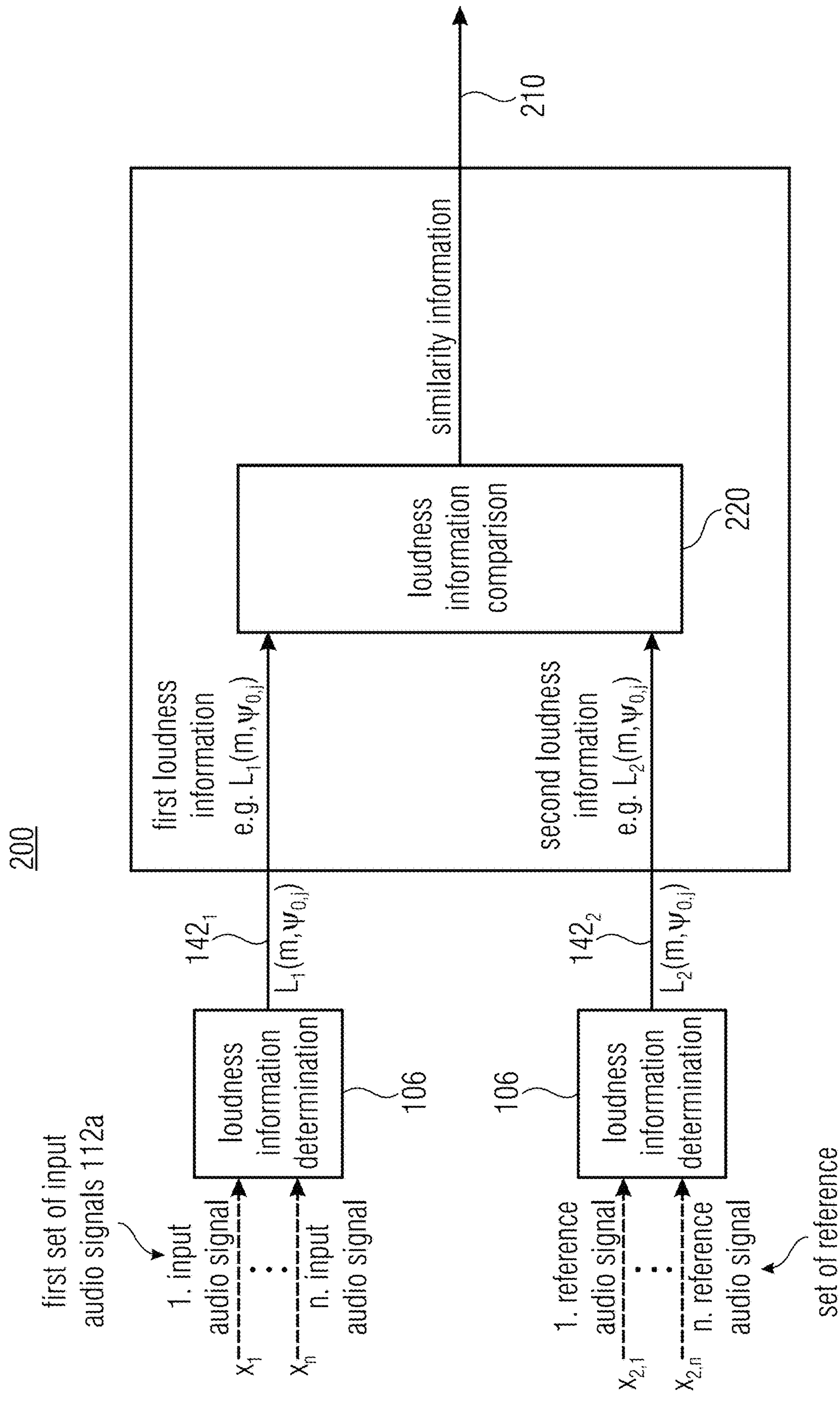
FIG. 8 shows a block diagram of an audio similarity evaluator according to an embodiment of the present invention.

FIG. 8 shows an embodiment of an audio similarity evaluator 200. The audio similarity evaluator 200 is configured to obtain a first loudness information $\mathbf{142}_1$ (e.g., $L_1(m, \Psi_{0,j})$) and a second loudness information 1422 (e.g., $L_2(m, \Psi_{0,j})$). The first loudness information $\mathbf{142}_1$ is associated with different directions (e.g., predetermined panning directions $\Psi_{0,j}$) on the basis of a first set of two or more input audio signals 112*a* (e.g., $x_L$, $x_R$ or $x_i$ for $i\in[1;n]$), and the second loudness information $\mathbf{142}_2$ is associated with different directions on the basis of a second set of two or more input audio signals, which can be represented by the set of reference audio signals 112*b* (e.g., $x_{2,R}$, $x_{2,L}$, $x_{2,i}$ for $i\in[1;n]$). The first set of input audio signals 112*a* and the set of reference audio signals 112*b* can comprise n audio signals, wherein n represents an integer greater than or equal to 2. Each audio signal of the first set of input audio signals 112*a* and of the set of reference audio signals 112*b* can be associated with different loudspeakers positioned at different positions in a listening space. The first loudness information $\mathbf{142}_1$ and the second loudness information 1422 can represent a loudness distribution in the listening space (e.g., at or between the loudspeaker positions). According to an embodiment, the first loudness information $\mathbf{142}_1$ and the second loudness information $\mathbf{142}_2$ comprise loudness values for discrete positions or directions in the listening space. The different directions can be associated with panning directions of the audio signals dedicated to one set of audio signals 112*a* or 112*b*, depending on which set corresponds to the loudness information to be calculated.

The first loudness information $142_1$ and the second loudness information $142_2$ can be determined by a loudness information determination 100, which can be performed by the audio similarity evaluator 200. According to an embodiment, the loudness information determination 100 can be performed by an audio analyzer. Thus, for example, the audio similarity evaluator 200 can comprise an audio analyzer or receive the first loudness information $142_1$ and/or the second loudness information $142_2$ from an external audio analyzer. According to an embodiment, the audio analyzer can comprise features and/or functionalities as described with regard to an audio analyzer in FIG. 1 to FIG. 4*b*. Alternatively, only the first loudness information $142_1$ is determined by the loudness information determination 100 and the second loudness information $142_2$ is received or obtained by the audio similarity evaluator 200 from a databank with reference loudness information. According to an embodiment, the databank can comprise reference loudness information maps for different loudspeaker settings and/or loudspeaker configurations and/or different sets of reference audio signals 112*b*.

According to an embodiment, the set of reference audio signals 112*b* can represent an ideal set of audio signals for an optimized audio perception by a listener in the listening space.

According to an embodiment, the first loudness information $142_1$ (for example, a vector comprising $L_1(m, \Psi_{0,1})$ to $L_1(m, \Psi_{0,j})$) and/or the second loudness information $142_2$ (for example, a vector comprising $L_2(m, \Psi_{0,1})$ to $L_2(m, \Psi_{0,j})$) can comprise a plurality of combined loudness values associated with the respective input audio signals (e.g., the input audio signals corresponding to the first set of input audio signals 112*a* or the reference audio signals corresponding to the set of reference audio signals 112*b* (and associated with respective predetermined directions)). The respective predetermined directions can represent panning indices. Since each input audio signal is, for example, associated with a loudspeaker, the respective predetermined directions can be understood as equally spaced positions between the respective loudspeakers (e.g., between neighboring loudspeakers and/or other pairs of loudspeakers). In other words, the audio similarity evaluator 200 is configured to obtain a direction component (e.g., a herein described first direction) used for obtaining the loudness information $142_1$ and/or $142_2$ with different directions (e.g., herein described second directions) using metadata representing position information of loudspeakers associated with the input audio signals. The combined loudness values of the first loudness information $142_1$ and/or of the second loudness information $142_2$ describe the loudness of signal components of the respective set of input audio signals 112*a* and 112*b* associated with the respective predetermined directions. The first loudness information $142_1$ and/or the second loudness information $142_2$ is associated with combinations of a plurality of weighted spectral-domain representations associated with the respective predetermined direction.

The audio similarity evaluator 200 is configured to compare the first loudness information $142_1$ with the second loudness information $142_2$ in order to obtain a similarity information 210 describing a similarity between the first set of two or more input audio signals 112*a* and the set of two or more reference audio signals 112*b*. This can be performed by a loudness information comparison unit 220. The similarity information 210 can indicate a quality of the first set of input audio signals 112*a*. To further improve the prediction of a perception of the first set of input audio signals 112*a* based on the similarity information 210, only a subset of frequency bands in the first loudness information $142_1$ and/or in the second loudness information $142_2$ can be considered. According to an embodiment, the first loudness information $142_1$ and/or the second loudness information $142_2$ is only determined for frequency bands with frequencies of 1.5 kHz and above. Thus, the compared loudness information $142_1$ and $142_2$ can be optimized based on the sensitivity of the human auditory system. Thus, the loudness information comparison unit 220 is configured to compare loudness information $142_1$ and $142_2$, which comprise only loudness values of relevant frequency bands. Relevant frequency bands can be associated with frequency bands corresponding to a (e.g., human ear) sensitivity higher than a predetermined threshold for predetermined level differences.

To obtain the similarity information 210, e.g., a difference between the second loudness information $142_2$ and the first loudness information $142_1$ is calculated.

This difference can represent a residual loudness information and can already define the similarity information 210. Alternatively, the residual loudness information is processed further to obtain the similarity information 210. According to an embodiment, the audio similarity evaluator 200 is configured to determine a value that quantifies the difference over a plurality of directions. This value can be a single scalar value representing the similarity information 210. To receive the scalar value the loudness information comparison unit 220 can be configured to calculate the difference for parts or a complete duration of the first set of input audio signals 112*a* and/or the set of reference audio signals 112*b* and then average the obtained residual loudness information over all panning directions (e.g., the different directions with which the first loudness information $142_1$ and/or the second loudness information $142_2$ is associated) and time producing a single numbered termed model output variable (MOV).

Figure 9:
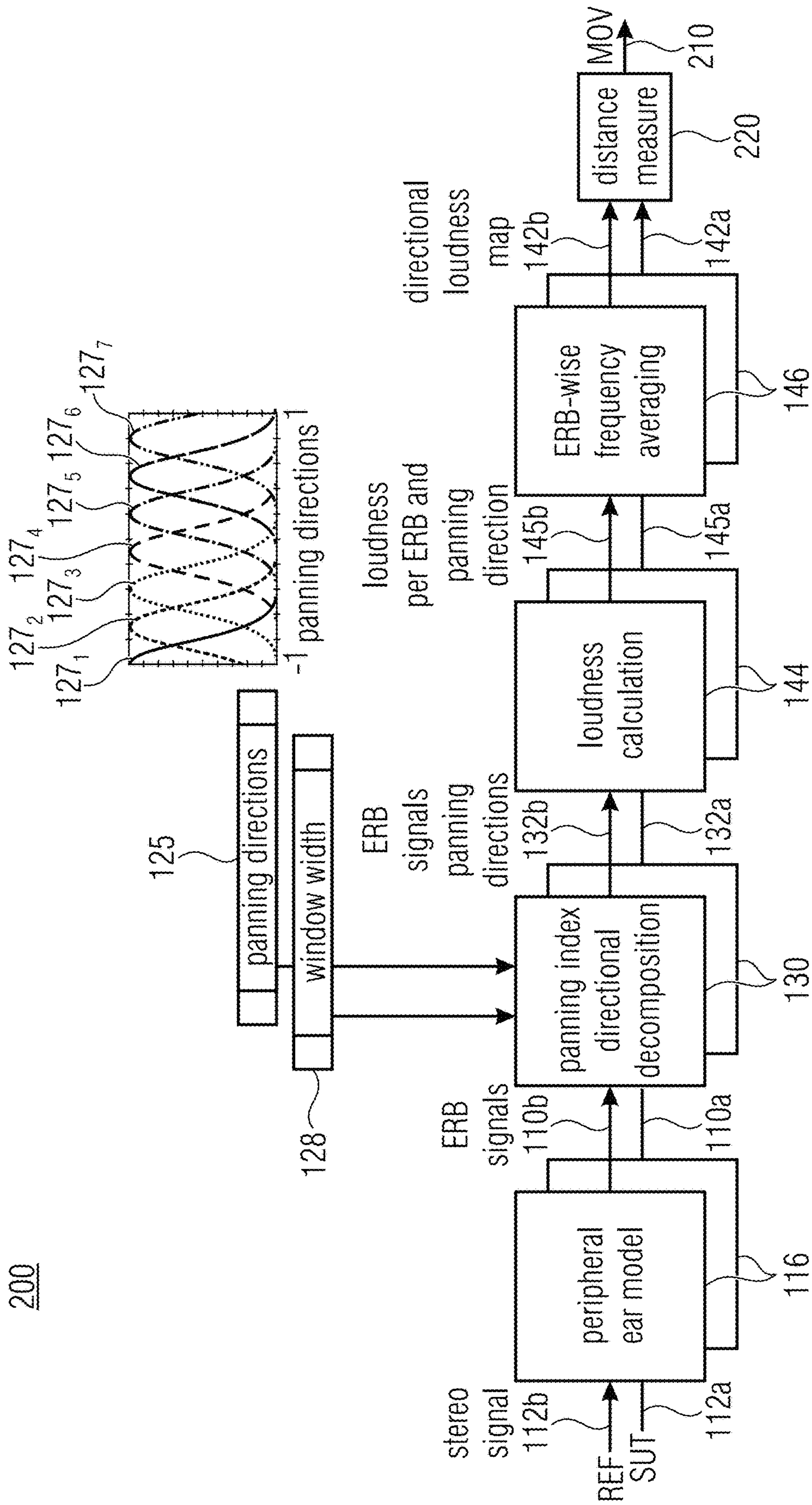
FIG. 9 shows a block diagram of an audio similarity evaluator for analyzing a stereo signal according to an embodiment of the present invention.

FIG. 9 shows an embodiment of an audio similarity evaluator 200 for calculating a similarity information 210 based on a reference stereo input signal 112*b* and a stereo signal to be analyzed 112*a* (e.g., in this case a signal under test (SUT)). According to an embodiment, the audio similarity evaluator 200 can comprise features and/or functionalities as described with regard to the audio similarity evaluator in FIG. 8. The two stereo signals 112*a* and 112*b* can be processed by a peripheral ear model 116 to obtain spectral-domain representations 110*a* and 110*b* of the stereo input audio signals 112*a* and 112*b*.

According to an embodiment, in a next step audio components of the stereo signals 112*a* and 112*b* can be analyzed for their directional information. Different panning directions 125 can be predetermined and can be combined with a window width 128 to obtain a direction-dependent weighting $127_1$ to $127_7$. Based on the direction-dependent weighting 127 and the spectral-domain representation 110*a* and/or 110*b* of the respective stereo input signal 112*a* and/or 112*b* a panning index directional decomposition 130 can be performed to obtain contributions 132*a* and/or 132*b*. According to an embodiment, the contributions 132*a* and/or 132*b* are then, for example, processed by a loudness calculation 144 to obtain loudness 145*a* and/or 145*b* per frequency band and panning direction. According to an embodiment, an ERB-wise frequency averaging 146 (ERB=equivalent rectangular bandwidth) is performed on the loudness signals 145*b* and/or 145*a* to obtain directional loudness maps 142*a* and/or 142*b* for a loudness information comparison 220. The loudness information comparison 220 is, for example, configured to calculate a distance measure based on the two directional loudness maps 142*a* and 142*b*. The distance measure can represent a directional loudness map comprising differences between the two directional loudness maps 142*a* and 142*b*. According to an embodiment, a single numbered termed model output variable MOV can be obtained as the similarity information 210 by averaging the distance measure over all panning directions and time.

Figure 10A:
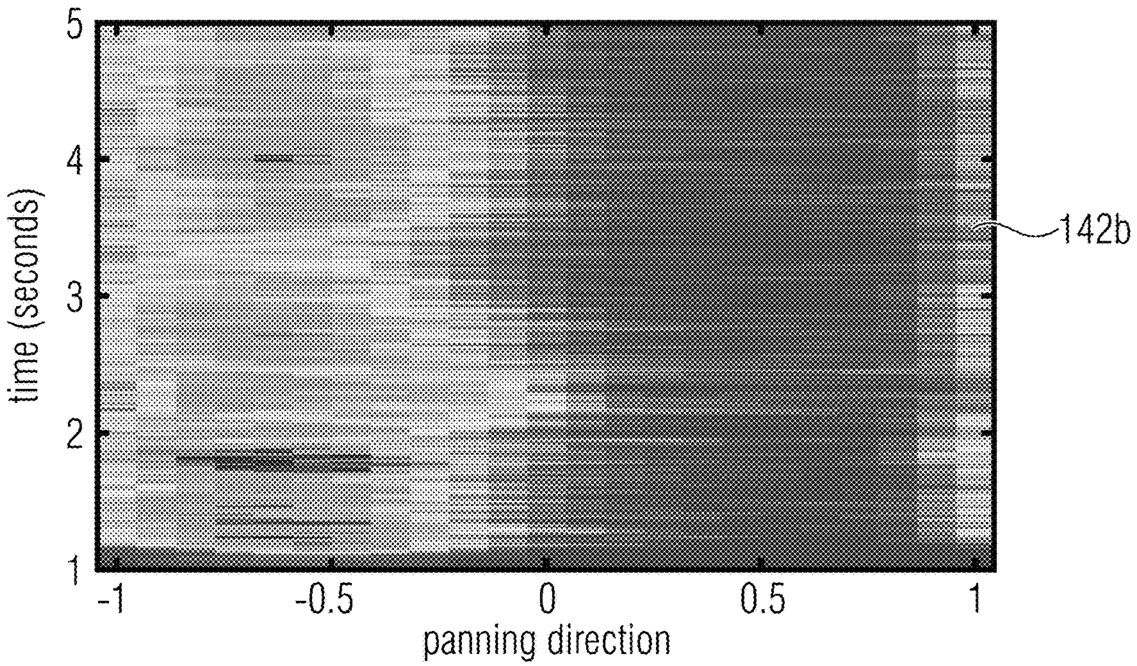
FIG. 10*a* shows a color plot of a reference directional loudness map usable by an audio similarity evaluator according to an embodiment of the present invention.
Figure 10B:
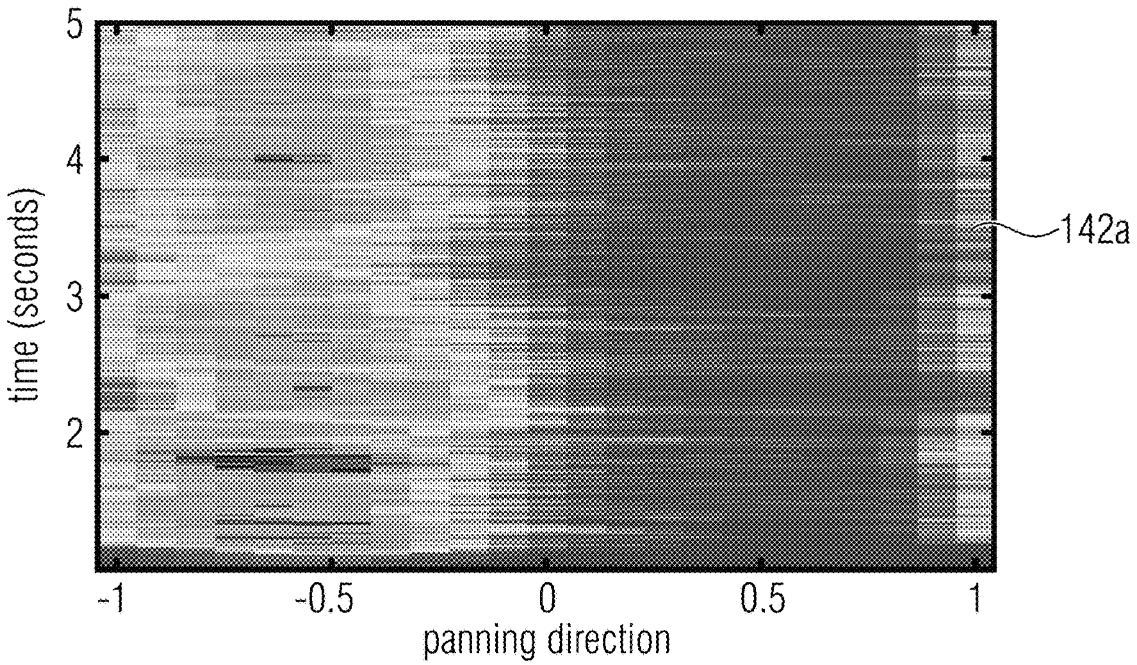
FIG. 10*b* shows a color plot of a directional loudness map to be analyzed by an audio similarity evaluator according to an embodiment of the present invention.
Figure 10C:
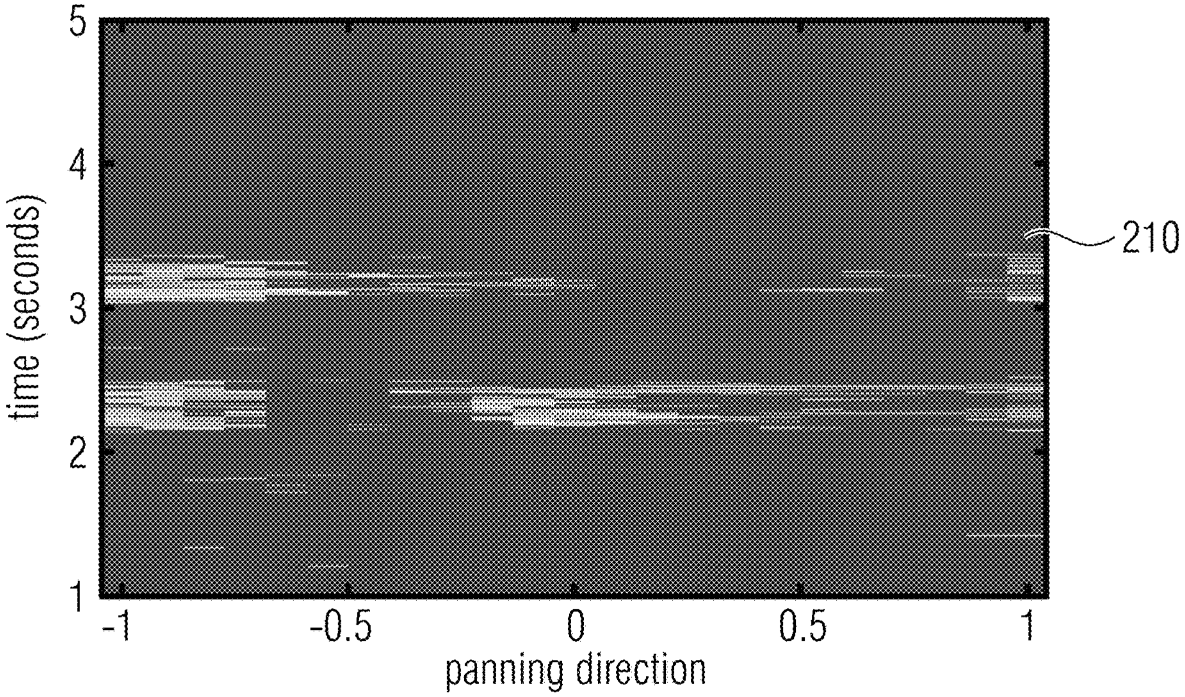
FIG. 10*c* shows a color plot of a difference directional loudness map determined by an audio similarity evaluator according to an embodiment of the present invention.

FIG. 10*c* shows a distance measure as described in FIG. 9 or a similarity information as described in FIG. 8 represented by a directional loudness map 210 showing loudness differences between the directional loudness map 142*b*, shown in FIG. 10*a*, and 142*a*, shown in FIG. 10*b*. The directional loudness maps shown in FIG. 10*a* to FIG. 10*c* represent, for example, loudness values over time and panning directions. The directional loudness map shown in FIG. 10*a* can represent loudness values corresponding to a reference value input signal. This directional loudness map can be calculated as described in FIG. 9 or by an audio analyzer as described in FIG. 1 to FIG. 4*b* or, alternatively, can be taken out of a database. The directional loudness map shown in FIG. 10*b* corresponds, for example, to a stereo signal under test, and can represent a loudness information determined by an audio analyzer as explained in FIGS. 1 to 4*b* and FIG. 8 or 9.

Figure 11:
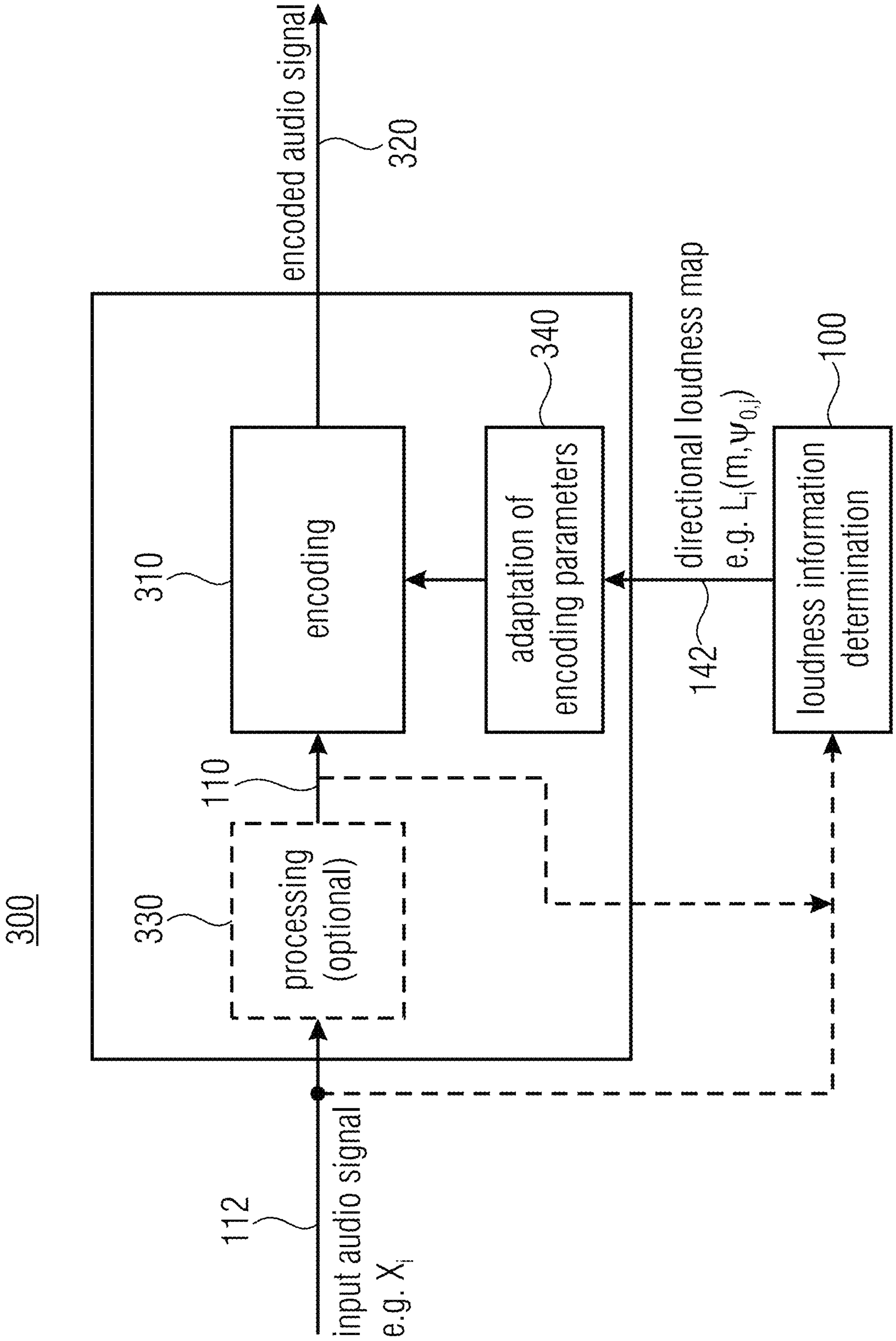
FIG. 11 shows a block diagram of an audio encoder according to an embodiment of the present invention.

FIG. 11 shows an audio encoder 300 for encoding 310 an input audio content 112 comprising one or more input audio signals (e.g., $x_i$). The input audio content 112 comprises a plurality of input audio signals, such as stereo signals or multi-channel signals. The audio encoder 300 is configured to provide one or more encoded audio signals 320 on the basis of the one or more input audio signals 112, or on the basis of one or more signals 110 derived from the one or more input audio signals 112 by an optional processing 330. Thus either the one or more input audio signals 112 or the one or more signals 110 derived therefrom are encoded 310 by the audio encoder 300. The processing 330 can comprise a mid/side processing, a downmix/difference processing, a time-domain to spectral-domain conversion and/or an ear model processing. The encoding 310 comprises, for example, a quantization and then a lossless encoding.

The audio encoder 300 is configured to adapt 340 encoding parameters in dependence on one or more directional loudness maps 142 (e.g., $L_i(m, \Psi_{0,j})$ for a plurality of different $\Psi_0$), which represent loudness information associated with a plurality of different directions (e.g., predetermined directions or directions of the one or more signals 112 to be encoded). According to an embodiment, the encoding parameters comprise quantization parameters and/or other encoding parameters, like a bit distribution and/or parameters relating to a disabling/enabling of the encoding 310.

According to an embodiment, the audio encoder 300 is configured to perform a loudness information determination 100 to obtain the directional loudness map 142 based on the input audio signal 112, or based on the processed input audio signal 110. Thus, for example, the audio encoder 300 can comprise an audio analyzer 100 as described with regard to FIG. 1 to FIG. 4*b*. Alternatively, the audio encoder 300 can receive the directional loudness map 142 from an external audio analyzer performing the loudness information determination 100. According to an embodiment, the audio encoder 300 can obtain more than one directional loudness map 142 related to the input audio signals 112 and/or the processed input audio signals 110.

According to an embodiment, the audio encoder 300 can receive only one input audio signal 112. In this case, the directional loudness map 142 comprises, for example, loudness values for only one direction. According to an embodiment, the directional loudness map 142 can comprise loudness values equaling zero for directions differing from a direction associated with the input audio signal 112. In the case of only one input audio signal 112 the audio encoder 300 can decide based on the directional loudness map 142 if the adaptation 340 of the encoding parameters should be performed. Thus, for example, the adaptation 340 of the encoding parameters can comprise a setting of the encoding parameters to standard encoding parameters for mono signals.

If the audio encoder 300 receives a stereo signal or a multi-channel signal as the input audio signal 112, the directional loudness map 142 can comprise loudness values for different directions (e.g., differing from zero). In case of a stereo input audio signal the audio encoder 300 obtains, for example, one directional loudness map 142 associated with the two input audio signals 112. In case of a multi-channel input audio signal 112 the audio encoder 300 obtains, for example, one or more directional loudness maps 142 based on the input audio signals 112. If a multi-channel signal 112 is encoded by the audio encoder 300, e.g., an overall directional loudness map 142, based on all channel signals and/or directional loudness maps, and/or one or more directional loudness maps 142, based on signal pairs of the multi-channel input audio signal 112, can be obtained by the loudness information determination 100. Thus, for example, the audio encoder 300 can be configured to perform the adaptation 340 of the encoding parameters in dependence on contributions of individual directional loudness maps 142, for example, of signal pairs, a mid-signal, a side-signal, a downmix signal, a difference signal and/or of groups of three or more signals, to an overall directional loudness map 142, for example, associated with multiple input audio signals, e.g., associated with all signals of the multi-channel input audio signal 112 or a processed multi-channel input audio signal 110.

The loudness information determination 100 as described with regard to FIG. 11 is exemplary and can be performed identically or similarly by all following audio encoders or decoders.

Figure 12:
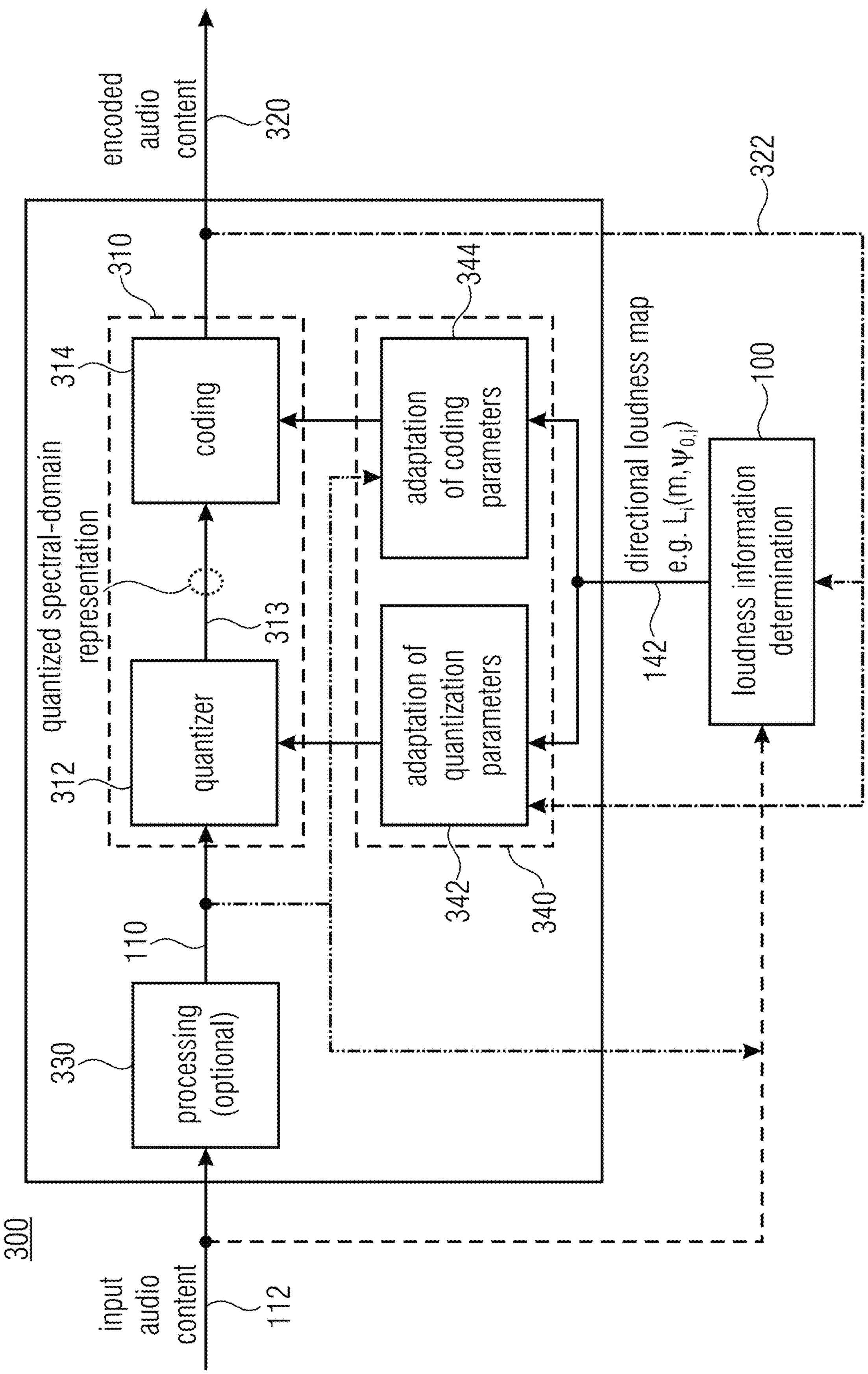
FIG. 12 shows a block diagram of an audio encoder configured to adapt quantization parameters according to an embodiment of the present invention.

FIG. 12 shows an embodiment of an audio encoder 300, which can comprise features and/or functionalities as described with regard to the audio encoder in FIG. 11. According to an embodiment, the encoding 310 can comprise a quantization by a quantizer 312 and a coding by a coding unit 314, like e.g., an entropy coding. Thus, for example, the adaptation of encoding parameters 340 can comprise an adaptation of quantization parameters 342 and an adaptation of coding parameters 344. The audio encoder 300 is configured to encode 310 an input audio content 112, comprising, for example, two or more input audio signals, to provide an encoded audio content 320, comprising, for example, the encoded two or more input audio signals. This encoding 310 depends, for example, on a directional loudness map 142 or a plurality of directional loudness maps 142 (e.g., $L_i(m, \Psi_{0,j})$), which is or which are based on the input audio content 112 and/or on an encoded version 320 of the input audio content 112.

According to an embodiment, the input audio content 112 can be directly encoded 310 or optionally processed 330 before. As already described above, the audio encoder 300 can be configured to determine a spectral-domain representation 110 of one or more input audio signals of the input audio content 112 by the processing 330. Alternatively, the processing 330 can comprise further processing steps to derive one or more signals of the input audio content 112, which can undergo a time-domain to spectral-domain conversion to receive the spectral-domain representations 110. According to an embodiment, the signals derived by the processing 330 can comprise, for example, a mid-signal or downmix signal and side-signal or difference signal.

According to an embodiment, the signals of the input audio content 112 or the spectral-domain representations 110 can undergo a quantization by the quantizer 312. The quantizer 312 uses, for example, one or more quantization parameters to obtain one or more quantized spectral-domain representations 313. This one or more quantized spectral-domain representations 313 can be encoded by the coding unit 314, in order to obtain the one or more encoded audio signals of the encoded audio content 320.

To optimize the encoding 310 by the audio encoder 300, the audio encoder 300 can be configured to adapt 342 quantization parameters. The quantization parameters, for example, comprise scale factors or parameters describing which quantization accuracies or quantization steps should be applied to which spectral bins of frequency bands of the one or more signals to be quantized. According to an embodiment, the quantization parameters describe, for example, an allocation of bits to different signals to be quantized and/or to different frequency bands. The adaptation 342 of the quantization parameters can be understood as an adaptation of a quantization precision and/or an adaptation of noise introduced by the encoder 300 and/or as an adaptation of a bit distribution between the one or more signals 112/110 and/or parameters to be encoded by the audio encoder 300. In other words, the audio encoder 300 is configured to adjust the one or more quantization parameters in order to adapt the bit distribution, to adapt the quantization precision, and/or to adapt the noise. Additionally the quantization parameters and/or the coding parameters can be encoded 310 by the audio encoder.

According to an embodiment, the adaptation 340 of encoding parameters, like the adaptation 342 of the quantization parameters and the adaptation 344 of the coding parameters, can be performed in dependence on the one or more directional loudness maps 142, which represents loudness information associated with the plurality of different directions, panning directions, of the one or more signals 112/110 to be quantized. To be more accurate, the adaptation 340 can be performed in dependence on contributions of individual directional loudness maps 142 of the one or more signals to be encoded to an overall directional loudness map 142. This can be performed as described with regard to FIG. 11. Thus, for example, an adaptation of a bit distribution, an adaptation of a quantization precision, and/or an adaptation of the noise can be performed in dependence of contributions of individual directional loudness maps of the one or more signals 112/110 to be encoded to an overall directional loudness map. This is, for example, performed by an adjustment of the one or more quantization parameters by the adaptation 342.

According to an embodiment, the audio encoder 300 is configured to determine the overall directional loudness map on the basis of the input audio signals 112, or the spectral-domain representations 110, such that the overall directional loudness map represents loudness information associated with different directions, for example, of audio components, of an audio scene represented by the input audio content 112. Alternatively, the overall directional loudness map can represent loudness information associated with different directions of an audio scene to be represented, for example, after a decoder-sided rendering. According to an embodiment, the different directions can be obtained by a loudness information determination 100 possibly in combination with knowledge or side information regarding positions of loudspeakers and/or knowledge or side information describing positions of audio objects. This knowledge or side information can be obtained based on the one or more signals 112/110 to be quantized, since these signals 112/110 are, for example, associated in a fixed, non-signal-dependent manner, with different directions or with different loudspeakers, or with different audio objects. A signal is, for example, associated with a certain channel, which can be interpreted as a direction of the different directions (e.g., of the herein described first directions). According to an embodiment, audio objects of the one or more signals are panned to different directions or rendered at different directions, which can be obtained by the loudness information determination 100 as an object rendering information. This knowledge or side information can be obtained by the loudness information determination 100 for groups of two or more input audio signals of the input audio content 112 or the spectral-domain representations 110.

According to an embodiment, the signals 112/110 to be quantized can comprise components, for example, a mid-signal and a side-signal of a mid-side stereo coding, of a joint multi-signal coding of two or more input audio signals 112. Thus, the audio encoder 300 is configured to estimate the aforementioned contributions of directional loudness maps 142 of one or more residual signals of the joint multi-signal coding to the overall directional loudness map 142, and to adjust the one or more encoding parameter 340 in dependence thereof.

According to an embodiment, the audio encoder 300 is configured to adapt the bit distribution between the one or more signals 112/110 and/or parameters to be encoded, and/or to adapt the quantization precision of the one or more signals 112/110 to be encoded, and/or to adapt the noise introduced by the encoder 300, individually for different spectral bins or individually for different frequency bands. This means, for example, that the adaptation 342 of the quantization parameters is performed such that the encoding 310 is improved for individual spectral bins or individual different frequency bands.

According to an embodiment, the audio encoder 300 is configured to adapt the bit distribution between the one or more signals 112/110 and/or the parameters to be encoded in dependence on an evaluation of a spatial masking between two or more signals to be encoded. The audio encoder is, for example, configured to evaluate the spatial masking on the basis of the directional loudness maps 142 associated with the two or more signals 112/110 to be encoded. Additionally or alternatively, the audio encoder is configured to evaluate the spatial masking or a masking effect of a loudness contribution associated with a first direction of a first signal to be encoded onto a loudness contribution associated with a second direction, which is different from the first direction, of a second signal to be encoded. According to an embodiment, the loudness contribution associated with the first direction can, for example, represent a loudness information of an audio object or audio component of the signals of the input audio content and the loudness contribution associated with the second direction can represent, for example, a loudness information associated with another audio object or audio component of the signals of the input audio content. Dependent on the loudness information of the loudness contribution associated with the first direction and the loudness contribution associated with the second direction, and depending on the distance between the first direction and the second direction, the masking effect or the spatial masking can be evaluated. According to an embodiment, the masking effect reduces with an increasing difference of the angles between the first direction and the second direction. Similarly a temporal masking can be evaluated.

According to an embodiment, the adaptation 342 of the quantization parameters can be performed by the audio encoder 300 in order to adapt the noise introduced by the encoder 300 based on a directional loudness map achievable by an encoded version 320 of the input audio content 112. Thus, the audio encoder 300 is, for example, configured to use a deviation between a directional loudness map 142, which is associated with a given un-encoded input audio signal 112/110 (or two or more input audio signals), and a directional loudness map achievable by an encoded version 320 of the given input audio signal 112/110 (or two or more input audio signals), as a criterion for an adaptation of the provision of the given encoded audio signal or audio signals of the encoded audio content 320. This deviation can represent a quality of the encoding 310 of the encoder 300. Thus, the encoder 300 can be configured to adapt 340 the encoding parameters such that the deviation is below a certain threshold. Thus, the feedback loop 322 is realized to improve the encoding 310 by the audio encoder 300 based on directional loudness maps 142 of the encoded audio content 320 and directional loudness maps 142 of the un-encoded input audio content 112 or of the un-encoded spectral-domain representations 110. According to an embodiment, in the feedback loop 322 the encoded audio content 320 is decoded to perform a loudness information determination 100 based on decoded audio signals. Alternatively, it is also possible that the directional loudness maps 142 of the encoded audio content 320 are achieved by a feed forward realized by a neuronal network (e.g., predicted).

According to an embodiment, the audio encoder is configured to adjust the one or more quantization parameters by the adaptation 342 to adapt a provision of the one or more encoded audio signals of the encoded audio content 320.

According to an embodiment, the adaptation 340 of encoding parameters can be performed in order to disable or enable the encoding 310 and/or to activate and deactivate a joint coding tool, which is, for example, used by the coding unit 314. This is, for example, performed by the adaptation 344 of the coding parameters. According to an embodiment, the adaptation 344 of the coding parameters can depend on the same considerations as the adaptation 342 of the quantization parameters. Thus, According to an embodiment, the audio encoder 300 is configured to disable the encoding 310 of a given one of the signals to be encoded, e.g., of a residual signal, when contributions of an individual directional loudness map 142 of the given one of the signals to be encoded (or, e.g., when contributions of a directional loudness map 142 of a pair of signals to be encoded or of a group of three or more signals to be encoded) to an overall direction loudness map is below a threshold. Thus, the audio encoder 300 is configured to effectively encode 310 only relevant information.

According to an embodiment, the joint coding tool of the coding unit 314 is, for example, configured to jointly encode two or more of the input audio signals 112, or signals 110 derived therefrom, for example, to make an M/S (mid/side-signal) on/off decision. The adaptation 344 of the coding parameters can be performed such that the joint coding tool is activated or deactivated in dependence on one or more directional loudness maps 142, which represent loudness information associated with a plurality of different directions of the one or more signals 112/110 to be encoded. Alternatively or additionally, the audio encoder 300 can be configured to determine one or more parameters of a joint coding tool as coding parameters in dependence on the one or more directional loudness maps 142. Thus, with the adaptation 344 of the coding parameters, for example, a smoothing of frequency-dependent prediction factors can be controlled, for example, to set parameters of an "intensity stereo" joint coding tool.

According to an embodiment, the quantization parameters and/or the coding parameters can be understood as control parameters, which can control the provision of the one or more encoded audio signals 320. Thus, the audio encoder 300 is configured to determine or estimate an influence of a variation of the one or more control parameters onto a directional loudness map 142 of one or more encoded signals 320, and to adjust the one or more control parameters in dependence on the determination or estimation of the influence. This can be realized by the feedback loop 322 and/or by a feed forward as described above.

Figure 13:
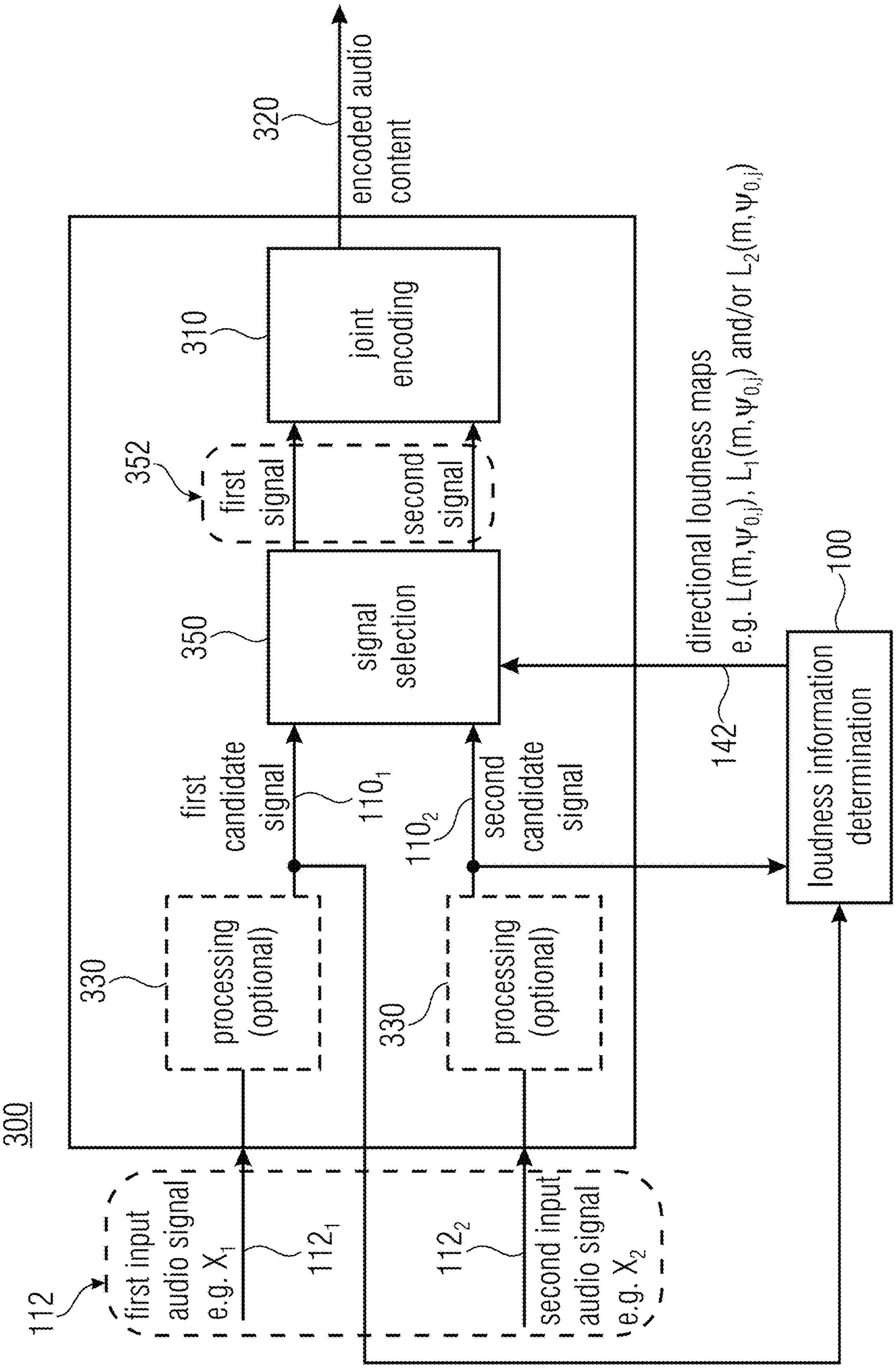
FIG. 13 shows a block diagram of an audio encoder configured to select signals to be encoded according to an embodiment of the present invention.

FIG. 13 shows an audio encoder 300 for encoding 310 an input audio content 112 comprising one or more input audio signals $\mathbf{112}_1$, $\mathbf{112}_2$. As shown in FIG. 13, the input audio content 112 comprises a plurality of input audio signals, such as two or more input audio signals $\mathbf{112}_1$, $\mathbf{112}_2$. According to an embodiment, the input audio content 112 can comprise time-domain signals or spectral-domain signals. Optionally, the signals of the input audio content 112 can be processed 330 by the audio encoder 300 to determine candidate signals, like the first candidate signal $\mathbf{110}_1$ and/or the second candidate signal $\mathbf{110}_2$. The processing 330 can comprise, for example, a time-domain to spectral-domain conversion, if the input audio signals 112 are time-domain signals.

The audio encoder 300 is configured to select 350 signals to be encoded jointly 310 out of a plurality of candidate signals 110, or out of a plurality of pairs of candidate signals 110 in dependence on directional loudness maps 142. The directional loudness maps 142 represent loudness information associated with a plurality of different directions, e.g., panning directions, of the candidate signals 110 or of the pairs of candidate signals 110 and/or predetermined directions.

According to an embodiment, the directional loudness maps 142 can be calculated by the loudness information determination 100 as described herein. Thus, the loudness information determination 100 can be implemented as described with regard to the audio encoder 300 described in FIG. 11 or FIG. 12. The directional loudness maps 142 are based on the candidate signals 110, wherein the candidate signals represent the input audio signals of the input audio content 112 if no processing 330 is applied by the audio encoder 300.

If the input audio content 112 comprises only one input audio signal, this signal is selected by the signal selection 350 to be encoded by the audio encoder 300, for example, using an entropy encoding to provide one encoded audio signal as the encoded audio content 320. In this case, for example, the audio encoder is configured to disable the joint encoding 310 and to switch to an encoding of only one signal.

If the input audio content 112 comprises two input audio signals $\mathbf{112}_1$ and $\mathbf{112}_2$, which can be described as $X_1$ and $X_2$, both signals $\mathbf{112}_1$ and $\mathbf{112}_2$ are selected 350 by the audio encoder 300 for the joint encoding 310 to provide one or more encoded signals in the encoded audio content 320. Thus, the encoded audio content 320 optionally comprises a mid-signal and a side-signal, or a downmix signal and a difference signal, or only one of these four signals.

If the input audio content 112 comprises three or more input audio signals, the signal selection 350 is based on the directional loudness maps 142 of the candidate signals 110. According to an embodiment, the audio encoder 300 is configured to use the signal selection 350 to select one signal pair out of the plurality of candidate signals 110, for which, according to the directional loudness maps 142, an efficient audio encoding and a high-quality audio output can be realized. Alternatively or additionally, it is also possible that the signal selection 350 selects three or more signals of the candidate signals 110 to be encoded jointly 310. Alternatively or additionally, it is possible that the audio encoder 300 uses the signal selection 350 to select more than one signal pair or group of signals for a joint encoding 310. The selection 350 of the signals 352 to be encoded can depend on contributions of individual directional loudness maps 142 of a combination of two or more signals to an overall directional loudness map. According to an embodiment, the overall directional loudness map is associated with multiple selected input audio signals or with each signal of the input audio content 112. How this signal selection 350 can be performed by the audio encoder 300 is exemplarily described in FIG. 14 for an input audio content 112 comprising three input audio signals.

Thus, the audio encoder 300 is configured to provide one or more encoded, for example, quantized and then losslessly encoded, audio signals, for example, encoded spectral-domain representations, on the basis of two or more input audio signals $112_1$, $112_2$, or on the basis of two or more signals $110_1$, $110_2$ derived therefrom, using the joint encoding 310 of two or more signals 352 to be encoded jointly.

According to an embodiment, the audio encoder 300 is, for example, configured to determine individual directional loudness maps 142 of two or more candidate signals, and compare the individual directional loudness maps 142 of the two or more candidate signals. Additionally the audio encoder is, for example, configured to select two or more of the candidate signals for a joint encoding in dependence on a result of the comparison, for example, such that candidate signals, individual loudness maps of which comprise a maximum similarity or a similarity which is higher than a similarity threshold, are selected for a joint encoding. With this optimized selection, a very efficient encoding can be realized since the high similarity of the signals to be encoded jointly can result in an encoding using only few bits. This means, for example, that a downmix signal or a residual signal of the chosen candidate pair can be efficiently encoded jointly.

Figure 14:
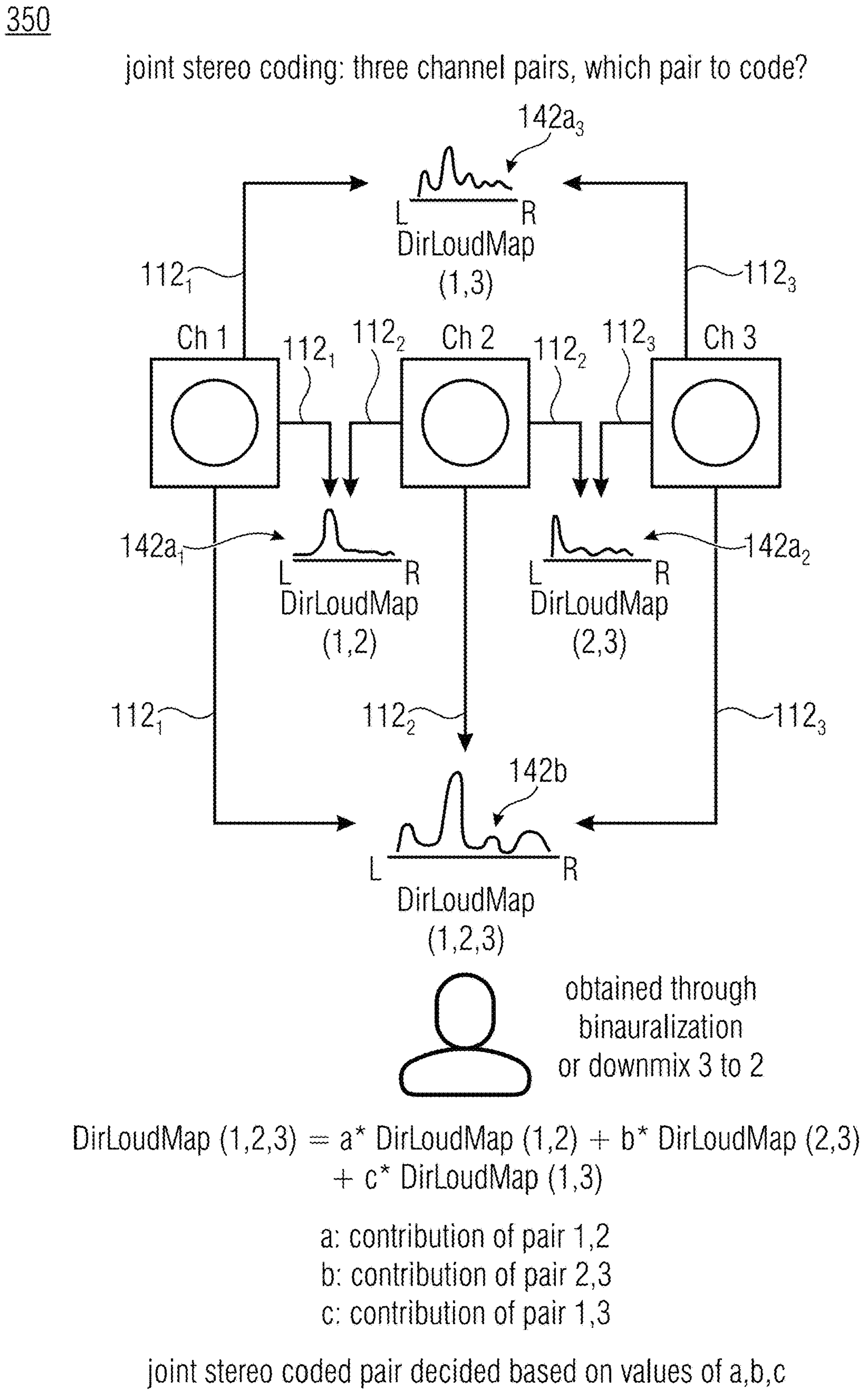
FIG. 14 shows a schematic figure illustrating a determination of contributions of individual directional loudness maps of the candidate signals to an overall directional loudness map performed by an audio encoder according to an embodiment of the present invention.

FIG. 14 shows an embodiment of a signal selection 350, which can be performed by any audio encoder 300 described herein, like the audio encoder 300 in FIG. 13. The audio encoder can be configured to use the signal selection 350 as shown in FIG. 14 or apply the described signal selection 350 to more than three input audio signals, to select signals to be encoded jointly out of a plurality of candidate signals or out of a plurality of pairs of candidate signals in dependence on contributions of individual directional loudness maps of the candidate signals to an overall directional loudness map 142*b*, or in dependence on contributions of directional loudness maps $142a_1$ to 142*a*3 of the pairs of candidate signals to the overall directional loudness map 142*b* as shown in FIG. 14.

According to FIG. 14, for each possible signal pair a directional loudness map $142a_1$ to $142a_3$ is, for example, received by the signal selection 350 and the overall directional loudness map 142*b*, associated with all three signals of the input audio content, is received by the signal selection unit 350. The directional loudness maps 142, e.g., the directional loudness maps of the signal pairs $142a_1$ to $142a_3$ and the overall directional loudness map 142*b*, can be received from an audio analyzer or can be determined by the audio encoder and provided for the signal selection 350. According to an embodiment, the overall directional loudness map 142*b* can represent an overall audio scene, for example, represented by the input audio content, for example, before a processing by the audio encoder. According to an embodiment, the overall directional loudness map 142*b* represents loudness information associated with the different directions, e.g., of audio components, of an audio scene represented or to be represented, for example, after a decoder-sided rendering, by the input audio signals $112_1$ to $112_3$. The overall directional loudness map is, for example, represented as DirLoudMap (1, 2, 3). According to an embodiment, the overall directional loudness map 142*b* is determined by the audio encoder using a downmixing of the input audio signals $112_1$ to $112_3$ or using a binauralization of the input audio signals $112_1$ to $112_3$.

FIG. 14 shows a signal selection 350 for three channels CH1 to CH3, respectively, associated with a first input audio signal $112_1$, a second input audio signal $112_2$, or the third input audio signal $112_3$. A first directional loudness map $142a_1$, e.g., DirLoudMap (1, 2) is based on the first input audio signal $112_1$ and the second input audio signal $112_2$, a second directional loudness map 142*a*2, e.g., DirLoudMap (2, 3) is based on the second input audio signal $112_2$ and the third input audio signal $112_3$, and the third directional loudness map $142a_3$, e.g., DirLoudMap (1, 3) is based on the first input audio signal $112_1$, and the third input audio signal $112_3$.

According to an embodiment, each directional loudness map 142 represents loudness information associated with different directions. The different directions are indicated in FIG. 14 by the line between L and R, wherein L is associated with a panning of audio components to a left side, and wherein the R is associated with a panning of audio components to a right side. Thus, the different directions comprise the left side and the right side and the directions or angles between the left and the right side. The directional loudness maps 142 shown in FIG. 14 are represented as diagrams, but alternatively it is also possible that the directional loudness maps 142 can be represented by a directional loudness histogram as shown in FIG. 5, or by a matrix as shown in FIG. 10*a* to FIG. 10*c*. It is clear that only the information associated with the directional loudness maps 142 is relevant for the signal selection 350 and that the graphical representation is only for an improvement of understanding.

According to an embodiment, the signal selection 350 is performed such that a contribution of pairs of candidate signals to the overall directional loudness map 142*b* are determined. A relation between the overall directional loudness map 142*b* and the directional loudness maps $142a_1$ to $142a_3$ of the pairs of candidate signals can be described by the formula $$\text{DirLoudMap}(1,2,3)=a*\text{DirLoudMap}(1,2,3)+b*\text{DirLoudMap}(2,3)+c*\text{DirLoudMap}(1,3).$$

The contribution as determined by the audio encoder using the signal selection can be represented by the factors a, b and c.

According to an embodiment, the audio encoder is configured to choose one or more pairs of candidate signals $112_1$ to $112_3$ having a highest contribution to the overall directional loudness map 142*b* for a joint encoding. This means, for example, that the pair of candidate signals is chosen by the signal selection 350, which is associated with the highest factor of the factors a, b and c.

Alternatively, the audio encoder is configured to choose one or more pairs of candidate signals $112_1$ to $112_3$ having a contribution to the overall directional loudness map 142*b*, which is larger than a predetermined threshold for a joint encoding. This means, for example, that a predetermined threshold is chosen and that each factor a, b, c is compared with the predetermined threshold to select each signal pair associated with a factor larger than the predetermined threshold.

According to an embodiment, the contributions can be in a range of 0% to 100%, which means, for example, for the factors a, b and c a range from 0 to 1. A contribution of 100% is, for example, associated with a directional loudness map 142*a* equaling exactly the overall directional loudness map 142*b*. According to an embodiment, the predetermined threshold depends on how many input audio signals are included in the input audio content. According to an embodiment, the predetermined threshold can be defined as a contribution of at least 35% or of at least 50% or of at least 60% or of at least 75%.

According to an embodiment, the predetermined threshold depends on how many signals have to be selected by the signal selection 350 for the joint encoding. If, for example, at least two signal pairs have to be selected, two signal pairs can be selected, which are associated with directional loudness maps 142*a* having the highest contribution to the overall directional loudness map 142*b*. This means, for example, that the signal pair with the highest contribution and with the second highest contribution are selected 350.

It is advantageous to base the selection of the signals to be encoded by the audio encoder on directional loudness maps 142, since a comparison of directional loudness maps can indicate a quality of a perception of the encoded audio signals by a listener. According to an embodiment, the signal selection 350 is performed by the audio encoder such that the signal pair or the signal pairs are selected, for which their directional loudness map 142*a* is most similar to the overall directional loudness map 142*b*. This can result in a similar perception of the selected candidate pair or candidate pairs compared to a perception of all input audio signals. Thus, the quality of the encoded audio content can be improved.

Figure 15:
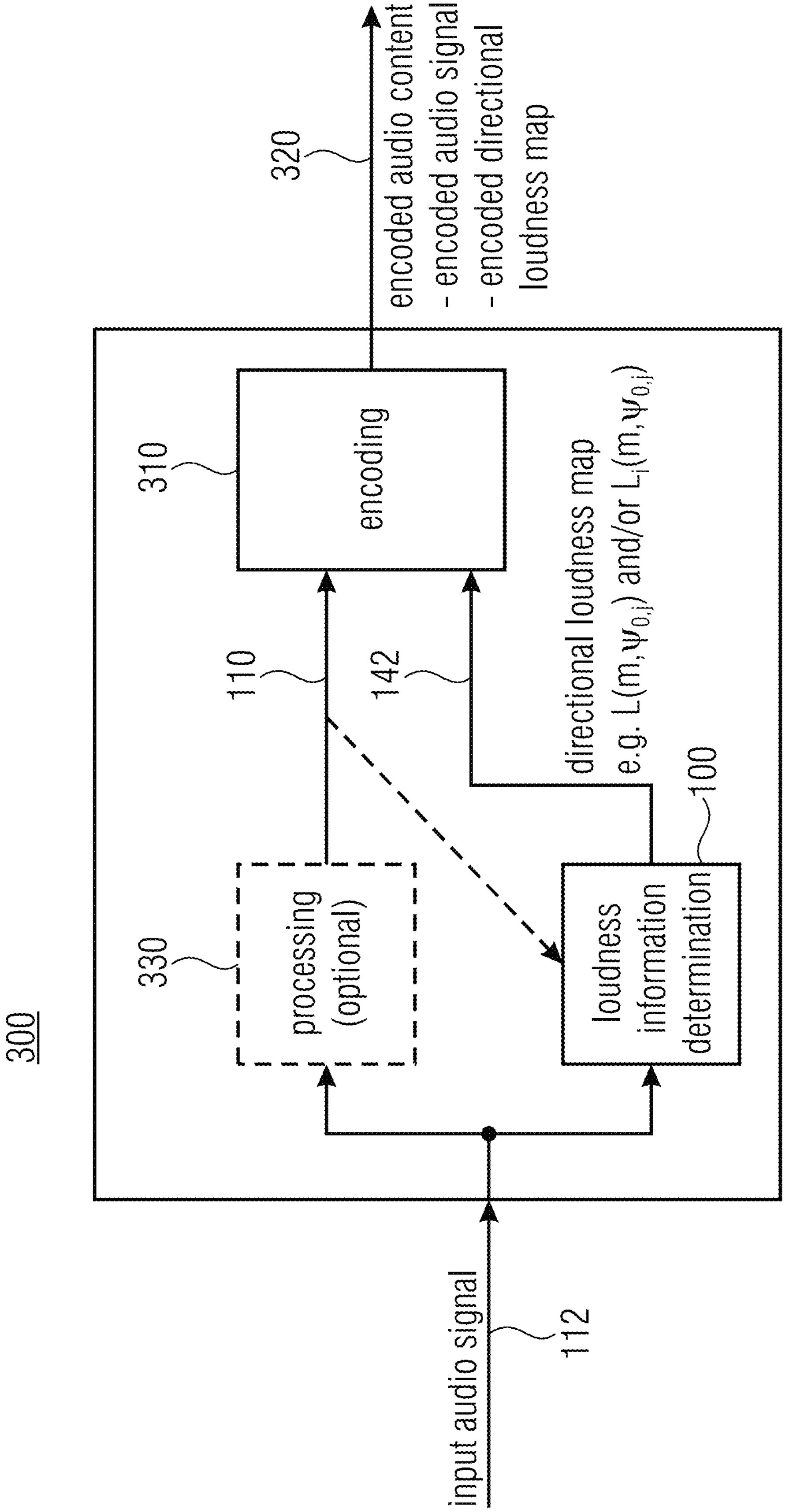
FIG. 15 shows a block diagram of an audio encoder configured to encode directional loudness information as side information according to an embodiment of the present invention.

FIG. 15 shows an embodiment of an audio encoder 300 for encoding 310 an input audio content 112 comprising one or more input audio signals. Two or more input audio signals are encoded 310 by the audio encoder 300. The audio encoder 300 is configured to provide one or more encoded audio signals 320 on the basis of two or more input audio signals 112, or on the basis of two or more signals 110 derived therefrom. The signal 110 can be derived from the input audio signal 112 by an optional processing 330. According to an embodiment, the optional processing 330 can comprise features and/or functionalities as described with regard to other herein described audio encoders 300. With the encoding 310 the signals to be encoded are, for example, quantized and then losslessly encoded.

The audio encoder 300 is configured to determine 100 an overall directional loudness map on the basis of the input audio signals 112 and/or to determine 100 one or more individual directional loudness maps 142 associated with individual input audio signals 112. The overall directional loudness map can be represented by $L(m, \varphi_{0,j})$ and the individual directional loudness maps can be represented by $L(m, \varphi_{0,j})$. According to an embodiment, the overall direction loudness map can represent a target directional loudness map of a scene. In other words, the overall directional loudness map can be associated with a desired directional loudness map for a combination of the encoded audio signals. Additionally or alternatively, it is possible that directional loudness maps $L(m, \varphi_{0,j})$ of signal pairs or of groups of three or more signals can be determined 100 by the audio encoder 300.

The audio encoder 300 is configured to encode 310 the overall directional loudness map 142 and/or one or more individual directional loudness maps 142 and/or one or more directional loudness maps of signal pairs or groups of three or more input audio signals 112 as a side information. Thus, the encoded audio content 320 comprises the encoded audio signals and the encoded directional loudness maps. According to an embodiment, the encoding 310 can depend on one or more directional loudness maps 142, whereby it is advantageous to also encode these directional loudness maps 142 to enable a high quality decoding of the encoded audio content 320. With the directional loudness maps 142 as encoded side information, an originally intended quality characteristic (e.g., to be achievable by the encoding 310 and/or by an audio decoder) is provided by the encoded audio content 320.

According to an embodiment, the audio encoder 300 is configured to determine 100 the overall directional loudness map $L(m, \varphi_{0,j})$ on the basis of the input audio signals 112 such that the overall directional loudness map represents loudness information associated with the different directions, for example, of audio components, of an audio scene represented by the input audio signals 112. Alternatively, the overall directional loudness map $L(m, \varphi_{0,j})$ represents loudness information associated with the different directions, for example, of audio components, of an audio scene to be represented, for example, after a decoder-sided rendering by the input audio signals. The loudness information determination 100 can be performed by the audio encoder 300 optionally in combination with knowledge or side information regarding positions of loudspeakers and/or knowledge or side information describing positions of audio objects in the input audio signals 112.

According to an embodiment, the loudness information determination 100 can be implemented as described with other herein described audio encoders 300.

The audio encoder 300 is, for example, configured to encode 310 the overall directional loudness map $L(m, \varphi_{0,j})$ in the form of a set of values, for example, scalar values, associated with different directions. According to an embodiment, the values are additionally associated with a plurality of frequency bins of frequency bands. Each value or values at discrete directions of the overall directional loudness map can be encoded. This means, for example, that each value of a color matrix as shown in FIG. 10*a* to FIG. 10*c* or values of different histogram bins as shown in FIG. 5, or values of a directional loudness map curve as shown in FIG. 14 for discrete directions are encoded.

Alternatively, the audio encoder 300 is, for example, configured to encode the overall directional loudness map $L(m, \varphi_{0,j})$ using a center position value and a slope information. The center position value describes, for example, an angle or a direction at which a maximum of the overall directional loudness map for a given frequency band or frequency bin, or for a plurality of frequency bins or frequency bands is located. The slope information represents, for example, one or more scalar values describing slopes of the values of the overall directional loudness map in angle direction. The scalar values of the slope information are, for example, values of the overall directional loudness map for directions neighboring the center position value. The center position value can represent a scalar value of a loudness information and/or a scalar value of a direction corresponding to the loudness value.

Alternatively, the audio encoder is, for example, configured to encode the overall directional loudness map $L(m, \varphi_{0,i})$ in the form of a polynomial representation or in the form of a spline representation.

According to an embodiment, the above-described encoding possibilities 310 for the overall directional loudness map $L(m, \varphi_{0,i})$ can also be applied for the individual directional loudness maps $L_i(m, \varphi_{0,i})$ and/or for directional loudness maps associated with signal pairs or groups of three or more signals.

According to an embodiment, the audio encoder 300 is configured to encode one downmix signal obtained on the basis of a plurality of input audio signals 112 and an overall directional loudness map $L(m, \varphi_{0,i})$. Optionally also a contribution of a directional loudness map, associated with the downmix signal, to the overall directional loudness map is, for example, encoded as side information.

Alternatively, the audio encoder 300 is, for example, configured to encode 310 a plurality of signals, for example, the input audio signals 112 or the signals 110 derived therefrom, and to encode 310 individual loudness maps $L_i(m, \varphi_{0,i})$ of the plurality of signals 112/110 which are encoded 310 (e.g., of individual signals, of signal pairs or of groups of three or more signals). The encoded plurality of signals and the encoded individual directional loudness maps are, for example, transmitted into the encoded audio representation 320, or included into the encoded audio representation 320.

According to an alternative embodiment, the audio encoder 300 is configured to encode 310 the overall directional loudness map $L(m, \varphi_{0,i})$, a plurality of signals, for example, the input audio signals 112 or the signals 110 derived therefrom, and parameters describing contributions, for example, relative contributions of the signals, which are encoded to the overall directional loudness map. According to an embodiment, the parameters can be represented by the parameters a, b and c as described in FIG. 14. Thus, for example, the audio encoder 300 is configured to encode 310 all the information on which the encoding 310 is based on to provide, for example, information for a high-quality decoding of the provided encoded audio content 320.

According to an embodiment, an audio encoder can comprise or combine individual features and/or functionalities as described with regard to one or more of the audio encoders 300 described in FIG. 11 to FIG. 15.

Figure 16:
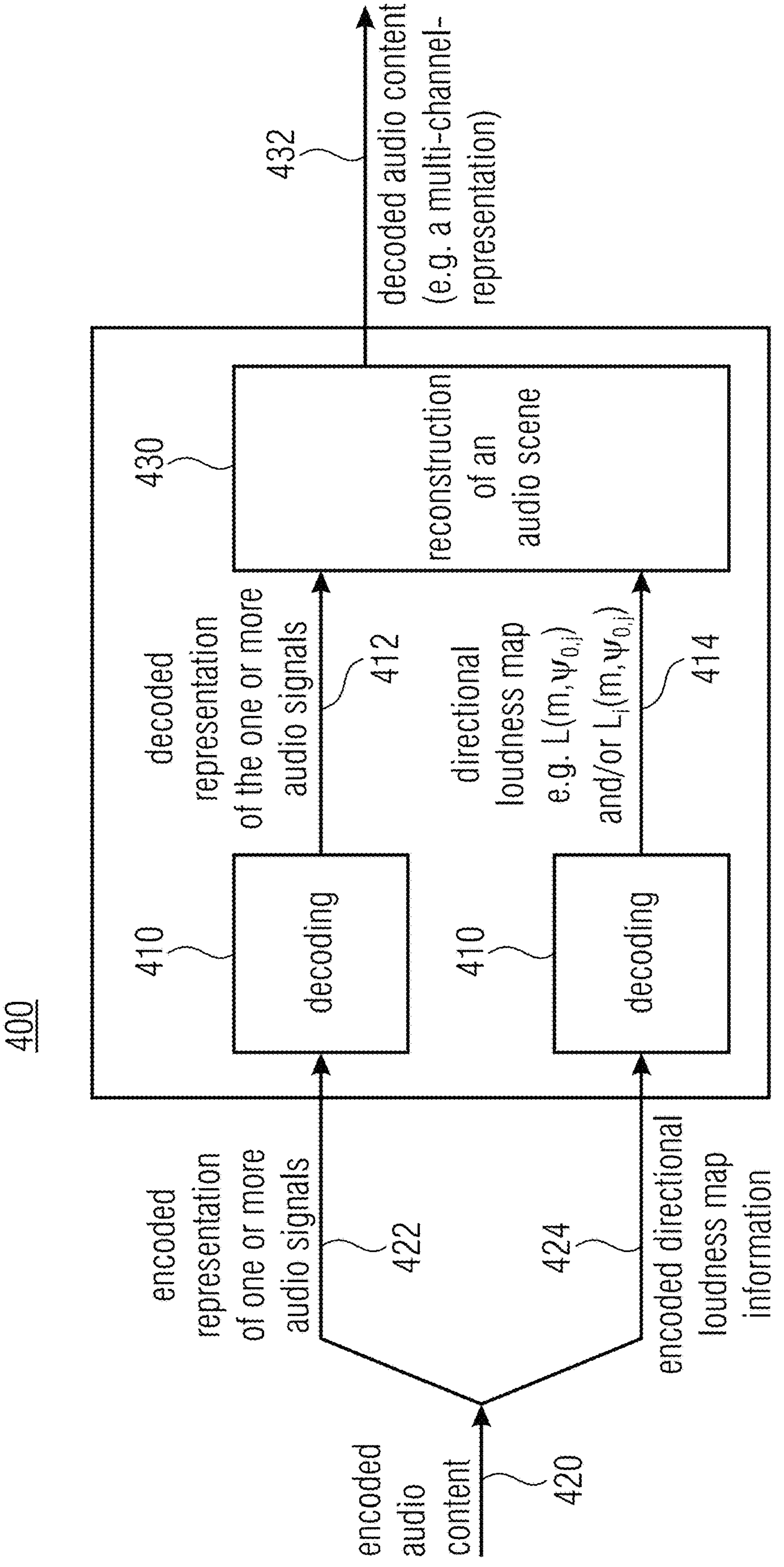
FIG. 16 shows a block diagram of an audio decoder according to an embodiment of the present invention.

FIG. 16 shows an embodiment of an audio decoder 400 for decoding 410 an encoded audio content 420. The encoded audio content 420 can comprise encoded representations 422 of one or more audio signals and encoded directional loudness map information 424.

The audio decoder 400 is configured to receive the encoded representation 422 of one or more audio signals and to provide a decoded representation 412 of the one or more audio signals. Furthermore, the audio decoder 400 is configured to receive the encoded directional loudness map information 424 and to decode 410 the encoded directional loudness map information 424, to obtain one or more decoded directional loudness maps 414. The decoded directional loudness maps 414 can comprise features and/or functionalities as described with regard to the above-described directional loudness maps 142.

According to an embodiment, the decoding 410 can be performed by the audio decoder 400 using an AAC-like decoding or using a decoding of entropy-encoded spectral values, or using a decoding of entropy-encoded loudness values.

The audio decoder 400 is configured to reconstruct 430 an audio scene using the decoded representation 412 of the one or more audio signals and using the one or more directional loudness maps 414. Based on the reconstruction 430, a decoded audio content 432, like a multi-channel-representation, can be determined by the audio decoder 400.

According to an embodiment, the directional loudness map 414 can represent a target directional loudness map to be achievable by the decoded audio content 432. Thus, with the directional loudness map 414 the reconstruction of the audio scene 430 can be optimized to result in a high-quality perception of a listener of the decoded audio content 432. This is based on the idea that the directional loudness map 414 can indicate a desired perception for the listener.

Figure 17:
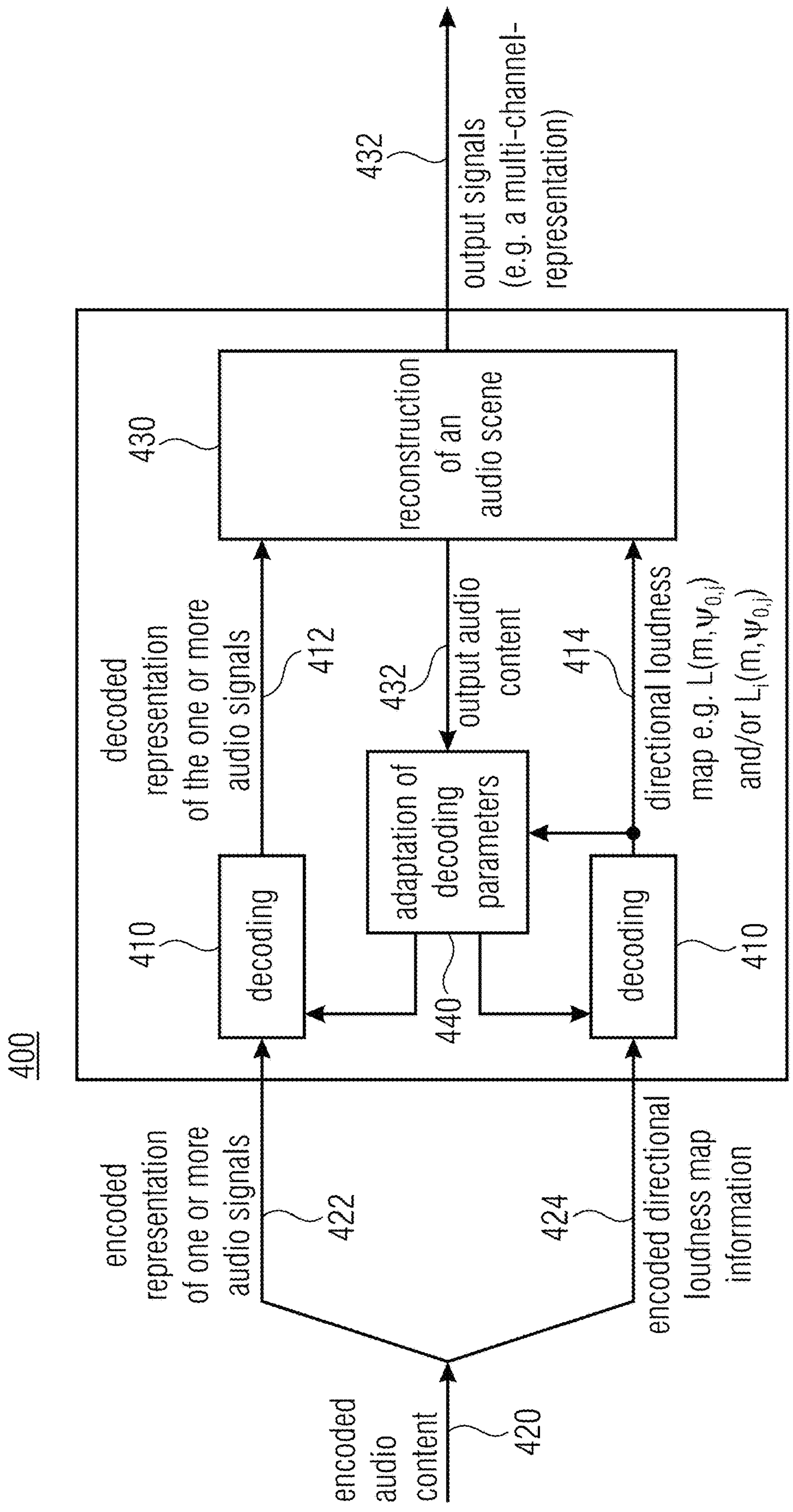
FIG. 17 shows a block diagram of an audio decoder configured to adapt decoding parameters according to an embodiment of the present invention.

FIG. 17 shows the encoder 400 of FIG. 16 with the optional feature of an adaptation 440 of decoding parameters. According to an embodiment, the decoded audio content can comprise output signals 432, which represent, for example, time-domain signals or spectral-domain signals. The audio decoder 400 is, for example, configured to obtain the output signals 432, such that one or more directional loudness maps associated with the output signals 432 approximate or equal one or more target directional loudness maps. The one or more target directional loudness maps are based on the one or more decoded directional loudness maps 414, or are equal to the one or more decoded directional loudness maps 414. Optionally, the audio decoder 400 is configured to use an appropriate scaling or a combination of the one or more decoded directional loudness maps 414 to determine the target directional loudness map or maps.

According to an embodiment, the one or more directional loudness maps associated with the output signals 432 can be determined by the audio decoder 400. The audio decoder 400 comprises, for example, an audio analyzer to determine the one or more directional loudness maps associated with the output signals 432, or is configured to receive from an external audio analyzer 100 the one or more directional loudness maps associated with the output signals 432.

According to an embodiment, the audio decoder 400 is configured to compare the one or more directional loudness maps associated with the output signals 432 and the decoded directional loudness maps 414; or compare the one or more directional loudness maps associated with the output signals 432 with a directional loudness map derived from the decoded directional loudness map 414, and to adapt 440 the decoding parameters or the reconstruction 430 based on this comparison. According to an embodiment, the audio decoder 400 is configured to adapt 440 the decoding parameters or to adapt the reconstruction 430 such that a deviation between the one or more directional loudness maps associated with the output signals 432 and the one or more target directional loudness maps is below a predetermined threshold. This can represent a feedback loop, whereby the decoding 410 and/or the reconstruction 430 is adapted such that the one or more directional loudness maps associated with the output signals 432 approximate the one or more target directional loudness maps by at least 75% or by at least 80%, or by at least 85%, or by at least 90%, or by at least 95%.

According to an embodiment, the audio decoder 400 is configured to receive one encoded downmix signal as the encoded representation 422 of the one or more audio signals and an overall directional loudness map as the encoded directional loudness map information 424. The encoded downmix signal is, for example, obtained on the basis of a plurality of input audio signals. Alternatively, the audio decoder 400 is configured to receive a plurality of encoded audio signals as the encoded representation 422 of the one or more audio signals and individual directional loudness maps of the plurality of encoded signals as the encoded directional loudness map information 424. The encoded audio signal represents, for example, input audio signals encoded by an encoder or signals derived from the input audio signals encoded by the encoder. Alternatively, the audio decoder 400 is configured to receive an overall directional loudness map as the encoded directional loudness map information 424, a plurality of encoded audio signals as the encoded representation 422 of the one or more audio signals, and additionally parameters describing contributions of the encoded audio signals to the overall directional loudness map. Thus, the encoded audio content 420 can additionally comprise the parameters, and the audio decoder 400 can be configured to use these parameters to improve the adaptation 440 of the decoding parameters, and/or to improve the reconstruction 430 of the audio scene.

The audio decoder 400 is configured to provide the output signals 432 on the basis of one of the before mentioned encoded audio content 420.

Figure 18:
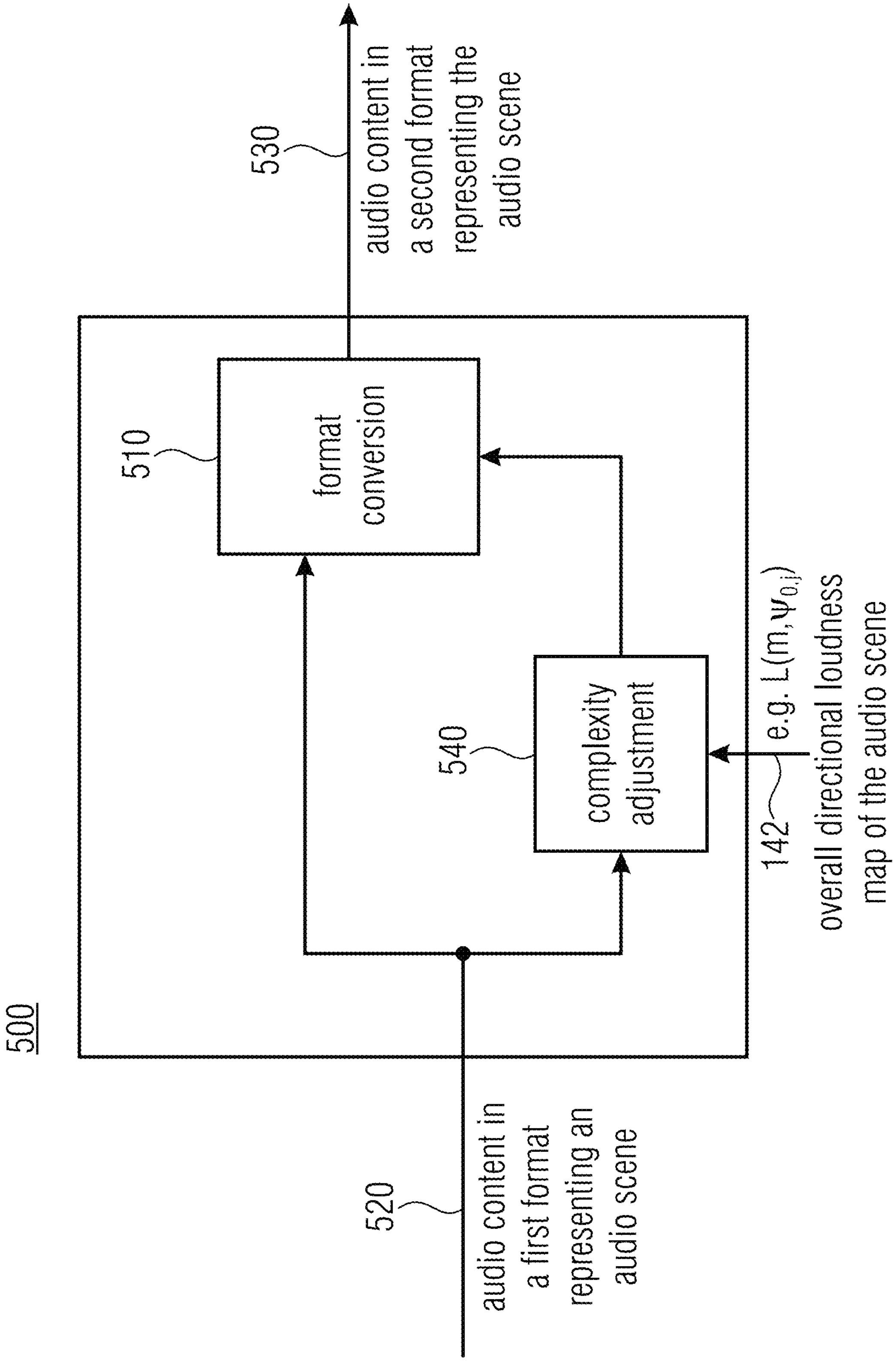
FIG. 18 shows a block diagram of a format converter according to an embodiment of the present invention.

FIG. 18 shows an embodiment of a format converter 500 for converting 510 a format of an audio content 520, which represents an audio scene. The format converter 500 receives, for example, the audio content 520 in the first format and converts 510 the audio content 520 into the audio content 530 in the second format. In other words, the format converter 500 is configured to provide the representation 530 of the audio content in the second format on the basis of the representation 520 of the audio content in the first format. According to an embodiment, the audio content 520 and/or the audio content 530 can represent a spatial audio scene.

The first format may, for example, comprise a first number of channels or input audio signals and a side information or a spatial side information adapted to the first number of channels or input audio signals. The second format may, for example, comprise a second number of channels or output audio signals, which may be different from the first number of channels or input audio signals, and a side information or a spatial side information adapted to the second number of channels or output audio signals. The audio content 520 in the first format comprises, for example, one or more audio signals, one or more downmix signals, one or more residual signals, one or more mid signals, one or more side signals and/or one or more different signals.

The format converter 500 is configured to adjust 540 a complexity of the format conversion 510 in dependence on contributions of input audio signals of the first format to an overall direction loudness map 142 of the audio scene. The audio content 520 comprises, for example, the input audio signals of the first format. The contributions can directly represent contributions of the input audio signals of the first format to the overall direction loudness map 142 of the audio scene or can represent contributions of individual directional loudness maps of the input audio signals of the first format to the overall direction loudness map 142 or can represent contributions of directional loudness maps of pairs of the input audio signals of the first format to the overall directional loudness map 142. According to an embodiment, the contributions can be calculated by the format converter 500 as described in FIG. 13 or FIG. 14. According to an embodiment, the overall directional loudness map 142 may, for example, be described by a side information of the first format received by the format converter 500. Alternatively, the format converter 500 is configured to determine the overall directional loudness map 142 based on input audio signals of the audio content 520. Optionally, the format converter 500 comprises an audio analyzer as described with regard to FIG. 1 to FIG. 4*b* to calculate the overall directional loudness map 142 or the format converter 500 is configured to receive the overall directional loudness map 142 from an external audio analyzer as described with regard to FIG. 1 to FIG. 4*b*.

The audio content 520 in the first format can comprise directional loudness map information of the input audio signals in the first format. Based on the directional loudness map information the format converter 500 is, for example, configured to obtain the overall directional loudness map 142 and/or one or more directional loudness maps. The one or more directional loudness maps can represent directional loudness maps of each input audio signals in the first format and/or directional loudness maps of groups or pairs of signals in the first format. The format converter 500 is, for example, configured to derive the overall directional loudness map 142 from the one or more directional loudness maps or directional loudness map information.

The complexity adjustment 540 is, for example, performed such that it is controlled if a skipping of one or more of the input audio signals of the first format, which contribute to the directional loudness map below a threshold is possible. In other words the format converter 500 is, for example, configured to compute or estimate a contribution of a given input audio signal to the overall directional loudness map 142 of the audio scene and to decide whether to consider the given input audio signal in the format conversion 510 in dependence on the computation or estimation of the contribution. The computed or estimated contribution is, for example, compared with a predetermined absolute or relative threshold value by the format converter 500.

The contributions of the input audio signals of the first format to the overall directional loudness map 142 can indicate a relevance of the respective input audio signal for a quality of a perception of the audio content 530 in the second format. Thus, for example, only audio signals in the first format with high relevance undergo the format conversion 510. This can result in a high quality audio content 530 in the second format.

Figure 19:
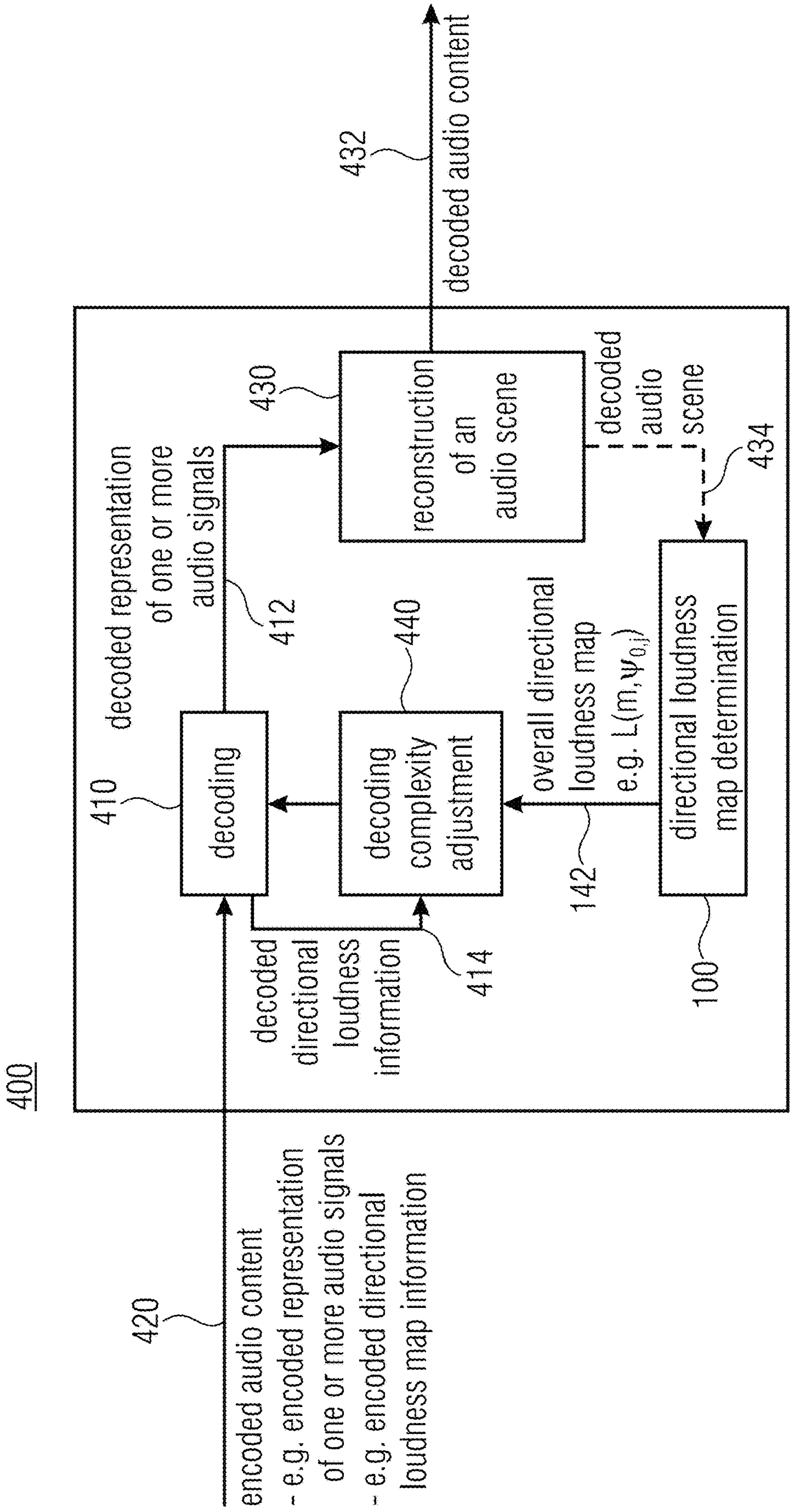
FIG. 19 shows a block diagram of an audio decoder configured to adjust a decoding complexity according to an embodiment of the present invention.

FIG. 19 shows an audio decoder 400 for decoding 410 an encoded audio content 420. The audio decoder 400 is configured to receive the encoded representation 420 of one or more audio signals and to provide a decoded representation 412 of the one or more audio signals. The decoding 410 uses, for example, an AAC-like decoding or a decoding of entropy-encoded spectral values. The audio decoder 400 is configured to reconstruct 430 an audio scene using the decoded representation 412 of the one or more audio signals. The audio decoder 400 is configured to adjust 440 a decoding complexity in dependence on contributions of encoded signals to an overall directional loudness map 142 of a decoded audio scene 434.

The decoding complexity adjustment 440 can be performed by the audio decoder 400 similar to the complexity adjustment 540 of the format converter 500 in FIG. 18.

According to an embodiment, the audio decoder 400 is configured to receive an encoded directional loudness map information, for example, extracted from the encoded audio content 420. The encoded directional loudness map information can be decoded 410 by the audio decoder 400 to determine a decoded directional loudness information 414. Based on the decoded directional loudness information 414 an overall directional loudness map of the one or more audio signals of the encoded audio content 420 and/or one or more individual directional loudness maps of the one or more audio signals of the encoded audio content 420 can be obtained. The overall directional loudness map of the one or more audio signals of the encoded audio content 420 is, for example, derived from the one or more individual directional loudness maps.

The overall directional loudness map 142 of the decoded audio scene 434 can be calculated by a directional loudness map determination 100, which can be optionally performed by the audio decoder 400. According to an embodiment, the audio decoder 400 comprises an audio analyzer as described with regard to FIG. 1 or FIG. 4*b* to perform the directional loudness map determination 100 or the audio decoder 400 can transmit the decoded audio scene 434 to the external audio analyzer and receive from the external audio analyzer the overall directional loudness map 142 of the decoded audio scene 434.

According to an embodiment, the audio decoder 400 is configured to compute or estimate a contribution of a given encoded signal to the overall directional loudness map 142 of the decoded audio scene and to decide whether to decode 410 the given encoded signal in dependence on the computation or estimation of the contribution. Thus, for example, the overall directional loudness map of the one or more audio signals of the encoded audio content 420 can be compared with the overall directional loudness map of the decoded audio scene 434. The determination of the contributions can be performed as described above (e.g., as described with respect to FIG. 13 or FIG. 14) or similarly.

Alternatively the audio decoder 400 is configured to compute or estimate a contribution of a given encoded signal to the decoded overall directional loudness map 414 of an encoded audio scene and to decide whether to decode 410 the given encoded signal in dependence on the computation or estimation of the contribution.

The complexity adjustment 440 is, for example, performed such that it is controlled if a skipping of one or more of the encoded representation of one or more input audio signals, which contribute to the directional loudness map below a threshold, is possible.

Additionally or alternatively the decoding complexity adjustment 440 can be configured to adapt decoding parameters based on the contributions.

Additionally or alternatively the decoding complexity adjustment 440 can be configured to compare decoded directional loudness maps 414 with the overall directional loudness map of the decoded audio scene 434 (e.g., the overall directional loudness map of the decoded audio scene 434 is the target directional loudness map) to adapt decoding parameters.

Figure 20:
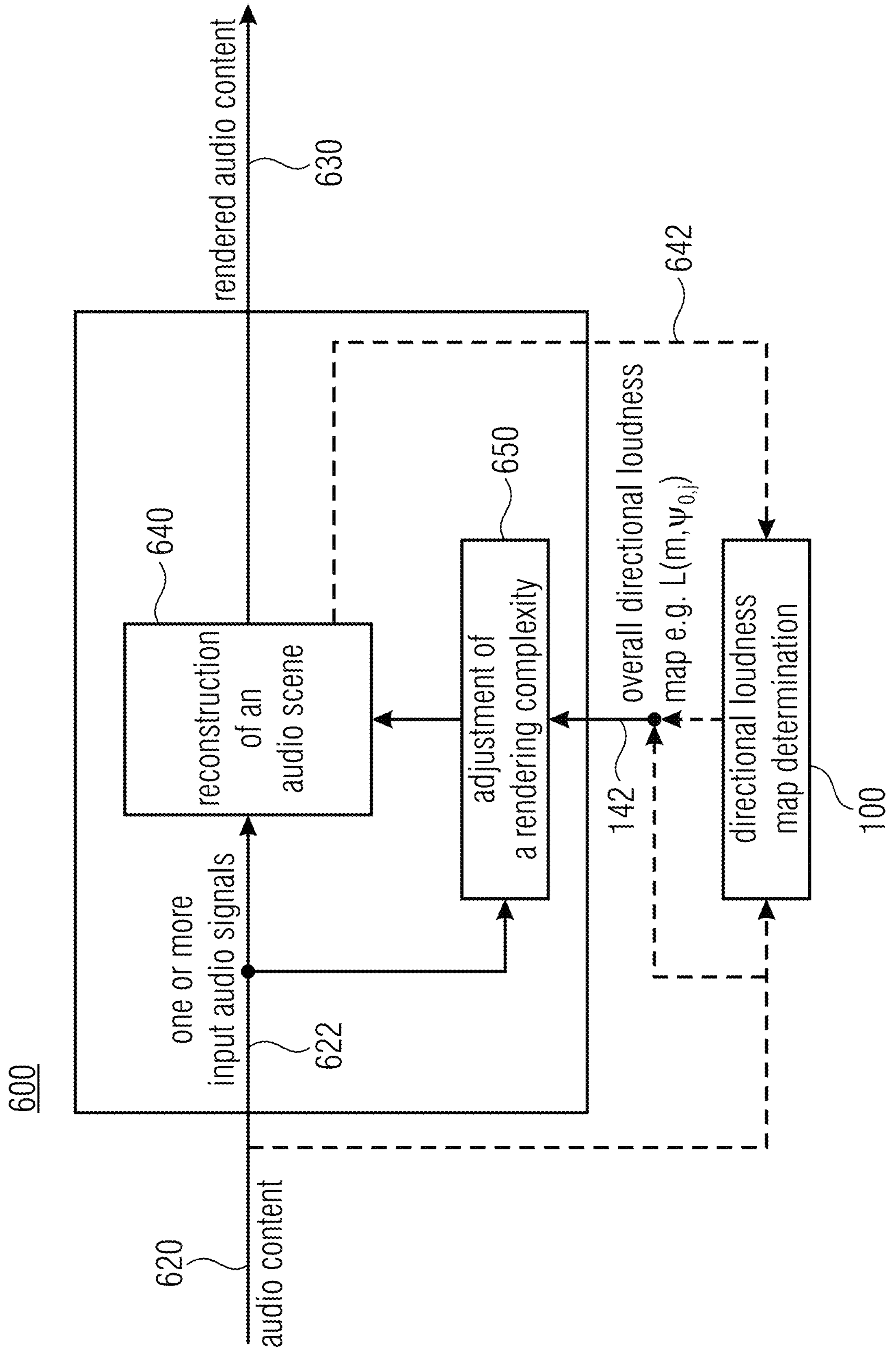
FIG. 20 shows a block diagram of a renderer according to an embodiment of the present invention.

FIG. 20 shows an embodiment of a renderer 600. The renderer 600 is, for example, a binaural renderer or a soundbar renderer or a loudspeaker renderer. With the renderer 600 an audio content 620 is rendered to obtain a rendered audio content 630. The audio content 620 can comprise one or more input audio signals 622. The renderer 600 use, for example, the one or more input audio signals 622 to reconstruct 640 an audio scene. The reconstruction 640 performed by the renderer 600 is based on two or more input audio signals 622. According to an embodiment, the input audio signal 622 can comprise one or more audio signals, one or more downmix signals, one or more residual signals, other audio signals and/or additional information.

According to an embodiment, for the reconstruction 640 of the audio scene the renderer 600 is configured to analyze the one or more input audio signals 622 to optimize a rendering to obtain a desired audio scene. Thus, for example, the renderer 600 is configured to modify a spatial arrangement of audio objects of the audio content 620. This means, for example, that the renderer 600 can reconstruct 640 a new audio scene. The new audio scene comprises, for example, rearranged audio objects compared to an original audio scene of the audio content 620. This means, for example, that a guitarist and/or a singer and/or other audio objects are positioned in the new audio scene at different spatial locations than in the original audio scene.

Additionally or alternatively, a number of audio channels or a relationship between audio channels is rendered by the audio renderer 600. Thus, for example, the renderer 600 can render an audio content 620 comprising a multichannel signal to, for example, a two-channel signal. This is, for example, desirable if only two loudspeakers are available for a representation of the audio content 620.

According to an embodiment, the rendering is performed by the renderer 600 such that the new audio scene shows only minor deviations with respect to the original audio scene.

The renderer 600 is configured to adjust 650 a rendering complexity in dependence on contributions of the input audio signals 622 to an overall directional loudness map 142 of a rendered audio scene 642. According to an embodiment, the rendered audio scene 642 can represent the new audio scene described above. According to an embodiment, the audio content 620 can comprise the overall directional loudness map 142 as side information. This overall directional loudness map 142 received as side information by the renderer 600 can indicate a desired audio scene for the rendered audio content 630. Alternatively, a directional loudness map determination 100 can determine the overall directional loudness map 142 based on the rendered audio scene received from the reconstruction unit 640. According to an embodiment, the renderer 600 can comprise the directional loudness map determination 100 or receive the overall directional loudness map 142 of an external directional loudness map determination 100. According to an embodiment, the directional loudness map determination 100 can be performed by an audio analyzer as described above.

According to an embodiment, the adjustment 650 of the rendering complexity is, for example, performed by skipping one or more of the input audio signals 622. The input audio signals 622 to be skipped are, for example, signals which contribute to the directional loudness map 142 below a threshold. Thus, only relevant input audio signals are rendered by the audio renderer 600.

According to an embodiment, the renderer 600 is configured to compute or estimate a contribution of a given input audio signal 622 to the overall directional loudness map 142 of the audio scene, e.g., of the rendered audio scene 642. Furthermore, the renderer 600 is configured to decide whether to consider the given input audio signal in the rendering in dependence on a computation or estimation of the contribution. Thus, for example, the computed or estimated contribution is compared with a predetermined absolute or relative threshold value.

Figure 21:
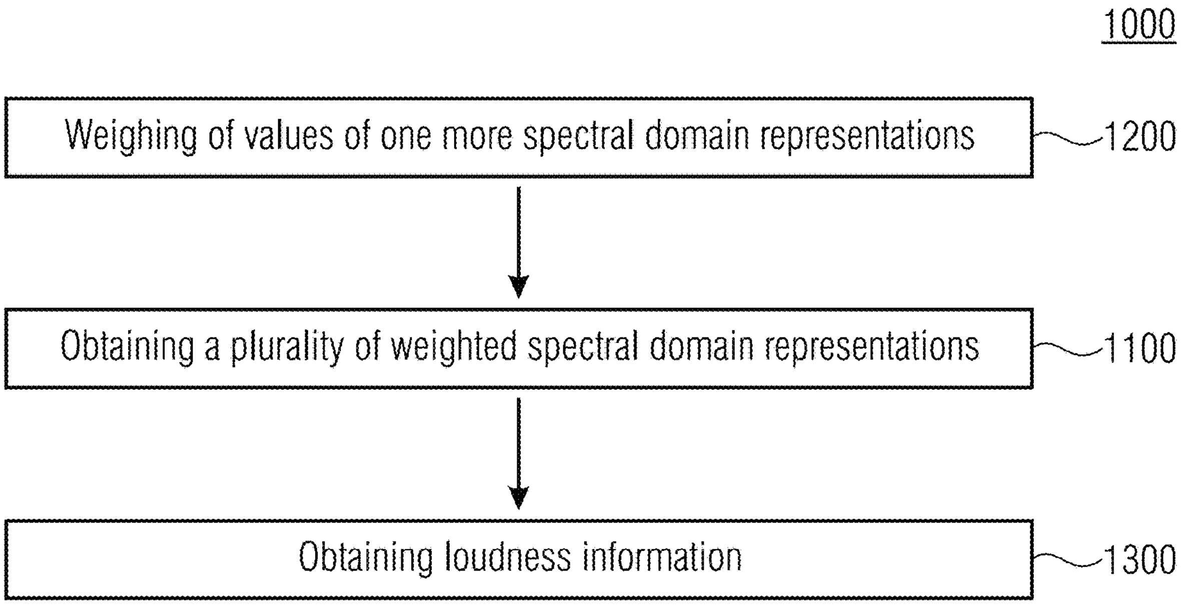
FIG. 21 shows a block diagram of a method for analyzing an audio signal according to an embodiment of the present invention.

FIG. 21 shows a method 1000 for analyzing an audio signal. The method comprises obtaining 1100 a plurality of weighted spectral domain (e.g., time-frequency-domain) representations ($Y_{i,b,\Psi_{0,j}}(m, k)$, $Y_{DM,b,\Psi_{0,j}}(m, k)$, for different $\Psi_0$ ($j \in [1;J]$); "directional signals") on the basis of one or more spectral domain (e.g., time-frequency-domain) representations (e.g., $X_{i,b}(m, k)$, e.g., for $i=\{L;R\}$; or $X_{DM,b}$(m, k)) of two or more input audio signals ($x_L$, $x_R$, $x_i$). Values of the one or more spectral domain representations (e.g., $X_{i,b}$ (m, k)) are weighted 1200 in dependence on different directions (e.g., panning directions $\Psi_0$)(e.g., represented by weighting factors $\Psi$(m, k)) of audio components (for example, of spectral bins or spectral bands)(e.g., tunes from instruments or singer) in two or more input audio signals, to obtain the plurality of weighted spectral domain representations ($Y_{i,b,\Psi_{0,j}}$(m, k), $Y_{DM,b,\Psi_{0,j}}$(m, k), for different $\Psi_0$ (j∈[1;J]); "directional signals"). Furthermore the method comprises obtaining 1300 loudness information (e.g., L(m, $\Psi_{0,j}$) for a plurality of different $\Psi_0$; e.g., "directional loudness map") associated with the different directions (e.g., panning directions $\Psi_0$) on the basis of the plurality of weighted spectral domain representations ($Y_{i,b,\Psi_{0,j}}$(m, k), $Y_{DM,b,\Psi_{0,j}}$(m, k), for different $\Psi_0$ (j∈[1;J]); "directional signals") as an analysis result.

Figure 22:
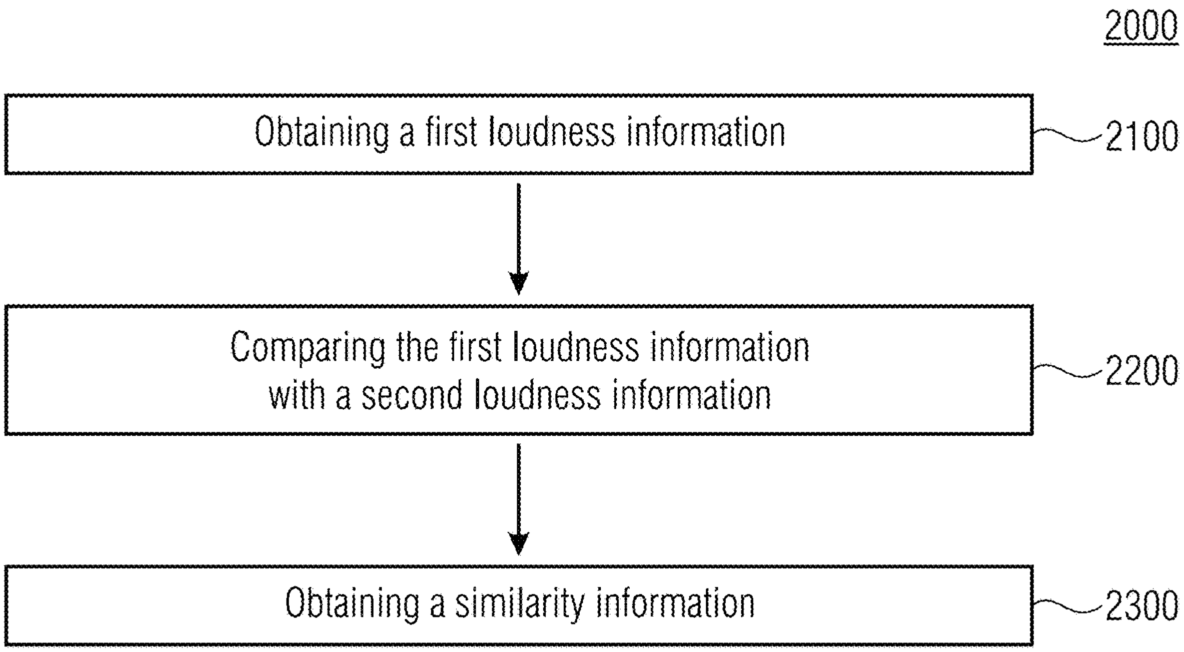
FIG. 22 shows a block diagram of a method for evaluating a similarity of audio signals according to an embodiment of the present invention.

FIG. 22 shows a method 2000 for evaluating a similarity of audio signals. The method comprises obtaining 2100 a first loudness information ($L_1$(m, $\Psi_{0,j}$); directional loudness map; combined loudness value) associated with different (e.g., panning) directions (e.g., $\Psi_{0,j}$) on the basis of a first set of two or more input audio signals ($x_R$, $x_L$, $x_i$), and comparing 2200 the first loudness information ($L_1$(m, $\Psi_{0,j}$)) with a second (e.g., corresponding) loudness information ($L_2$(m, $\Psi_{0,j}$); reference loudness information; reference directional loudness map; reference combined loudness value) associated with the different panning directions (e.g., $\Psi_{0,j}$) and with a set of two or more reference audio signals ($x_{2,R}$, $x_{2,L}$, $x_{2,i}$), in order to obtain 2300 a similarity information (e.g., "Model Output Variable" (MOV)) describing a similarity between the first set of two or more input audio signals ($x_R$, $x_L$, $x_i$) and the set of two or more reference audio signals ($x_{2,R}$, $x_{2,L}$, $x_{2,i}$)(or representing a quality of the first set of two or more input audio signals when compared to the set of two or more reference audios signals).

Figure 23:
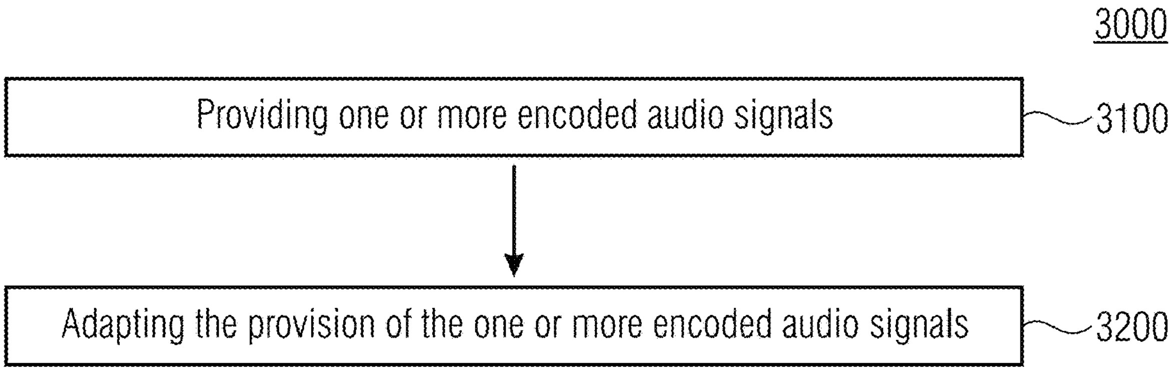
FIG. 23 shows a block diagram of a method for encoding an input audio content comprising one or more input audio signals according to an embodiment of the present invention.

FIG. 23 shows a method 3000 for encoding an input audio content comprising one or more input audio signals (a plurality of input audio signals). The method comprises providing 3100 one or more encoded (e.g., quantized and then losslessly encoded) audio signals (e.g., encoded spectral domain representations) on the basis of one or more input audio signals (e.g., left signal and right signal), or one or more signals derived therefrom (e.g., mid signal or downmix signal and side signal or difference signal). Additionally the method 3000 comprises adapting 3200 the provision of the one or more encoded audio signals in dependence on one or more directional loudness maps which represent loudness information associated with a plurality of different directions (e.g., panning directions) of the one or more signals to be encoded (e.g., in dependence on contributions of individual directional loudness maps of the one or more signals to be quantized to an overall directional loudness map, e.g., associated with multiple input audio signals (e.g., with each signal of the one or more input audio signals)).

Figure 24:
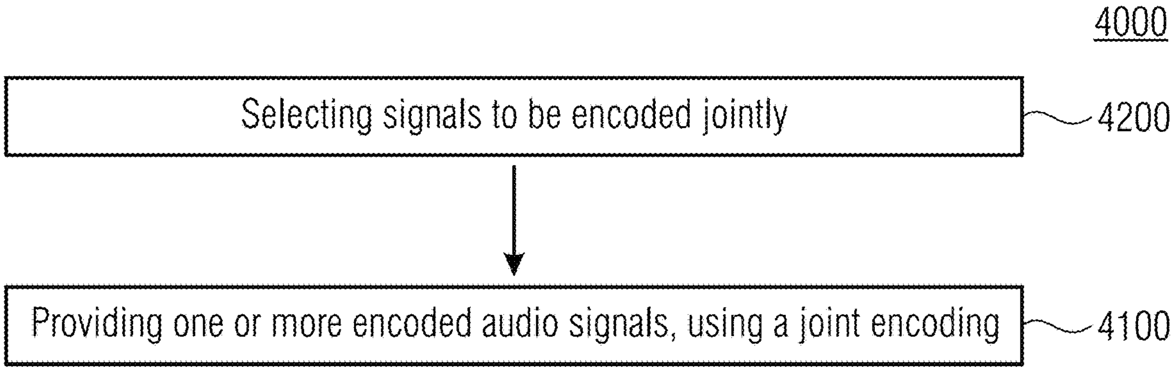
FIG. 24 shows a block diagram of a method for jointly encoding audio signals according to an embodiment of the present invention.

FIG. 24 shows a method 4000 for encoding an input audio content comprising one or more input audio signals (a plurality of input audio signals). The method comprises providing 4100 one or more encoded (e.g., quantized and then losslessly encoded) audio signals (e.g., encoded spectral domain representations) on the basis of two or more input audio signals (e.g., left signal and right signal), or on the basis of two or more signals derived therefrom, using a joint encoding of two or more signals to be encoded jointly (e.g., using a mid signal or downmix signal and a side signal or difference signal). Furthermore the method 4000 comprises selecting 4200 signals to be encoded jointly out of a plurality of candidate signals or out of a plurality of pairs of candidate signals (e.g., out of the two or more input audio signals or out of the two or more signals derived therefrom) in dependence on directional loudness maps which represent loudness information associated with a plurality of different directions (e.g., panning directions) of the candidate signals or of the pairs of candidate signals (e.g., in dependence on contributions of individual directional loudness maps of the candidate signals to an overall directional loudness map, e.g., associated with multiple input audio signals (e.g., with each signal of the one or more input audio signals), or in dependence on contributions of directional loudness maps of pairs of candidate signals to an overall directional loudness map).

Figure 25:
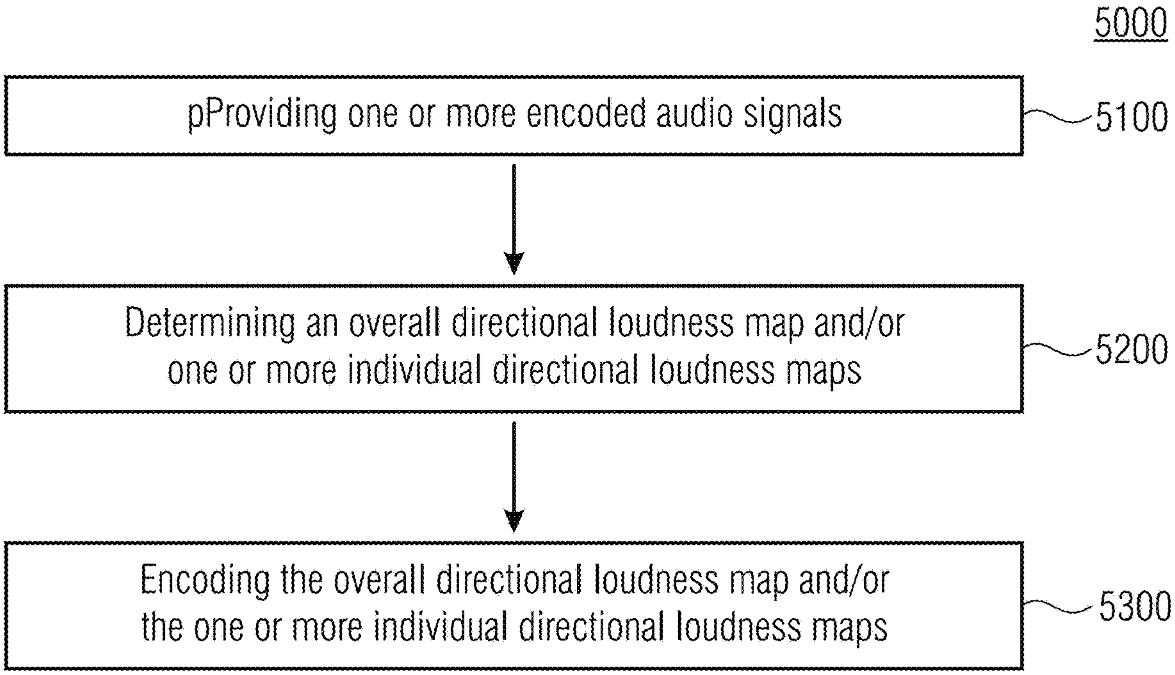
FIG. 25 shows a block diagram of a method for encoding one or more directional loudness maps as a side information according to an embodiment of the present invention.

FIG. 25 shows a method 5000 for encoding an input audio content comprising one or more input audio signals (a plurality of input audio signals). The method comprises providing 5100 one or more encoded (e.g., quantized and then losslessly encoded) audio signals (e.g., encoded spectral domain representations) on the basis of two or more input audio signals (e.g., left signal and right signal), or on the basis of two or more signals derived therefrom. Additionally the method 5000 comprises determining 5200 an overall directional loudness map (for example, a target directional loudness map of a scene) on the basis of the input audio signals, and/or determining one or more individual directional loudness maps associated with individual input audio signals and encoding 5300 the overall directional loudness map and/or one or more individual directional loudness maps as a side information.

Figure 26:
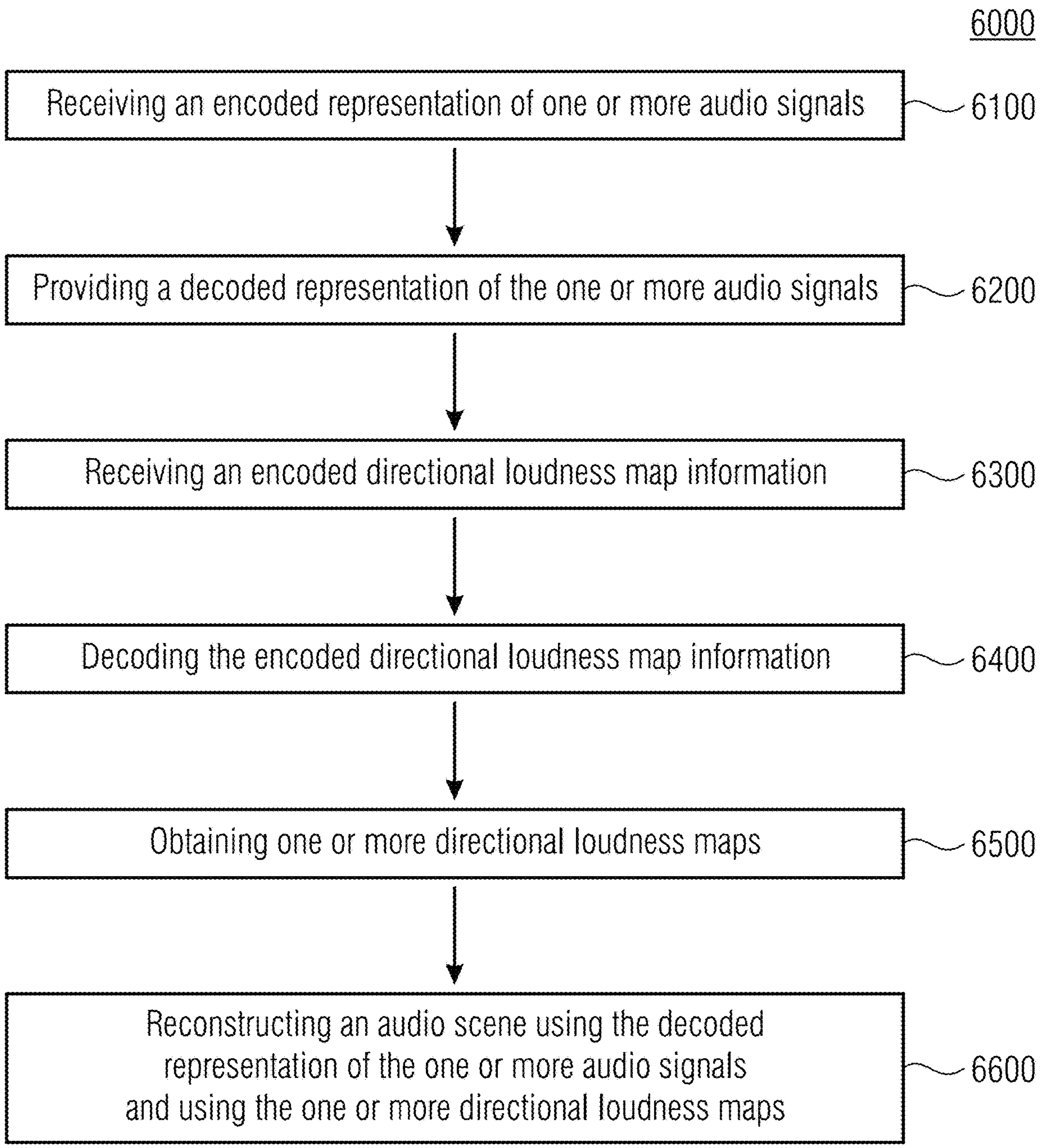
FIG. 26 shows a block diagram of a method for decoding an encoded audio content according to an embodiment of the present invention.

FIG. 26 shows a method 6000 for decoding an encoded audio content, comprising receiving 6100 an encoded representation of one or more audio signals and providing 6200 a decoded representation of the one or more audio signals (for example, using an AAC-like decoding or using a decoding of entropy-encoded spectral values). The method 6000 comprises receiving 6300 an encoded directional loudness map information and decoding 6400 the encoded directional loudness map information, to obtain 6500 one or more (decoded) directional loudness maps. Additionally the method 6000 comprises reconstructing 6600 an audio scene using the decoded representation of the one or more audio signals and using the one or more directional loudness maps.

Figure 27:
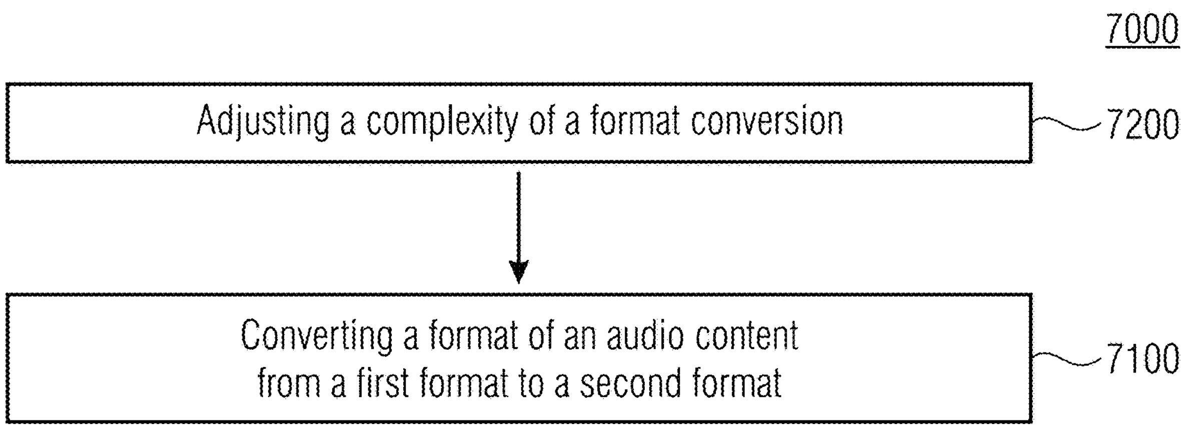
FIG. 27 shows a block diagram of a method for converting a format of an audio content, which represents an audio scene, from a first format to a second format, according to an embodiment of the present invention.

FIG. 27 shows a method 7000 for converting 7100 a format of an audio content, which represents an audio scene (e.g., a spatial audio scene), from a first format to a second format (wherein the first format may, for example, comprise a first number of channels or input audio signals and a side information or a spatial side information adapted to the first number of channels or input audio signals, and wherein the second format may, for example, comprise a second number of channels or output audio signals, which may be different from the first number of channels or input audio signals, and a side information or a spatial side information adapted to the second number of channels or output audio signals). The method 7000 comprises providing a representation of the audio content in the second format on the basis of the representation of the audio content in the first format and adjusting 7200 a complexity of the format conversion (for example, by skipping one or more of the input audio signals of the first format, which contribute to the directional loudness map below a threshold, in the format conversion process) in dependence on contributions of input audio signals of the first format (e.g., one or more audio signals, one or more downmix signals, one or more residual signals, etc.) to an overall directional loudness map of the audio scene (wherein the overall directional loudness map may, for example, be described by a side information of the first format received by the format converter).

Figure 28:
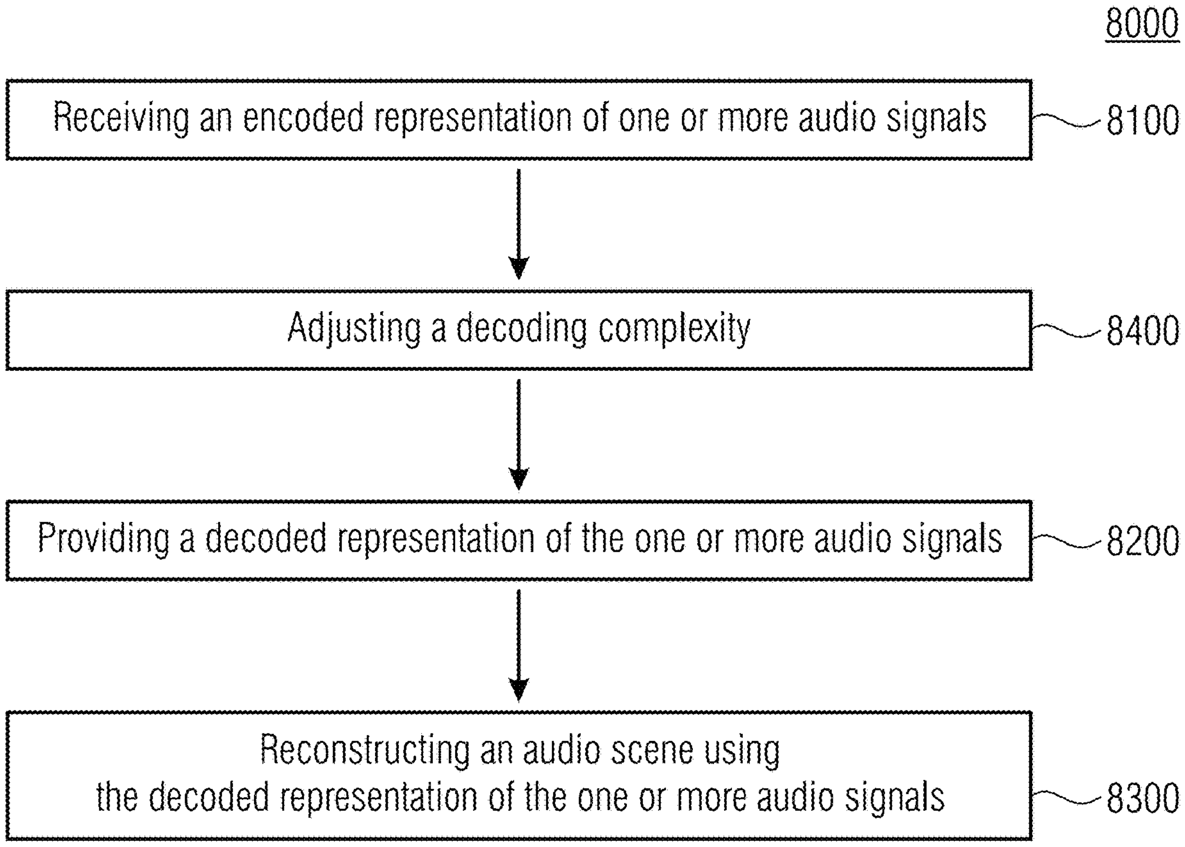
FIG. 28 shows a block diagram of a method for decoding an encoded audio content and adjusting a decoding complexity according to an embodiment of the present invention.

FIG. 28 shows a method 8000 for decoding an encoded audio content, comprising receiving 8100 an encoded representation of one or more audio signals and providing 8200 a decoded representation of the one or more audio signals (for example, using an AAC-like decoding or using a decoding of entropy-encoded spectral values). The method 8000 comprises reconstructing 8300 an audio scene using the decoded representation of the one or more audio signals. Additionally the method 8000 comprises adjusting 8400 a decoding complexity in dependence on contributions of encoded signals (e.g., one or more audio signals, one or more downmix signals, one or more residual signals, etc.) to an overall directional loudness map of a decoded audio scene.

Figure 29:
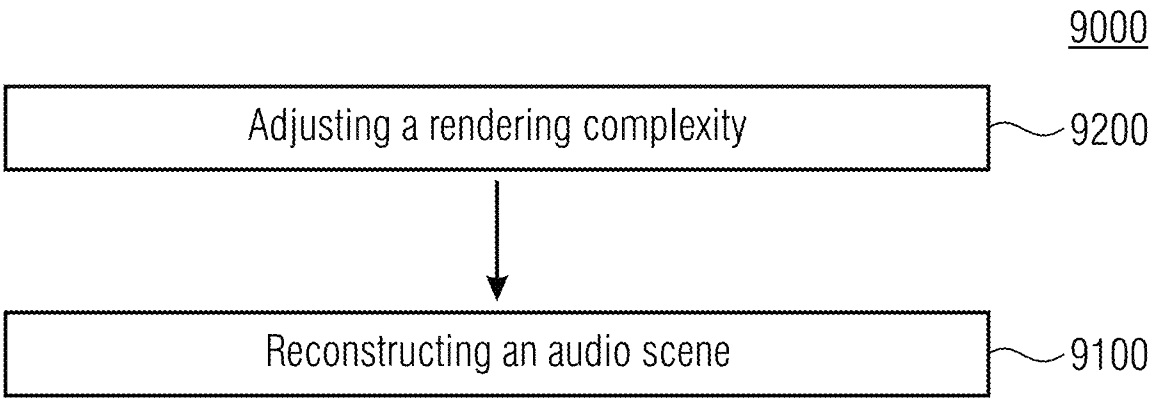
FIG. 29 shows a block diagram of a method for rendering an audio content according to an embodiment of the present invention.

FIG. 29 shows a method 9000 for rendering an audio content (e.g., for up-mixing an audio content represented using a first number of input audio channels and a side information describing desired spatial characteristics, like an arrangement of audio objects or a relationship between audio channels, into a representation comprising a number of channels which is larger than the first number of input audio channels), comprising reconstructing 9100 an audio scene on the basis of one or more input audio signals (or on the basis of two or more input audio signals). The method 9000 comprises adjusting 9200 a rendering complexity (for example, by skipping one or more of the input audio signals, which contribute to the directional loudness map below a threshold, in the rendering process) in dependence on contributions of the input audio signals (e.g., one or more audio signals, one or more downmix signals, one or more residual signals, etc.) to an overall directional loudness map of a rendered audio scene (wherein the overall directional loudness map may, for example, be described by a side information received by the renderer).

Remarks:

In the following, different inventive embodiments and aspects will be described in a chapter "Objective assessment of spatial audio quality using directional loudness maps", in a chapter "Use of directional loudness for audio coding and objective quality measurement", in a chapter "Directional loudness for audio coding", in a chapter "Generic steps for computing a directional loudness map (DirLoudMap)", in a chapter "Example: Recovering directional signals with windowing/selection function derived from panning index" and in a chapter "Embodiments of Different forms of calculating the loudness maps using generalized criterion functions".

Also, further embodiments will be defined by the enclosed claims.

It should be noted that any embodiments as defined by the claims can be supplemented by any of the details (features and functionalities) described in the above mentioned chapters.

Also, the embodiments described in the above mentioned chapters can be used individually, and can also be supplemented by any of the features in another chapter, or by any feature included in the claims.

Also, it should be noted that individual aspects described herein can be used individually or in combination. Thus, details can be added to each of said individual aspects without adding details to another one of said aspects.

It should also be noted that the present disclosure describes, explicitly or implicitly, features usable in an audio encoder (apparatus for providing an encoded representation of an input audio signal) and in an audio decoder (apparatus for providing a decoded representation of an audio signal on the basis of an encoded representation). Thus, any of the features described herein can be used in the context of an audio encoder and in the context of an audio decoder.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software, as will be described in the section "implementation alternatives".

Implementation Alternatives:

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Objective Assessment of Spatial Audio Quality Using Directional Loudness Maps

Abstract

This work introduces a feature extracted, for example, from stereophonic/binaural audio signals serving as a measurement of perceived quality degradation in processed spatial auditory scenes. The feature can be based on a simplified model assuming a stereo mix created by directional signals positioned using amplitude level panning techniques. We calculate, for example, the associated loudness in the stereo image for each directional signal in the Short-Time Fourier Transform (STFT) domain to compare a reference signal and a deteriorated version and derive a distortion measure aiming to describe the perceived degradation scores reported in listening tests.

The measure was tested on an extensive listening test database with stereo signals processed by state-of-the-art perceptual audio codecs using non waveform-preserving techniques such as bandwidth extension and joint stereo coding, known for presenting a challenge to existing quality predictors [1], [2]. Results suggest that the derived distortion measure can be incorporated as an extension to existing automated perceptual quality assessment algorithms for improving prediction on spatially coded audio signals.

Index Terms—Spatial Audio, Objective Quality Assessment, PEAQ, Panning Index.

1. Introduction

We propose a simple feature aiming to describe the deterioration in the perceived auditory stereo image, for example, based on the change in loudness at regions that share a common panning index [13]. That is, for example, regions in time and frequency of a binaural signal that share the same intensity level ratio between left and right channels, therefore corresponding to a given perceived direction in the horizontal plane of the auditory image.

The use of directional loudness measurements in the con-text of auditory scene analysis for audio rendering of complex virtual environments is also proposed in [14], whereas the current work is focused on overall spatial audio coding quality objective assessment.

The perceived stereo image distortion can be reflected as changes on a directional loudness map of a given granularity corresponding to the amount of panning index values to be evaluated as a parameter.

2. Method

According to an embodiment, the reference signal (REF) and the signal under test (SUT) are processed in parallel in order to extract features that aim to describe—when compared—the perceived auditory quality degradation caused by the operations carried out in order to produce the SUT.

Both binaural signals can be processed first by a peripheral ear model block. Each input signal is, for example, decomposed into the STFT domain using a Hann window of block size M=1024 samples and overlap of M/2, giving a time resolution of 21 ms at a sampling rate of Fs=48 kHz. The frequency bins of the transformed signal are then, for example, grouped to account for the frequency selectivity of the human cochlea following the ERB scale [15] in a total of B=20 frequency bin subsets or bands. Each band can then be weighted by a value derived from the combined linear transfer function that models the outer and middle ear as explained in [3].

The peripheral model outputs then signals $X_{i,b}(m, k)$ in each time frame m, and frequency bin k, and for each channel i={L, R} and each frequency group $b \in \{0, \ldots, B-1\}$, with different widths $K_b$ expressed in frequency bins.

2.1. Directional Loudness Calculation (e.g., performed by an herein described audio analyzer and/or audio similarity evaluator)

According to an embodiment, the directional loudness calculation can be performed for different directions, such that, for example, the given panning direction $\Psi_0$ can be interpreted as $\Psi_{0,j}$ with $j \in [1;J]$. The following concept is based on the method presented in [13], where a similarity measure between the left and right channels of a binaural signal in the STFT domain can be used to extract time and frequency regions occupied by each source in a stereophonic recording based on their designated panning coefficients during the mixing process.

Given the output of the peripheral model $X_{i,b}(m, k)$ a time-frequency (T/F) tile $Y_{i,b,\Psi_0}$ can be recovered from the input signal corresponding to a given panning direction $\Psi_0$ by multiplying the input by a window function $\Theta_{\Psi_0}$:

$$Y_{i,b,\Psi_0}(m, k)=X_{i,b}(m, k)\Theta_{\Psi_0}(m, k). \quad (1)$$

The recovered signal will have the T/F components of the input that correspond to a panning direction $\Psi_0$ within a tolerance value. The windowing function can be defined as a Gaussian window centered at the desired panning direction:

$$\theta_{\Psi_0}(m,k) = e^{-\frac{1}{2\xi}(\Psi(m,k)-\Psi_0)^2} \quad (2)$$

where Ψ(m, k) is the panning index as calculated in [13] with a defined support of [−1,1] corresponding to signals panned fully to the left or to the right, respectively. Indeed, $Y_{i,b,\Psi_0}$ can contain frequency bins whose values in the left and right channels will cause the function Ψ to have a value of $\Psi_0$ or in its vicinity. All other components can be attenuated according to the Gaussian function. The value of ξ represents the width of the window and therefore the mentioned vicinity for each panning direction. A value of ξ=0.006 was chosen, for example, for a Signal to Interference Ratio (SIR) of −60 dB [13]. Optionally a set of 22 equally spaced panning directions within [−1,1] is chosen empirically for the values of $\Psi_0$. For each recovered signal, a loudness calculation [16] at each ERB band and dependent on the panning direction is expressed as, for example:

$$L_{b,\Psi_0}(m) = \left(\frac{1}{K_b}\sum_{k\in b} Y_{DM_{b,\Psi_0}}(m,k)^2\right)^{0.25} \quad (3)$$

where $Y_{DM}$ is the sum signal of channels i={L, R}. The loudness is then averaged, for example, over all ERB bands to provide a directional loudness map defined over the panning domain $\Psi_0 \in [-1,1]$ over time frame m:

$$L(m,\Psi_0) = \frac{1}{B}\sum_{\forall b} L_{b,\Psi_0}(m). \quad (4)$$

For further refinement Equation 4 can be calculated only considering a subset of the ERB bands corresponding to frequency regions of 1.5 kHz and above to accommodate to the sensitivity of the human auditory system to level differences in this region, according to the duplex theory [17]. According to an embodiment, bands b∈{7, . . . , 19} are used corresponding to frequencies from 1.34 kHz to $F_S/2$.

As a step, directional loudness maps for the duration of the reference signal and SUT are, for example, subtracted and the absolute value of the residual is then averaged over all panning directions and time producing a single number termed Model Output Variable (MOV), following the terminology in [3]. This number effectively expressing the distortion between directional loudness maps of reference and SUT, is expected to be a predictor of the associated subjective quality degradation reported in listening tests.

FIG. 9 shows a block diagram for the proposed MOV (model output value) calculation. FIGS. 10*a* to 10*c* show an example of application of the concept of a directional loudness map to a pair of reference (REF) and degraded (SUT) signals, and the absolute value of their difference (DIFF). FIGS. 10*a* to 10*c* show an example of a solo violin recording of 5 seconds of duration panned to the left. Clearer regions on the maps represent, for example, louder content. The degraded signal (SUT) presents a temporal collapse of the panning direction of the auditory event from left to center between times 2-2.5 sec and again at 3-3.5 sec.

3. Experiment Description

In order to test and validate the usefulness of the proposed MOV, a regression experiment similar to the one in [18] was carried out in which MOVs were calculated for reference and SUT pairs in a database and compared to their respective subjective quality scores from a listening test. The prediction performance of the system making use of this MOV is evaluated in terms of correlation against subjective data (R), absolute error score (AES), and number of outliers (v), as described in [3].

The database used for the experiment corresponds to a part of the Unified Speech and Audio Coding (USAC) Verification Test [19] Set 2, which contains stereo signals coded at bitrates ranging from 16 to 24 kbps using joint stereo [12] and bandwidth extension tools along with their quality score on the MUSHRA scale. Speech items were excluded since the proposed MOV is not expected to describe the main cause of distortion on speech signals. A total of 88 items (e.g., average length 8 seconds) remained in the database for the experiment.

To account for possible monaural/timbral distortions in the database, the outputs of an implementation of the standard PEAQ (Advanced Version) termed Objective Difference Grade (ODG) and POLQA, named Mean Opinion Score (MOS) were taken as additional MOVs complementing the directional loudness distortion (DirLoudDist; e.g., DLD) described in the previous section. All MOVs can be normalized and adapted to give a score of 0 for indicating best quality and 1 for worst possible quality. Listening test scores were scaled accordingly.

One random fraction of the available content of the database (60%, 53 items) was reserved for training a regression model using Multivariate Adaptive Regression Splines (MARS) [8] mapping the MOVs to the items subjective scores. The remainder (35 items) were used for testing the performance of the trained regression model. In order to remove the influence of the training procedure from the overall MOV performance analysis, the training/testing cycle was, for example, carried out 500 times with randomized training/test items and mean values for R, AES, and v were considered as performance measures.

4. Results and Discussion

TABLE 1

Mean performance values for 500 training/validation (e.g., testing) cycles of the regression model with different sets of MOVs. CHOI represents the 3 binaural MOVs as calculated in [20], EITDD corresponds to the high frequency envelope ITD distortion MOV as calculated in [1]. SEO corresponds to the 4 binaural MOVs from [1], including EITDD. DirLoudDist is the proposed MOV. The number in parenthesis represents the total number of MOVs used. (optional)

| MOV Set (N) | R | AES | v |
|---|---|---|---|
| MOS + ODG (2) | 0.77 | 2.63 | 12 |
| MOS + ODG + CHOI (5) | 0.77 | 2.39 | 11 |
| MOS + ODG + EITDD (3) | 0.82 | 2.0 | 11 |
| MOS + ODG + SEO (6) | 0.88 | 1.65 | 7 |
| MOS + ODG + DirLoudDist (3) | 0.88 | 1.69 | 8 |

Table 1 shows the mean performance values (correlation, absolute error score, number of outliers) for the experiment described in Section 3. In addition to the proposed MOV, the methods for objective evaluation of spatially coded audio signals proposed in [20] and [1] were also tested for comparison. Both compared implementations make use of the classical inter-aural cue distortions mentioned in the introduction: IACC distortion (IACCD), ILD distortion (ILDD), and ITDD.

As mentioned, the baseline performance is given by ODG and MOS, both achieve R=0.66 separately but present a combined performance of R=0.77 as shown in Table 1. This confirms that the features are complimentary in the evaluation of monaural distortions.

Considering the work of Choi et. al. [20], the addition of the three binaural distortions (CHOI in Table 1) to the two monaural quality indicators (making up to five joint MOVs) does not provide any further gain to the system in terms of prediction performance for the used dataset.

In [1], some further optional model refinements were made to the mentioned features in terms of lateral plane localization and cue distortion detectability. In addition, a novel MOV that considers high frequency envelope interaural time difference distortions (EITDD) [21] was, for example, incorporated. The set of these four binaural MOVs (marked as SEO in Table 1) plus the two monaural descriptors (6 MOVs in total) significantly improves the system performance for the current data set.

Looking at the contribution in improvement from EITDD suggests that frequency time-energy envelopes as used in joint stereo techniques [12] represent a salient aspect of the overall quality perception.

However, the presented MOV based on directional loudness map distortions (DirLoudDist) correlates even better with the perceived quality degradation than EITDD, even reaching similar performance figures as the combination of all the binaural MOVs of [1], while using one additional MOV to the two monaural quality descriptors, instead of four. Using fewer features for the same performance will reduce the risk of over-fitting and indicates their higher perceptual relevance.

A maximum mean correlation against subjective scores for the database of 0.88 shows that there is still room for improvement.

According to an embodiment, the proposed feature is based on a herein described model that assumes a simplified description of stereo signals in which auditory objects are only localized in the lateral plane by means of ILDs, which is usually the case in studio-produced audio content [13]. For ITD distortions usually present when coding multi-microphone recordings or more natural sounds, the model needs to be either extended or complemented by a suitable ITD distortion measure.

5. Conclusions and Future Work

According to an embodiment, distortion metric was introduced describing changes in a representation of the auditory scene based on loudness of events corresponding to a given panning direction. The significant increase in performance with respect to the monaural-only quality prediction shows the effectiveness of the proposed method. The approach also suggests a possible alternative or complement in quality measurement for low bitrate spatial audio coding where established distortion measurements based on classical binaural cues do not perform satisfactorily, possibly due to the non-waveform preserving nature of the audio processing involved.

The performance measurements show that there are still areas for improvement towards a more complete model that also includes auditory distortions based on effects other than channel level differences. Future work also includes studying how the model can describe temporal instabilities/modulations in the stereo image as reported in [12] in contrast to static distortions.

REFERENCES

[1] Jeong-Hun Seo, Sang Bae Chon, Keong-Mo Sung, and Inyong Choi, "Perceptual objective quality evaluation method for high quality multichannel audio codecs," *J. Audio Eng. Soc*, vol. 61, no. 7/8, pp. 535-545, 2013.

[2] M. Schafer, M. Bahram, and P. Vary, "An extension of the PEAQ measure by a binaural hearing model," in 2013 *IEEE International Conference on Acoustics, Speech and Signal Processing*, May 2013, pp. 8164-8168.

[3] ITU-R Rec. BS.1387*, Method for objective measurements of perceived audio quality*, ITU-T Rec. BS.1387, Geneva, Switzerland, 2001.

[4] ITU-T Rec. P.863, "Perceptual objective listening quality assessment," Tech. Rep., International Telecommunication Union, Geneva, Switzerland, 2014.

[5] Sven Kämpf, Judith Liebetrau, Sebastian Schneider, and Thomas Sporer, "Standardization of PEAQ-MC: Extension of ITU-R BS.1387-1 to Multichannel Audio," in *Audio Engineering Society Conference: 40th International Conference: Spatial Audio: Sense the Sound of Space*, October 2010.

[6] K Ulovec and M Smutny, "Perceived audio quality analysis in digital audio broadcasting plus system based on PEAQ," *Radioengineering*, vol. 27, pp. 342-352, April 2018.

[7] C. Faller and F. Baumgarte, "Binaural cue coding-Part II: Schemes and applications," *IEEE Transactions on Speech and Audio Processing*, vol. 11, no. 6, pp. 520-531, November 2003.

[8] Jan-Hendrik Fleßner, Rainer Huber, and Stephan D. Ewert, "Assessment and prediction of binaural aspects of audio quality," *J. Audio Eng. Soc*, vol. 65, no. 11, pp. 929-942, 2017.

[9] Marko Takanen and Gaëtan Lorho, "A binaural auditory model for the evaluation of reproduced stereo-phonic sound," in *Audio Engineering Society Conference: 45th International Conference: Applications of Time-Frequency Processing in Audio*, March 2012.

[10] Robert Conetta, Tim Brookes, Francis Rumsey, Slawomir Zielinski, Martin Dewhirst, Philip Jackson, Søren Bech, David Meares, and Sunish George, "Spatial audio quality perception (part 2): A linear regression model," *J. Audio Eng. Soc*, vol. 62, no. 12, pp. 847-860, 2015.

[11] ITU-R Rec. BS.1534-3, "Method for the subjective assessment of intermediate quality levels of coding systems," Tech. Rep., International Telecommunication Union, Geneva, Switzerland, October 2015.

[12] Frank Baumgarte and Christof Faller, "Why binaural cue coding is better than intensity stereo coding," in *Audio Engineering Society Convention* 112, April 2002.

[13] C. Avendano, "Frequency-domain source identification and manipulation in stereo mixes for enhancement, suppression and re-panning applications," in 2003 *IEEE Workshop on Applications of Signal Processing to Au-dio and Acoustics*, October 2003, pp. 55-58.

[14] Nicolas Tsingos, Emmanuel Gallo, and George Drettakis, "Perceptual audio rendering of complex virtual environments," in *ACM SIGGRAPH* 2004 Papers, New York, NY, USA, 2004, SIGGRAPH '04, pp. 249-258, ACM.

[15] B. C. J. Moore and B. R. Glasberg, "A revision of Zwicker's loudness model," *Acustica United with Acta Acustica: the Journal of the European Acoustics Association*, vol. 82, no. 2, pp. 335-345, 1996.

[16] E. Zwicker, "Über psychologische and methodische Grundlagen der Lautheit [On the psychological and methodological bases of loudness]," *Acustica*, vol. 8, pp. 237-258, 1958.

[17] Ewan A. Macpherson and John C. Middlebrooks, "Listener weighting of cues for lateral angle: The duplex theory of sound localization revisited," *The Journal of the Acoustical Society of America*, vol. 111, no. 5, pp. 2219-2236, 2002.

[18] Pablo Delgado, Jürgen Herre, Armin Taghipour, and Nadja Schinkel-Bielefeld, "Energy aware modeling of interchannel level difference distortion impact on spatial audio perception," in *Audio Engineering Society Conference:* 2018 *AES International Conference on Spatial Reproduction—Aesthetics and Science*, July 2018.

[19] ISO/IEC JTC1/SC29/WG11, "USAC verification test report N12232," Tech. Rep., International Organisation for Standardisation, 2011.

[20] Inyong Choi, Barbara G. Shinn-Cunningham, Sang Bae Chon, and Koeng-Mo Sung, "Objective measurement of perceived auditory quality in multichannel audio compression coding systems," *J. Audio Eng. Soc*, vol. 56, no. 1/2, pp. 3-17, 2008

[21] E R Hafter and Raymond Dye, "Detection of interaural differences of time in trains of high-frequency clicks as a function of interclick interval and number," *The Journal of the Acoustical Society of America*, vol. 73, pp. 644-51, 031983.

USE OF DIRECTIONAL LOUDNESS FOR AUDIO CODING AND OBJECTIVE QUALITY MEASUREMENT

Please see the chapter "objective assessment of spatial audio quality using directional loudness maps" for further descriptions.

Description: (e.g., description of FIG. 9)

A feature extracted from, for example, stereophonic/binaural audio signals in the spatial (stereo) auditory scene is presented. The feature is, for example, based on a simplified model of a stereo mix that extracts panning directions of events in the stereo image. The associated loudness in the stereo image for each panning direction in the Short-Time Fourier Transform (STFT) domain can be calculated. The feature is optionally computed for reference and coded signal and then compared to derive a distortion measure aiming to describe the perceived degradation score reported in a listening test. Results show an improved robustness facing low bitrate, non-waveform preserving parametric techniques tools such as joint stereo and bandwidth extension when compared to existing methods. It can be integrated in standardized objective quality assessment measurement systems such as PEAQ or POLQA (PEAQ=Objective Measurements of Perceived Audio Quality; POLQA=Perceptual Objective Listening Quality Analysis).

Terminology:

Signal: e. g., stereophonic signal representing objects, downmixes, residuals, etc.

Directional Loudness Map (DirLoudMap): e. g. derived from each signal. Represents, for example, the loudness in T/F (time/frequency) domain associated with each panning direction in the auditory scene. It can be derived from more than two signals by using binaural rendering (HRTF (head-related transfer function)/BRIR (binaural room impulse response)).

Applications (Embodiments):

1. Automatic evaluation of quality (embodiment 1):
   As described in the chapter "objective assessment of spatial audio quality using directional loudness maps"
2. Directional loudness-based bit distribution (embodiment 2) in the audio encoder, based on ratio (contribution) to the overall DirLoudMap of the individual signals DirLoudMaps.
   optional variation 1 (independent stereo pairs): audio signals as loudspeakers or objects.
   optional variation 2 (Downmix/Residual pairs): contribution of downmix signal DirLoudMap and residual DirLoudMap to the overall DirLoudMap. "Amount of contribution" in the auditory scene for bit distribution criteria.
   1. An audio encoder, performing joint coding of two or more channels, resulting, for example, in each one or more downmix and residual signals, in which the contribution of each residual signal to the overall directional loudness map is determined, e.g. from a fixed decoding rule (e.g. MS-Stereo) or by estimating the inverse joint coding process from the joint coding parameters (e.g. rotation in MCT). Based on the residual signal's contribution to the overall DirLoudMap, the bit rate distribution between downmix and residual signal is adapted, e.g. by controlling the quantization precision of the signals, or by directly discarding residual signals where the contribution is below a threshold. Possible criteria for "contribution" are e.g. the average ratio or the ratio in the direction maximum relative contribution.

Problem: combination and contribution estimation of individual DirLoudMap to the resulting/total loudness map.
3. (embodiment 3) For the decoder side, directional loudness can help the decoder make an informed decision on the
   complexity scaling/format converter: each audio signal can be included or excluded in the decoding process based on their contribution to the overall DirLoudMap (transmitted as a separate parameter or estimated from other parameters) and therefore change the complexity in rendering for different applications/format conversion. This enables decoding with reduced complexity when only limited resources are available (i.e. a multichannel signal rendered to a mobile device)
   As the resulting DirLoudMap may depend on the target reproduction setup, this ensures that the most important/salient signals for the individual scenario are reproduced, so this is an advantage over non-spatially informed approaches like a simple signal/object priority level.
4. For joint coding decision (embodiment 4) (e.g., description of FIG. 14)
   Determine the contribution of the directional loudness map of each signal, or each candidate signal pair to the contribution of the DirLoudMap of the overall scene.
   1. optional variation 1) Chose signal pairs with the highest contribution to the overall loudnessmap
   2. optional variation 2) Chose signal pairs where signals have high proximity/similarity in their respective DirLoudMap=>can be jointly represented by a downmix As there can be cascaded joint coding of signals, the DirLoudMap of e.g. a Downmix Signal does not necessarily correspond to a point source from one direction (e.g. one loudspeaker), hence the contribution to the DirLoudMap is e.g. estimated from the joint coding parameters.

The DirLoudMap of the overall scene can be calculated through some kind of downmix or binauralization that contemplates the directions of the signals.

5. Parametric audio codec (embodiment 5) based on directional loudness

Transmits, for example, directional loudness map of the scene. --> is transmitted as side information in parametric form, e.g.

1. "PCM-Style"=quantized values over directions
2. center position+linear slopes for left/right
3. polynomial or spline representation transmits, for example, one signal/fewer signals/efficient transmission, 1. optional variant 1) transmit parametrized target DirLoudMap of a scene+1 downmix channel
2. optional variant 2) transmit multiple signals, each with associated DirLoudMap
3. optional variant 3) transmit overall target DirLoudMap, and multiple signals plus parametrized relative contribution to overall DirLoudMap synthesize, for example, complete audio scene from transmitted signal, based on the directional loudness map of the scene.

Directional Loudness for Audio Coding

Introduction and Definitions

DirLoudMap=Directional Loudness Map

Embodiment for Computing a DirLoudMap:

a) Perform t/f decomposition (+grouping into critical bands (CBs))(e. g. by filter bank, SIFT, . . . )
b) run directional analysis function for each t/f tile
c) enter/accumulate result of b) into DirLoudMap histogram optionally (if needed by application):
d) summarize output over CBs to provide broadband DirLoudMap Embodiment of Level of DirLoudMap/directional analysis function:

Level 1 (optional): Maps contribution directions according to spatial reproduction position of signals (channels/objects)-(no knowledge about signal content exploited). Uses a directional analysis function considering only the reproduction direction of channel/object+/−spreading window L1 reproduction direction of channel/object+/−spreading window (this can be wide band, i.e the same for all frequencies)

Level 2 (optional): Maps contribution directions according to spatial reproduction position of signals (channels/objects) plus a *dynamic* function of the content of the channel/object signals (directional analysis function) of different levels of sophistication.

Allows to identify optionally L2a) panned phantom sources (->panning index) [level], or optionally L2b) level+time delay panned phantom sources [level and time], or optionally L2c) widened (decorrelated) panned phantom sources (even more advanced)

Applications for Perceptual Audio Coding

Embodiment A) masking of each channel/object—no joint coding tools->target: controlling coder quantization noise (such that original and coded/decoded DirLoudMap deviate by less than a certain threshold, i.e. target criterion in DirLoudMap domain)

Embodiment B) masking of each channel/object—joint coding tools (e.g. M/S+prediction, MCT)

->target: controlling coder quantization noise in tool-processed signals (e.g. M or rotated "sum" signal) to meet target criterion in DirLoudMap domain Example for B)

1) calculate the overall DirLoudMap from, for example, all signals
2) apply joint coding tools
3) determine contribution of tool-processed signals (e.g. "sum" and "residual") to DirLoudMap, with consideration of the decoding function (e.g. panning by rotation/prediction)
4) control quantization by
   a) considering influence of quantization noise to DirLoudMap
   b) considering impact of quantizing signal parts to zero to DirLoudMap Embodiment C) controlling application (e.g. MS on/off) and/or parameters (e.g., prediction factor) of joint coding tools target: controlling encoder/decoder parameters of joint coding tools to meet target criterion in DirLoudMap domain Examples for C)

control M/S on/off decision based on DirLoudMap control smoothing of frequency dependent prediction factors based on the influence of varying the parameters to the DirLoudMap (for cheaper differential coding of parameters)

(=control trade-off between side-info and prediction accuracy)

Embodiment D) determine parameters (on/off, ILD, . . . ) of *parametric* joint coding tools (e.g. intensity stereo)

->target: Controlling parameter of parametric joint coding tool to meeting target criterion in DirLoudMap domain Embodiment E) Parametric Encoder/decoder system transmitting DirLoudMap as side information (rather than traditional spatial cues, e.g. ILD, ITD/IPD, ICC, . . . )

->Encoder determines parameters based on analyzing DirLoudMap, generates downmix signal(s) and (bit stream) parameters, e.g., overall DirLoudMap+contribution each signal to DirLoudMap ->Decoder synthesizes transmitted DirLoudMap by appropriate means Embodiment F) Decoder/Renderer/FormatConverter complexity reduction Determine contribution of each signal to the overall DirLoudMap (possibly based on transmitted side-info) to determine "importance" of each signal. In applications with restricted computational capability, skip decoding/rendering of signals that contribute to the DirLoudMap below a threshold.

Generic Steps for Computing a Directional Loudness Map (DirLoudMap)

This is, for example, valid for any implementation: (e.g., description of FIG. 3*a* and/or FIG. 4*a*)

a) Perform t/f decomposition of several input audio signals.
   optional: grouping spectral components into processing bands in relation to the frequency resolution of the human auditory system (HAS)
   optional: weighting according to HAS sensitivity in different frequency regions (e.g. outer ear/middle ear transfer function)
   ->result: t/f tiles (e. g. spectral domain representations, spectral bands, spectral bins, . . . )

For several (e. g. each) frequency bands (loop):

b) Compute, for example, a directional analysis function on the t/f tiles of the several audio input channels->result: direction d (e. g. direction $\Psi(m, k)$ or panning direction $\Psi_{0,j}$).

c) Compute, for example, a loudness on the t/f tiles of the several audio input channels
->result: loudness L
Loudness computation could be simply energy, or—more sophisticated—energy (or Zwicker model: alpha=0.25-0.27)

d.a) for example, enter/accumulate I contribution into DirLoudMap under direction d
Optional: spreading (panning index: windowing) of I distributions between adjacent directions end for optionally, (if needed by application): Calculate broadband DirLoudMap d.b) summarize DirLoudMap over several (avoid: all) frequency bands to provide broadband DirLoudMap, indicating sound 'activity' as a function of direction/space Example: Recovering Directional Signals with Windowing/Selection Function Derived from Banning Index (e.g., Description of FIG. 6)

Left (see FIG. 6*a*; red) and right (see FIG. 6*b*; blue) channel signals are, for example, shown in FIG. 6*a* and FIG. 6*b*. Bars can be DFT bins (discrete Fourier transform) of the whole spectrum, Critical Bands (frequency bin groups), or DFT bins within a critical band, etc.

Criterion function arbitrarily defined as: $\Psi = level_l / level_r$.

Criterion is, for example, "panning direction according to level". For example, the level of each or several FFT bins.

a) From the criterion function we can extract a windowing function/weighting function that selects the adequate frequency bins/spectral groups/components and recovers the directional signals. So the input spectrum (e. g. L and R) will be multiplied by different window functions $\Theta$ (one window function per each panning direction $\Psi_0$)

b) From the criterion function we have different directions associated to different values of $\Psi$ (i.e. level ratios between L and R)

For recovering signals using method a)

Example 1) Panning direction center, $\Psi_0=1$ (only keep bars that have the relationship $\Psi=\Psi_0=1$. This is the directional signal (see FIG. 6*a*1 and FIG. 6*b*1).

Example 2) Panning direction, slightly to the left, $\Psi_0=4/2$ (only keep bars that have the relationship $\Psi=\Psi_0=4/2$. This is the directional signal (see FIG. 6*a*2 and FIG. 6*b*2).

Example 3) Panning direction, slightly to the right, $\Psi_0=3/4$ (only keep bars that have the relationship $\Psi=\Psi_0=3/4$. This is the directional signal (see FIG. 6*a*3.1 and FIG. 6*b*3.1).

A criterion function can be arbitrarily defined as level of each DFT bin, energy per DFT bin group (Critical band)

$$\Psi = \log\left(\frac{E_l}{E_r}\right)$$

or loudness per critical band $$\Psi = \log\left(\frac{E_l^{0.25}}{E_r^{0.25}}\right).$$

There can be different criteria for different applications.

Weighting (Optional)

Note: not to be confused with outer ear/middle ear (peripheral model) transfer function weighting, which weights, for example, critical bands.

Weighting: optionally instead of taking the exact value of $\Psi_0$, use a tolerance range, and weight less importantly the values that deviate from $\Psi_0$. i.e. "take all bars that obey a relationship of 4/3 and pass them with weight 1, values that are near, weight them with less than 14 for this, the Gaussian function could be used. In the above examples, the directional signals would have more bins, not weighted with 1, but with lower values.

Motivation: weighting enables a "smoother" transition between different directional signals, separation is not so abrupt since there is some "leaking" amongst the different directional signals.

For Example 3), it can look something like shown in FIG. 6*a*3.2 and FIG. 6*b*3.2.

Embodiments of Different Forms of Calculating the Loudness Maps Using Generalized Criterion Functions Option 1: Panning Index Approach (See FIG. 3*a* and FIG. 3*b*):

For (all) different $\Psi_0$, a "value" map for this function in time can be assembled. A so called "directional loudness map" could be constructed either by Example 1) using a criterion function of "panning direction according to level of individual FFT bins"

$$\Psi = \frac{level_l}{level_r},$$

so directional signals are, for example, composed of individual DFT bins. Then, for example, calculating the energy in each critical band (DFT bin group) for each directional signal, and then elevating these energies per critical band to an exponent of 0.25 or similar. →similar to the chapter "Objective assessment of spatial audio quality using directional loudness maps"

Example 2) Instead of windowing the amplitude spectrum, one can window the loudness spectrum. The directional signals will be in the loudness domain already.

Example 3) using directly a criterion function of "panning direction according to loudness of each critical band"

$$\Psi = \frac{E_l^{0.25}}{E_r^{0.25}}.$$

Then directional signals will be composed of chunks of whole critical bands that obey values given by $\Psi_0$.

For example, for $\Psi_0=4/3$ the directional signal could be:

$$Y = 1{*}\text{critical\_band\_1} + 0.2{*}\text{critical\_band\_2} + 0.001{*}\text{critical\_band\_3}.$$

and different combinations for other panning directions/directional signals apply. Note that, in the case of the use of weighting, different panning directions could contain the same critical bands, but most likely with different weight values. If weighting is not applied, directional signals are mutually exclusive.

Option 2: Histogram Approach (See FIG. 4*b*):

It is a more general description of the overall directional loudness. It does not necessarily make use of the panning index (i.e. one does not need to recover "directional signals" by windowing the spectrum for calculating the loudness). An overall loudness the frequency spectrum is "distributed" according to their "analyzed direction" in the corresponding frequency region. Direction analysis can be level difference based, time difference based, or other form.

For each time frame (see FIG. 5):

The resolution of the histogram $H_\Psi$ will be given, for example, by the amount of values given to the set of $\Psi_0$. This is, for example, the amount of bins available for grouping occurrences of $\Psi_0$ when evaluating $\Psi$ within a time frame. Values are, for example, accumulated and smoothed over time, possibly with a "forgetting factor" a:

$$H_\Psi(n)=\alpha H_{\Psi_0}+(1-\alpha)H_\Psi(n-1)$$

Where n is the time frame index.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A decoder side format converter for converting a format of an audio content, which represents an audio scene, from a first format to a second format, wherein the format converter is configured to provide a representation of the audio content in the second format on the basis of the representation of the audio content in the first format;

wherein the format converter is configured to adjust a complexity of the format conversion in dependence on contributions of input audio signals of the first format to an overall directional loudness map of the audio scene;

wherein the overall directional loudness map indicates a loudness perception of the audio content for different directions.

2. The decoder side format converter according to claim 1, wherein the format converter is configured to compute or estimate a contribution of a given input audio signal to the overall directional loudness map of the audio scene; and wherein the format converter is configured to decide whether to consider the given input audio signal in the format conversion in dependence on a computation or estimation of the contribution.

3. An audio decoder for decoding an encoded audio content, wherein the audio decoder is configured to receive an encoded representation of one or more audio signals and to provide a decoded representation of the one or more audio signals;

wherein the audio decoder is configured to reconstruct an audio scene using the decoded representation of the one or more audio signals;

wherein the audio decoder is configured to adjust a decoding complexity in dependence on contributions of encoded signals to an overall directional loudness map of a decoded audio scene;

wherein the overall directional loudness map indicates a loudness perception of the audio content for different directions.

4. The audio decoder according to claim 3, wherein the audio decoder is configured to receive an encoded directional loudness map information and to decode the encoded directional loudness map information, to acquire the overall directional loudness map and/or one or more directional loudness maps.

5. The audio decoder according to claim 4, wherein the audio decoder is configured to derive the overall directional loudness map from the one or more directional loudness maps.

6. The audio decoder according to claim 3, wherein the audio decoder is configured to compute or estimate a contribution of a given encoded signal to the overall directional loudness map of the decoded audio scene; and wherein the audio decoder is configured to decide whether to decode the given encoded signal in dependence on a computation or estimation of the contribution.

7. A renderer for rendering an audio content, wherein the renderer is configured to reconstruct an audio scene on the basis of one or more input audio signals;

wherein the renderer is configured to adjust a rendering complexity in dependence on contributions of the input audio signals to an overall directional loudness map of a rendered audio scene;

wherein the overall directional loudness map indicates a loudness perception of the audio content for different directions.

8. The renderer according to claim 7, wherein the renderer is configured to compute or estimate a contribution of a given input audio signal to the overall directional loudness map of the audio scene; and wherein the renderer is configured to decide whether to consider the given input audio signal in the rendering in dependence on a computation or estimation of the contribution.

* * * * *